SURVEILLANCE DISPLAYS
(1) 40 MILE CENTERED
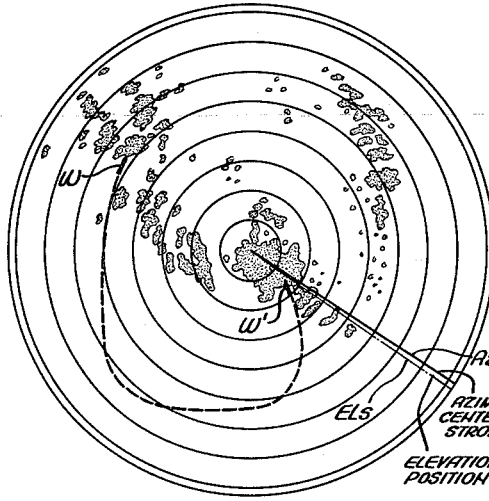
(2) 10 MILE OFF-CENTERED
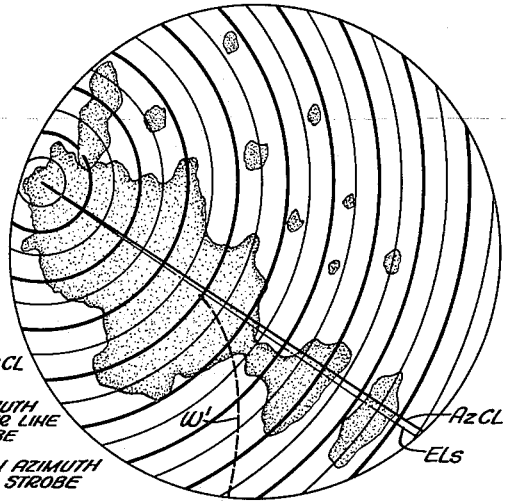
PRECISION DISPLAYS
(3) LEFT OF RUNWAY
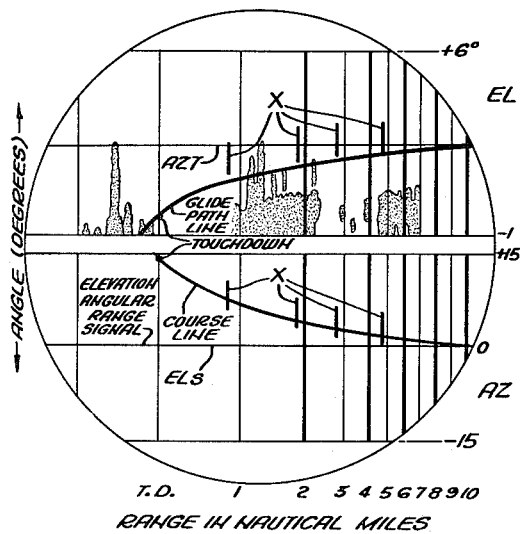
(4) RIGHT OF RUNWAY
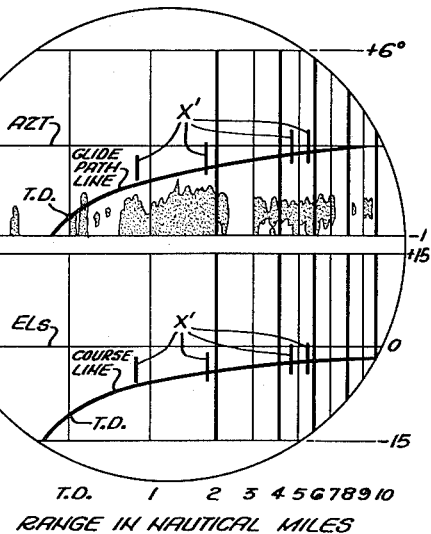
FIG. 2. SECTION A.
INVENTORS
ROBERT W. LANDEE
JAMES R. DEEN
JOHN J. FLING
ROBERT G. SHAW
RONALD R. DAVIS
JAMES K. JOHNSTON
PAUL L. BENNETT

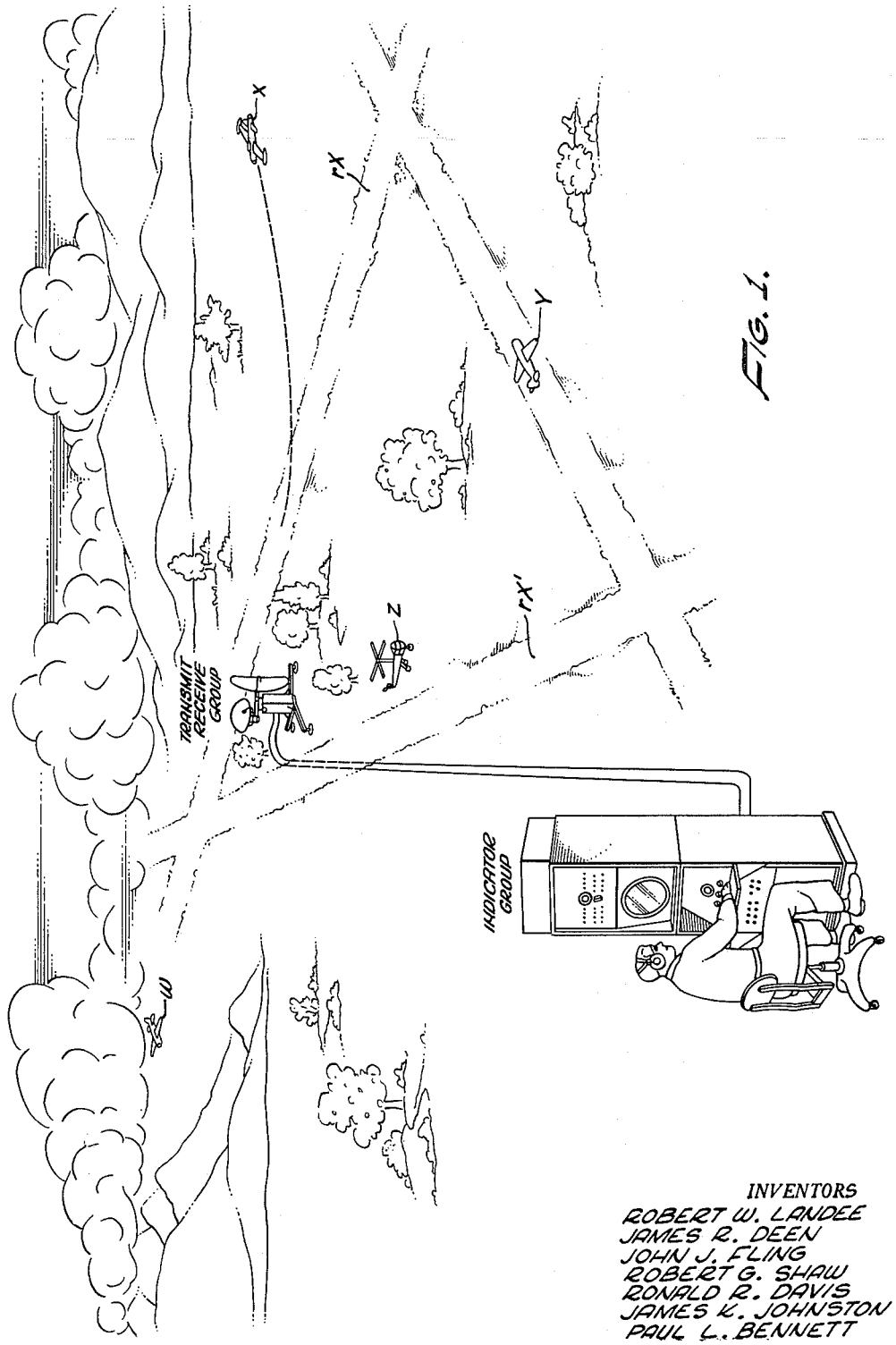

TAXI DISPLAYS
1 MILE
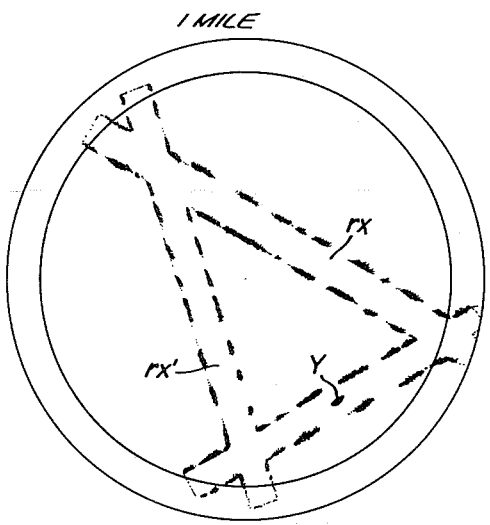
3 MILE
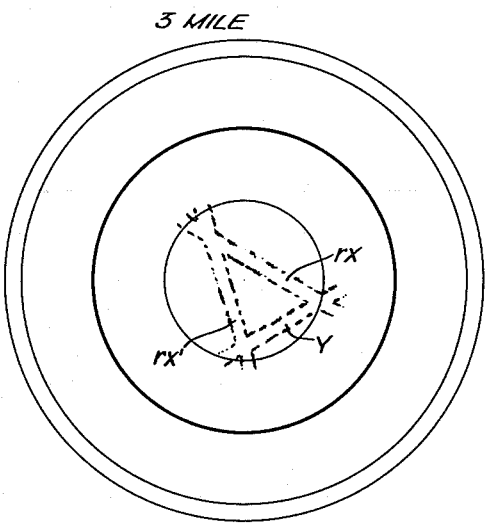
HEIGHT FINDING DISPLAYS
7° SCAN – 10 MILE
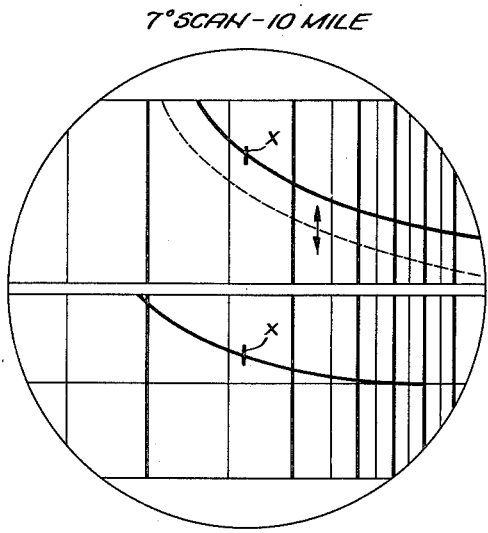
T.D.  1  2  3  4  5  6  7  8  9  10
RANGE IN NAUTICAL MILES
31° SCAN – 40 MILE
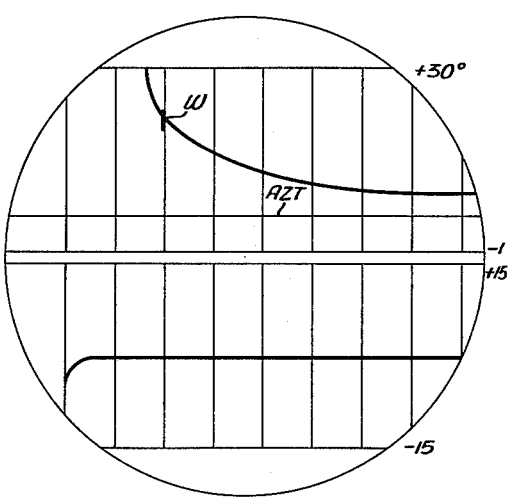
T.D.  5  10  15  20  25  30  35  40
RANGE IN NAUTICAL MILES
FIG. 2. SECTION B
INVENTORS
ROBERT W. LANDEE
JAMES R. DEEN
JOHN J. FLING
ROBERT G. SHAW
RONALD R. DAVIS
JAMES K. JOHNSTON
PAUL L. BENNETT

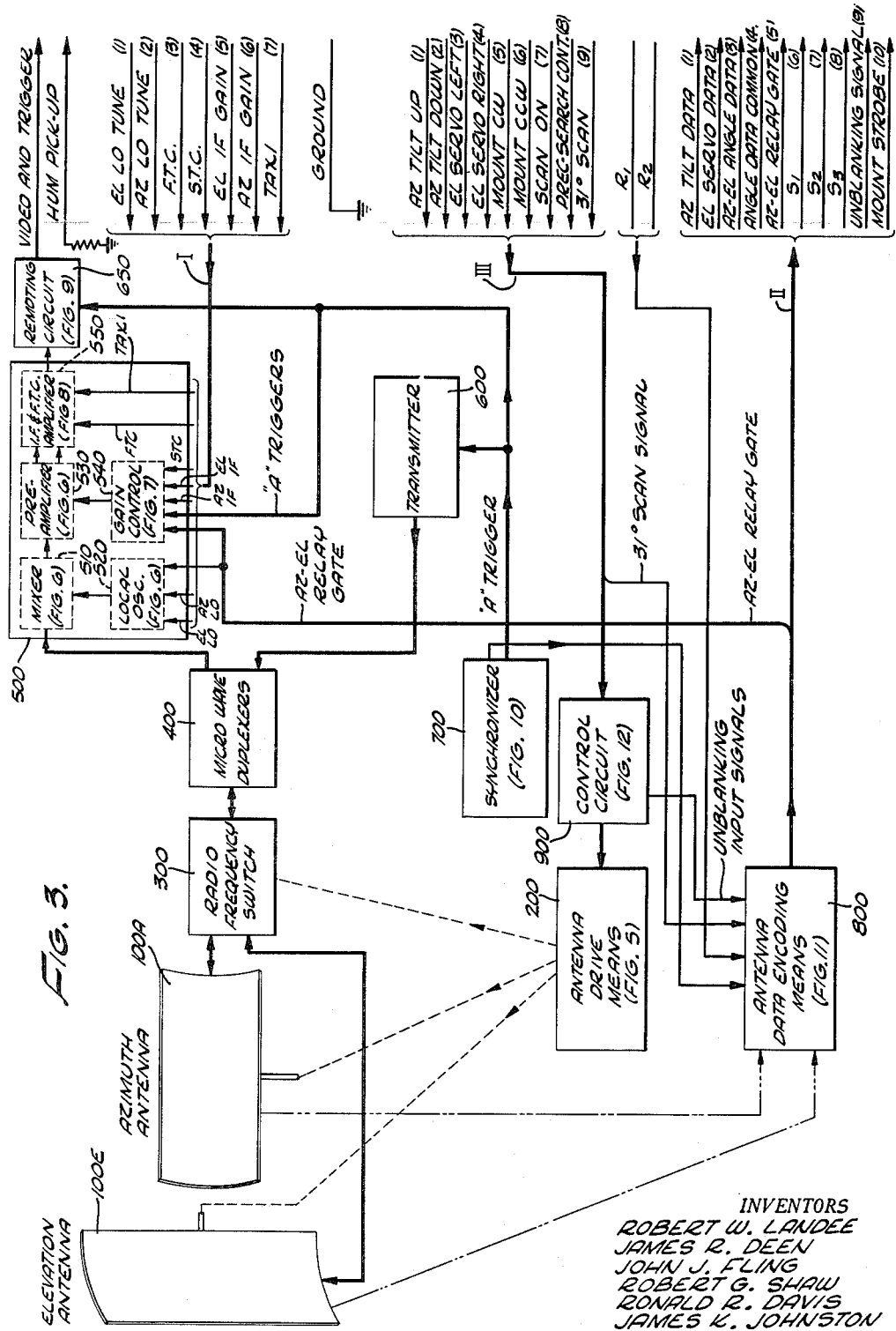

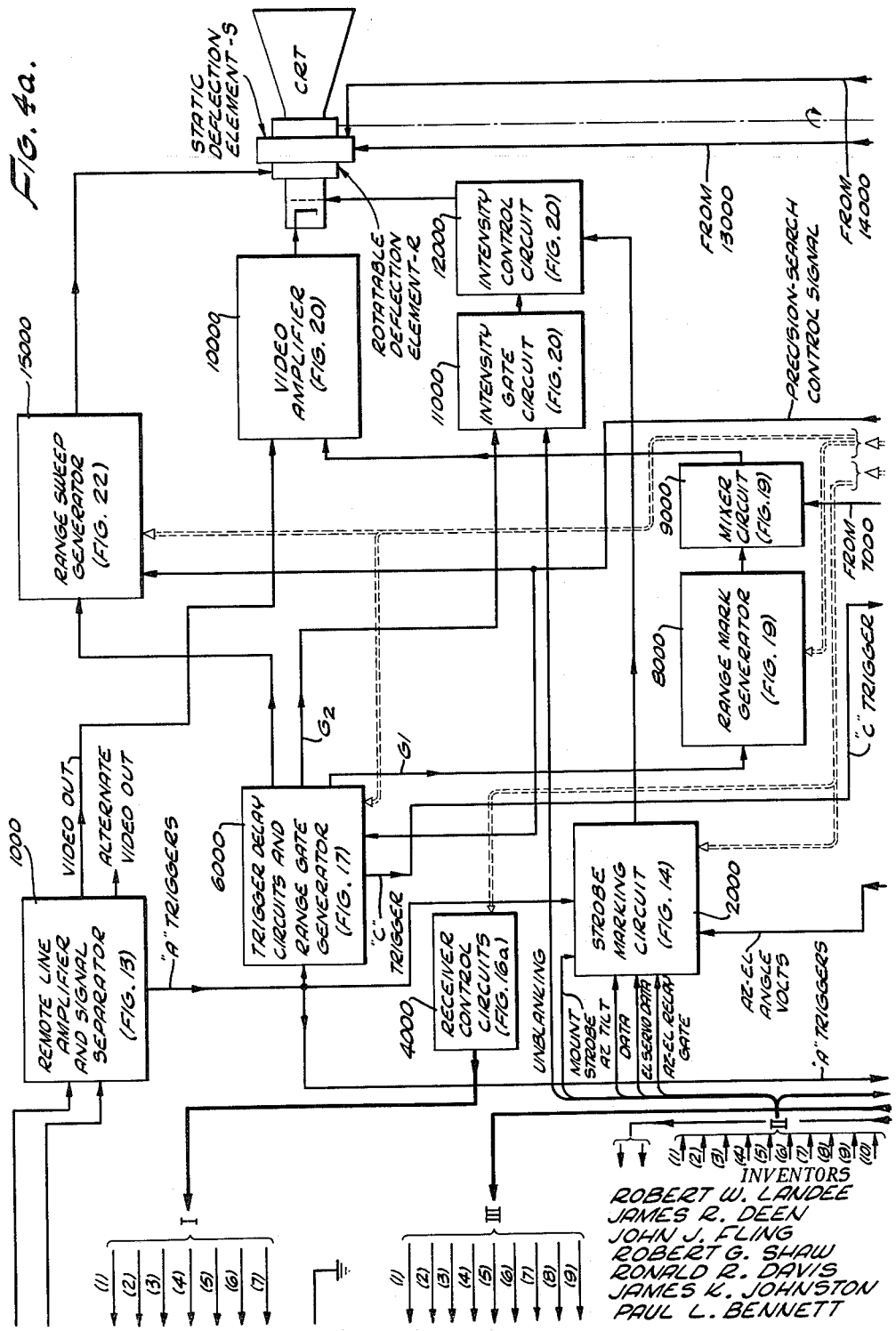

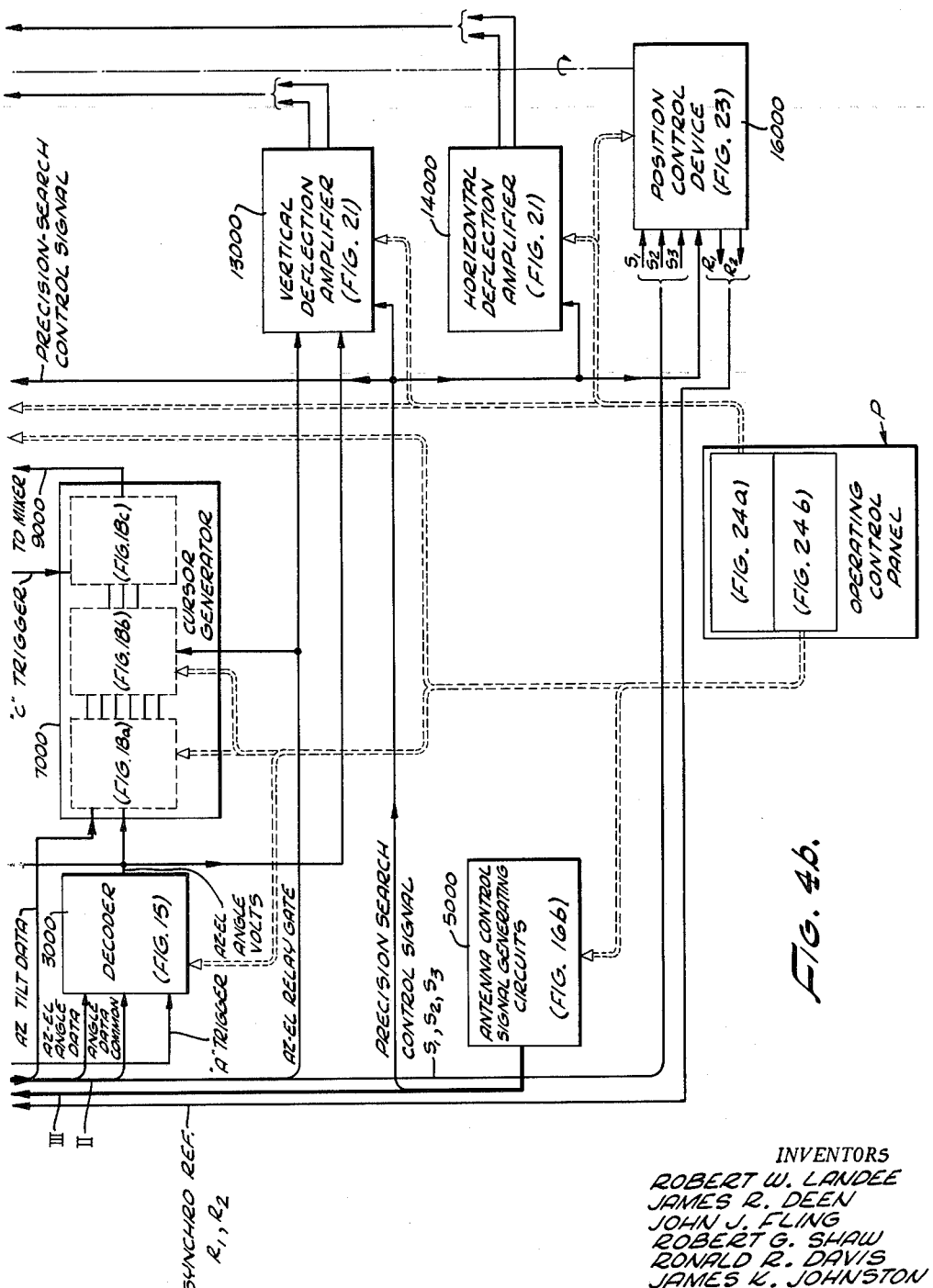

INVENTORS
ROBERT W. LANDEE
JAMES R. DEEN
JOHN J. FLING
ROBERT G. SHAW
RONALD R. DAVIS
JAMES K. JOHNSTON
PAUL L. BENNETT

INVENTORS
ROBERT W. LANDEE
JAMES R. DEEN
JOHN J. FLING
ROBERT G. SHAW
RONALD R. DAVIS
JAMES K. JOHNSTON
PAUL L. BENNETT

INVENTORS
ROBERT W. LANDEE
JAMES R. DEEN
JOHN J. FLING
ROBERT G. SHAW
RONALD R. DAVIS
JAMES K. JOHNSTON
PAUL L. BENNETT

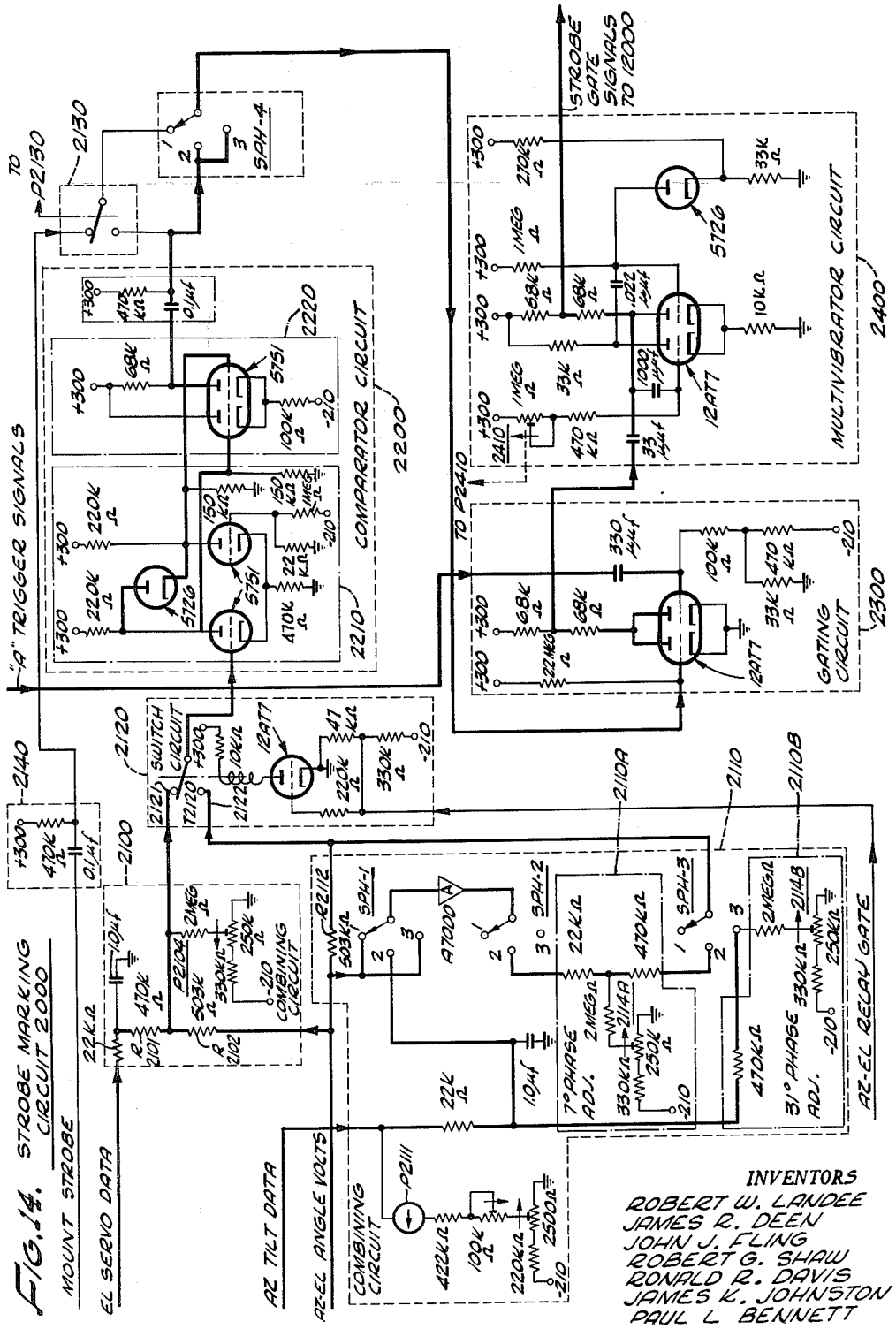

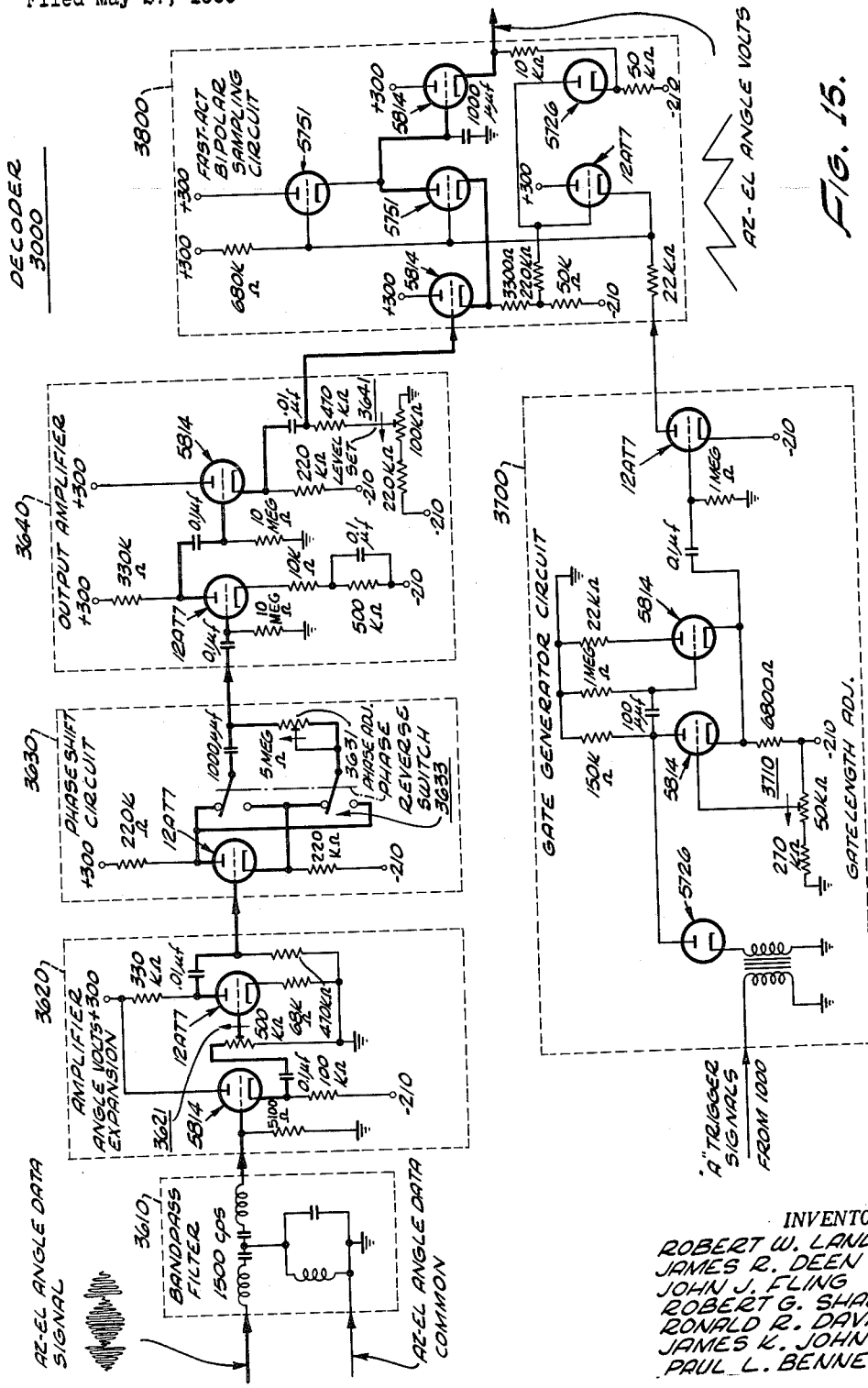

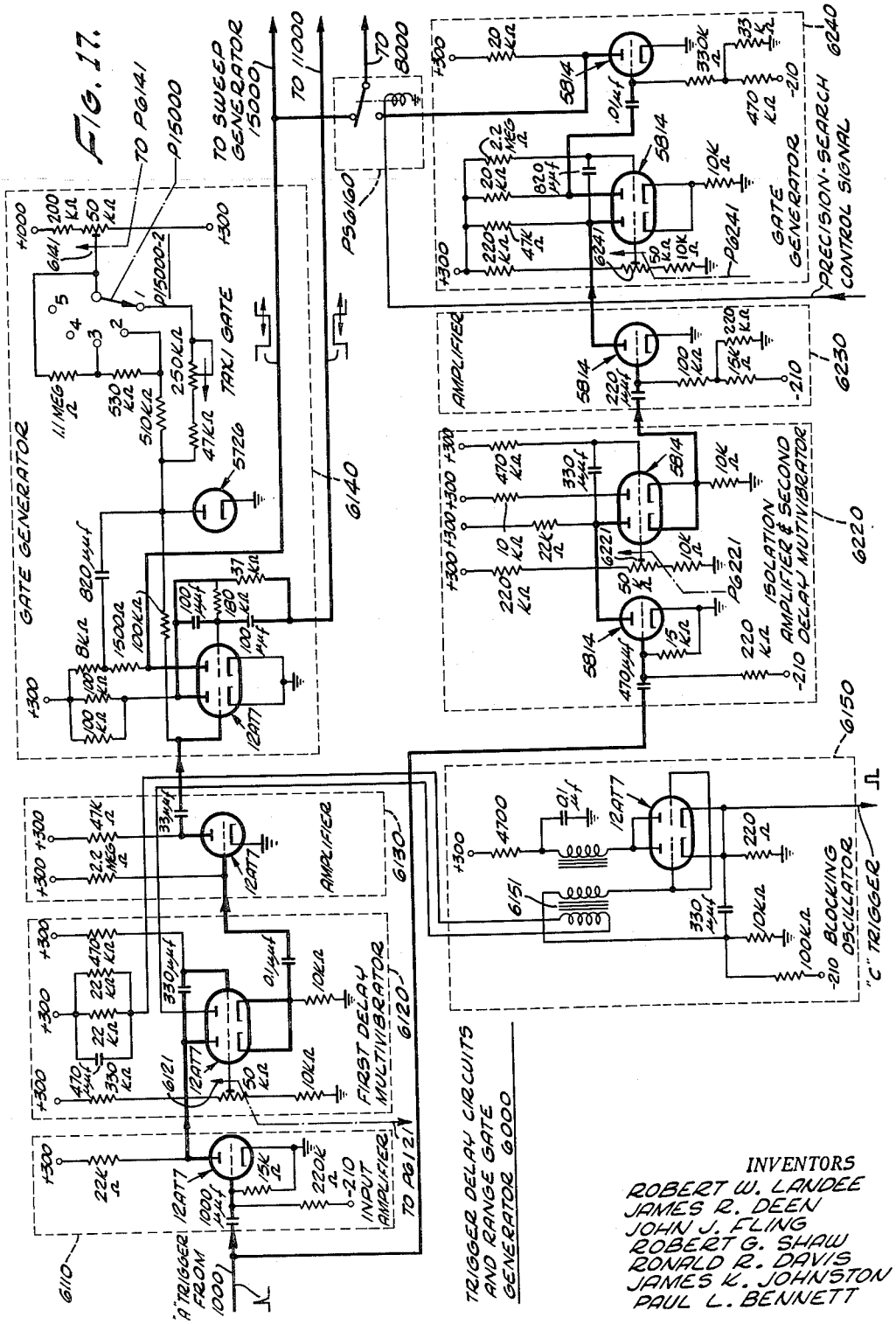

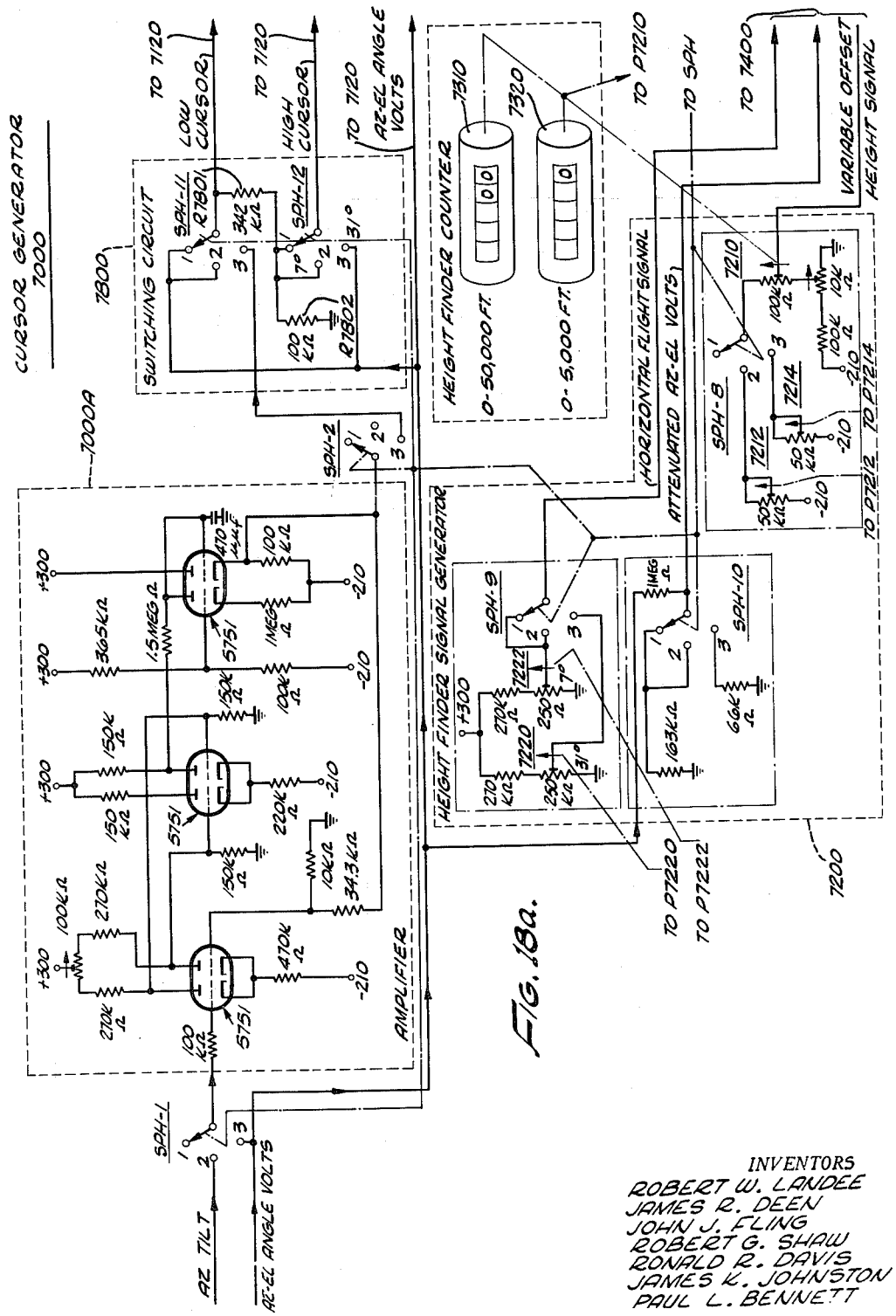

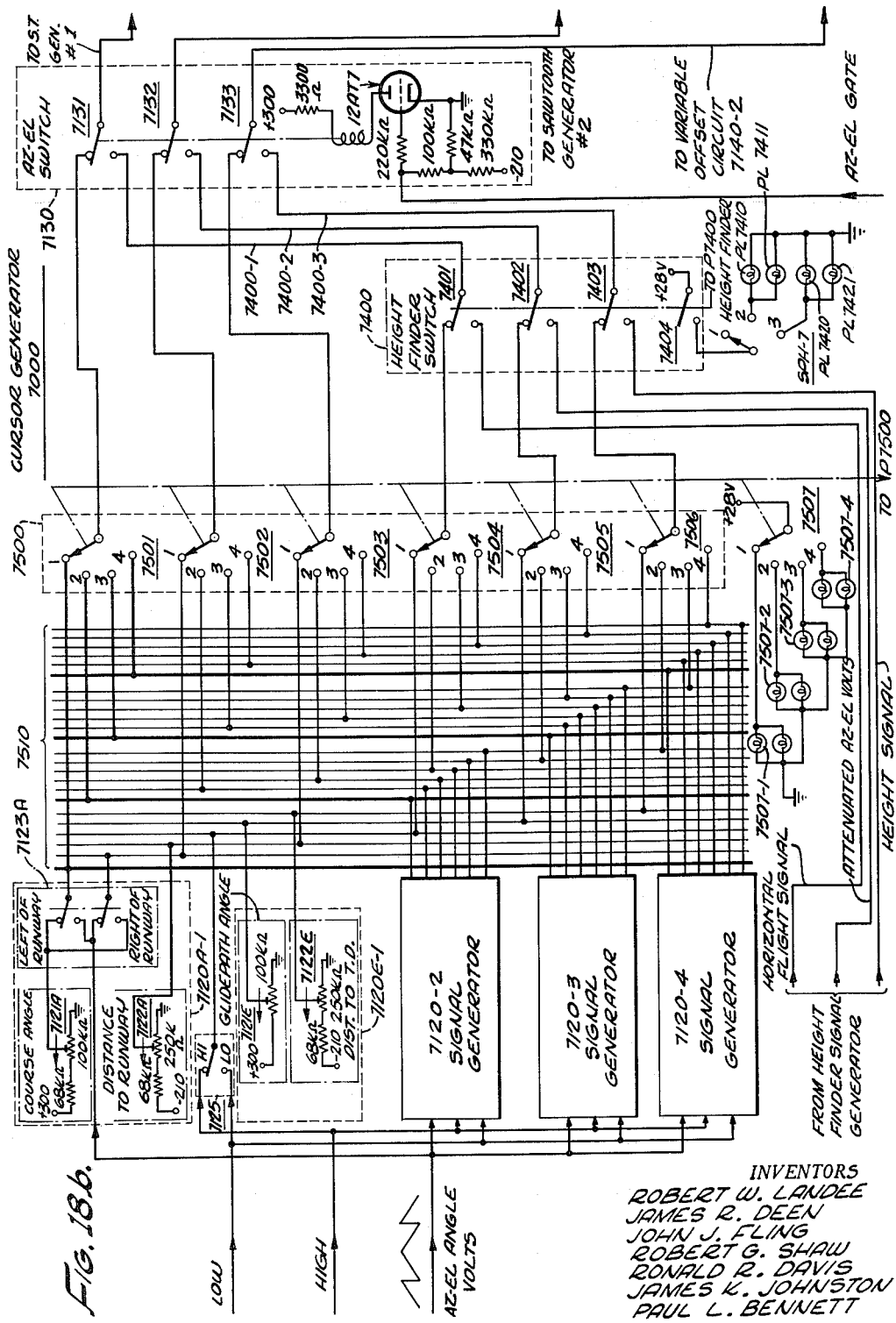

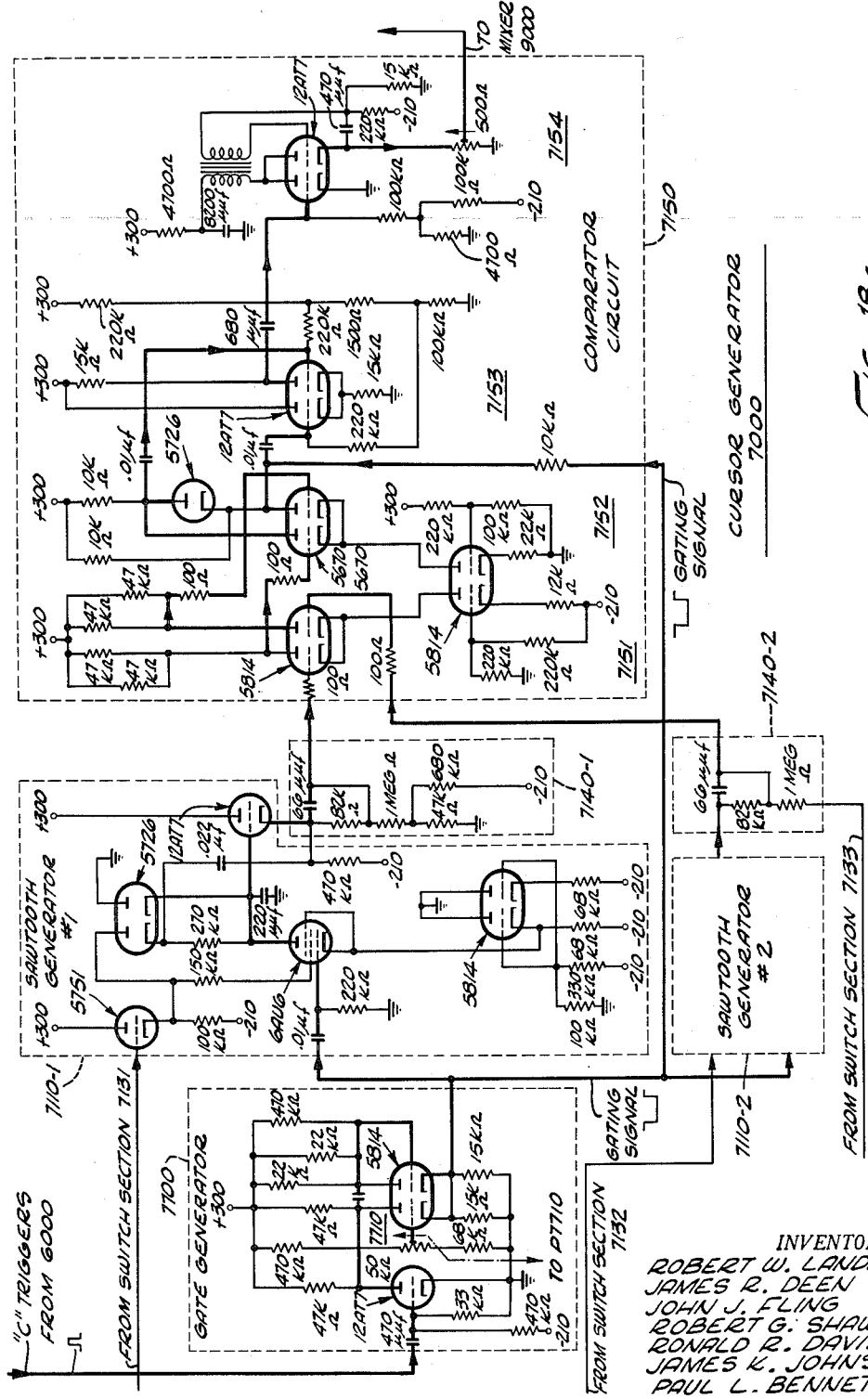

March 14, 1961 R. W. LANDEE ET AL 2,975,413
SIMPLIFIED GROUND CONTROLLED APPROACH SYSTEM INCLUDING
ADAPTATIONS FOR SURVEILLANCE, PRECISION
APPROACH, TAXI AND HEIGHT FINDING
Filed May 27, 1955 29 Sheets-Sheet 23

INVENTORS
ROBERT W. LANDEE
JAMES R. DEEN
JOHN J. FLING
ROBERT G. SHAW
RONALD R. DAVIS
JAMES K. JOHNSTON
PAUL L. BENNETT

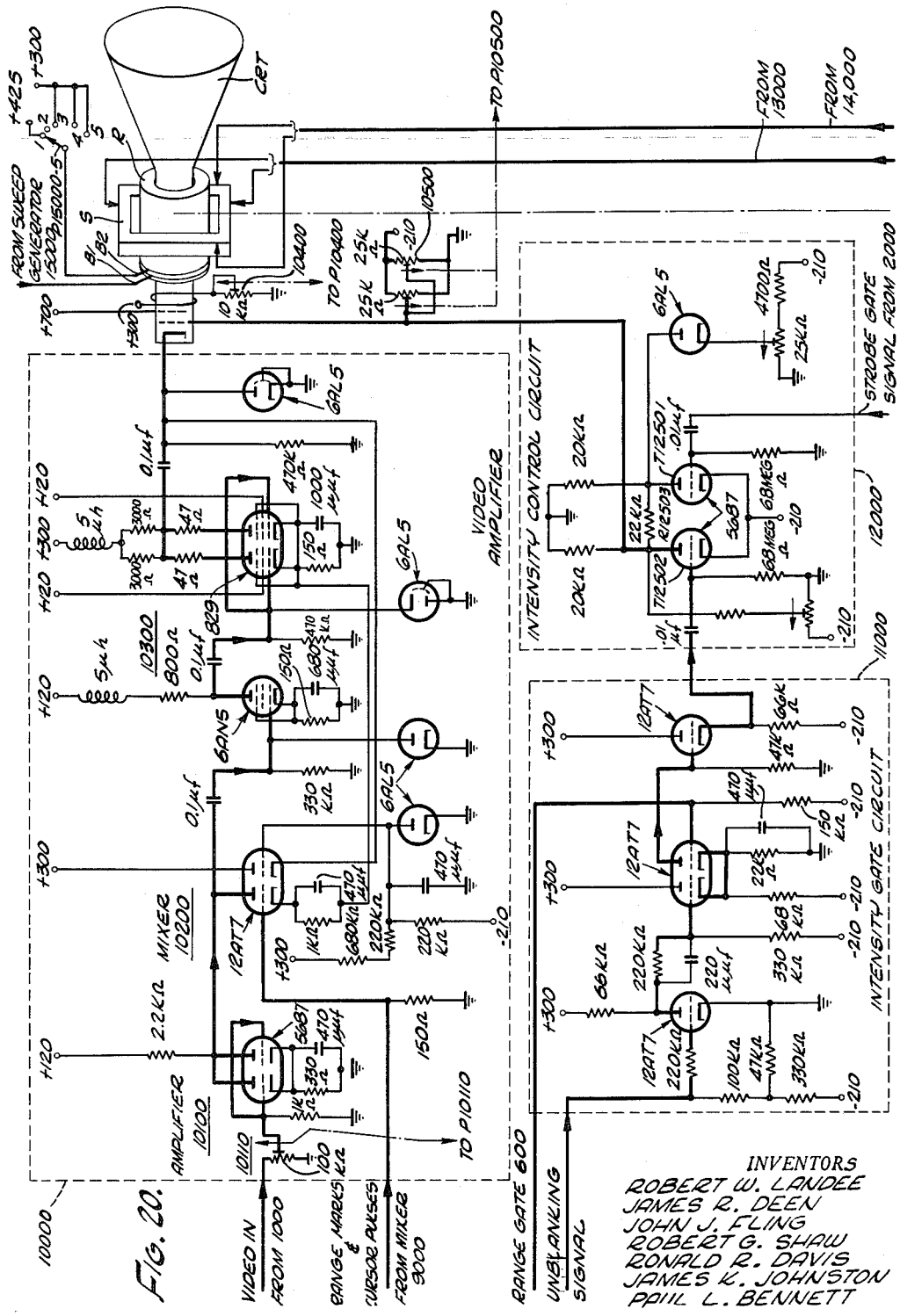

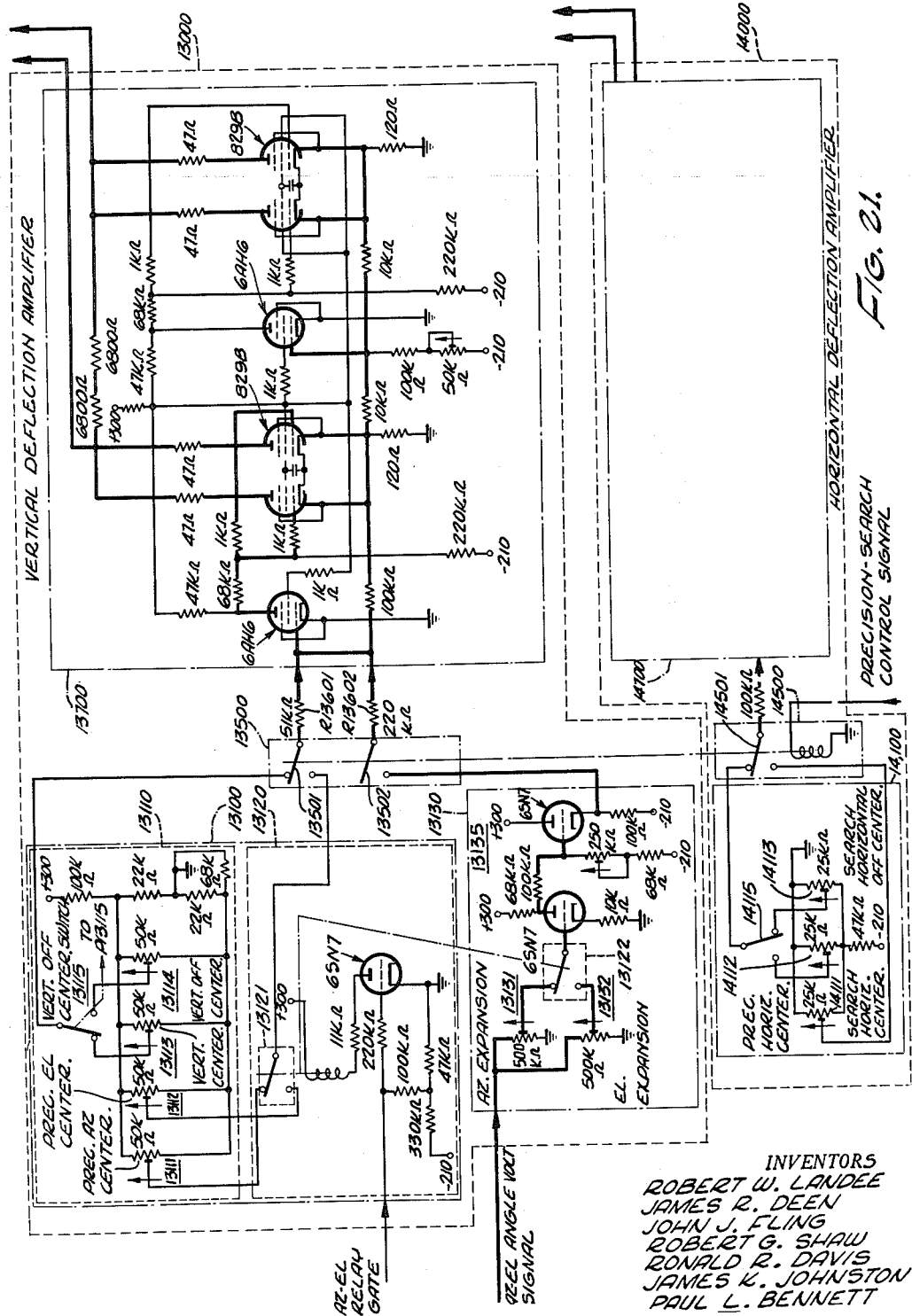

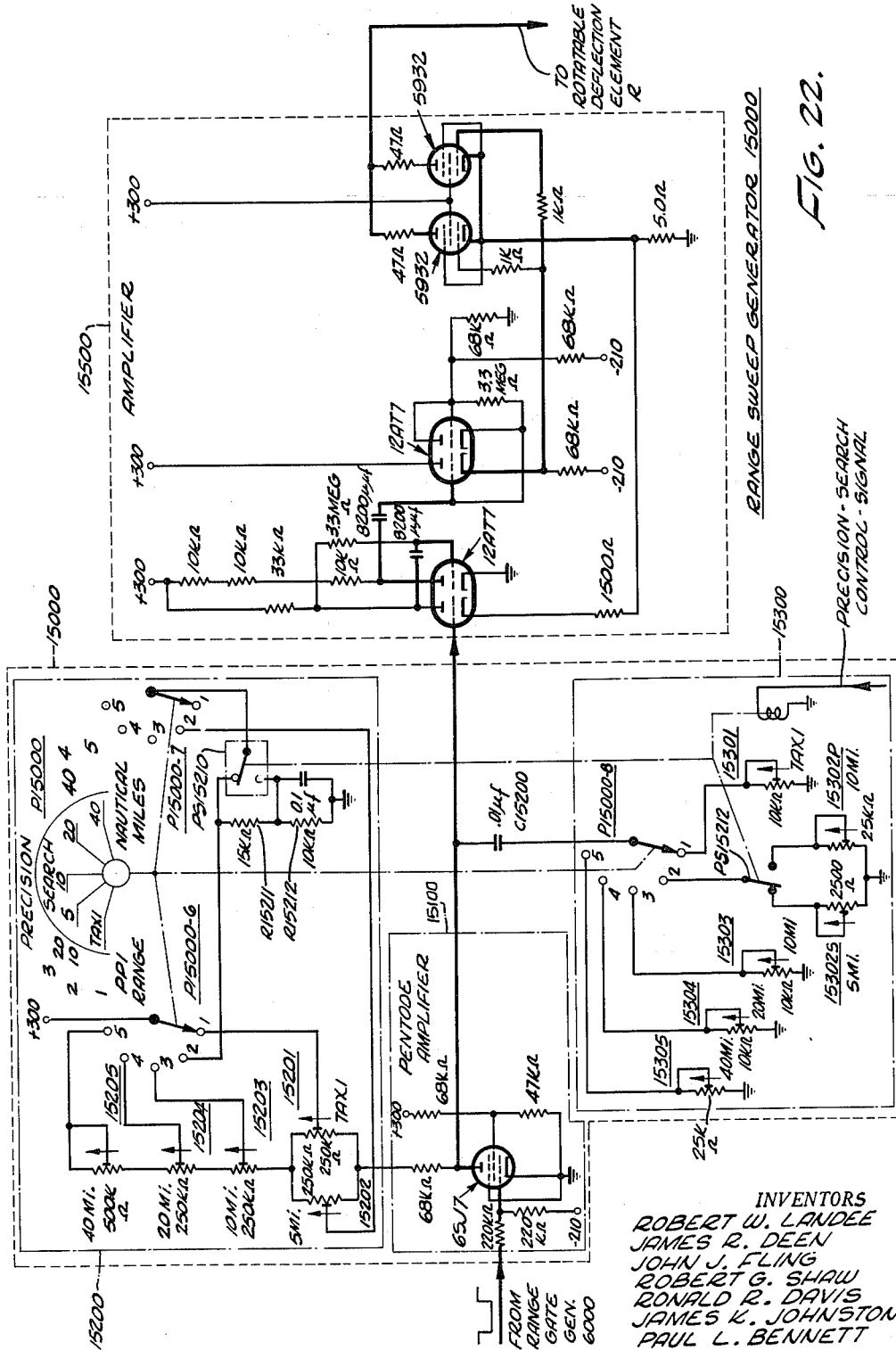

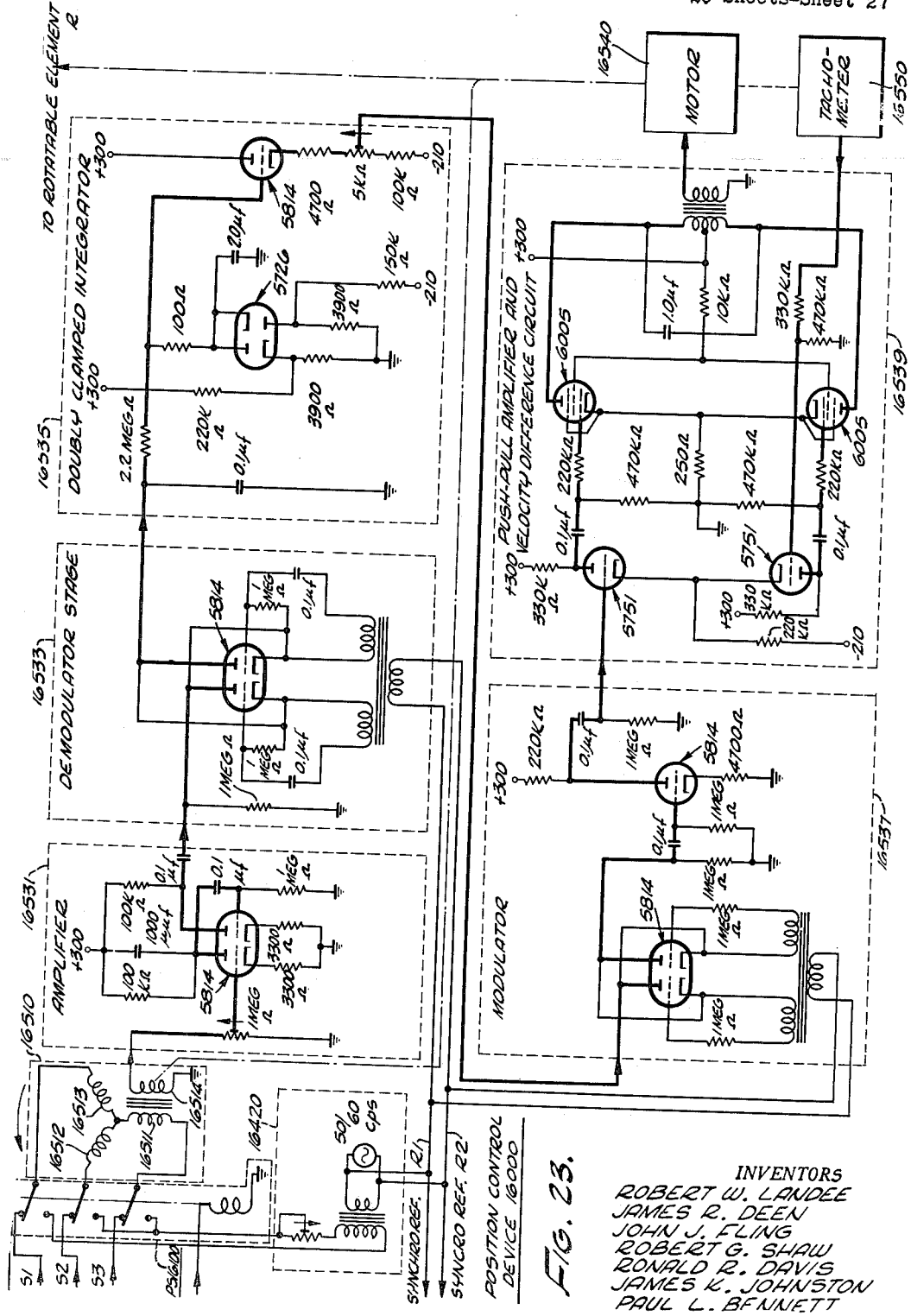

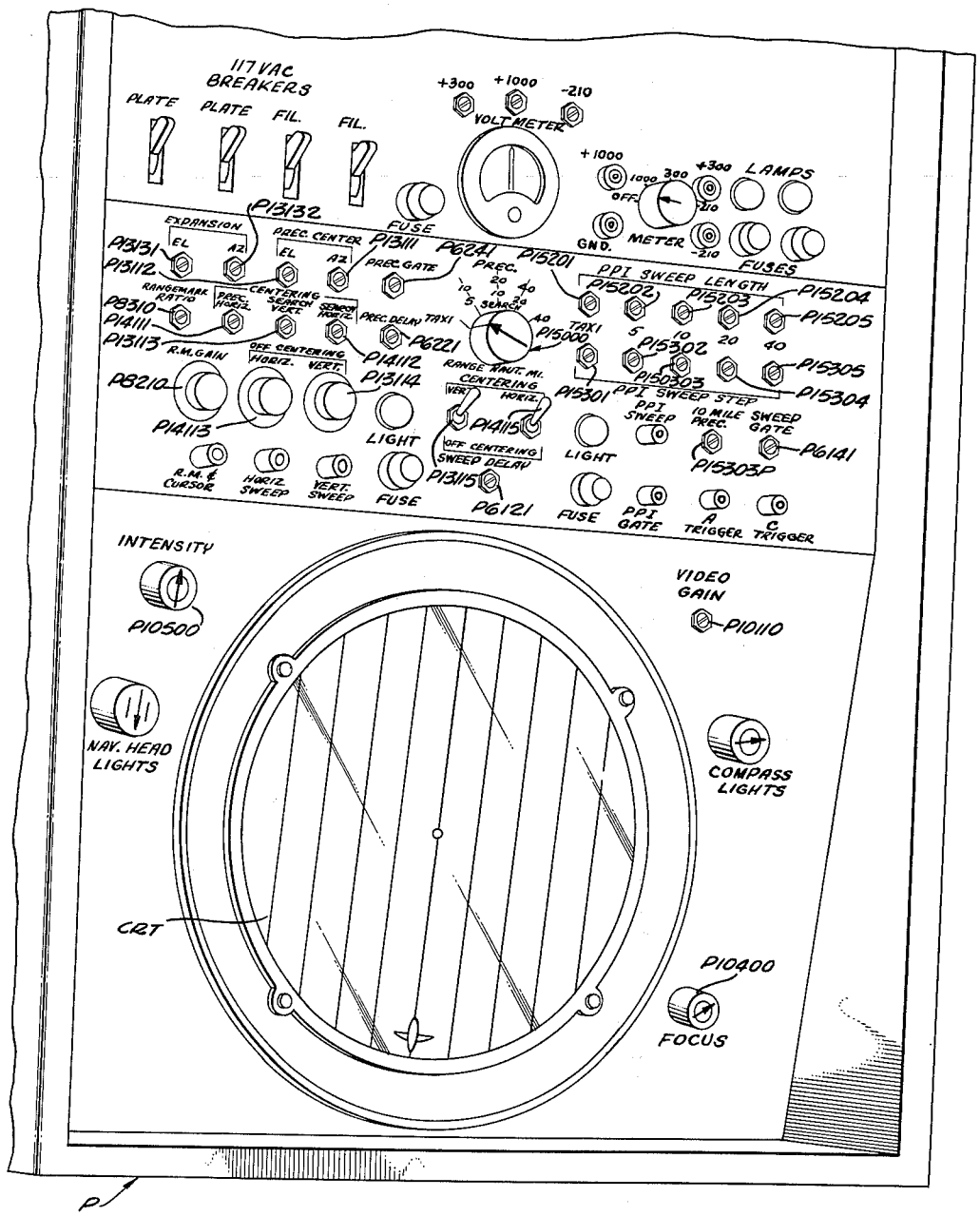

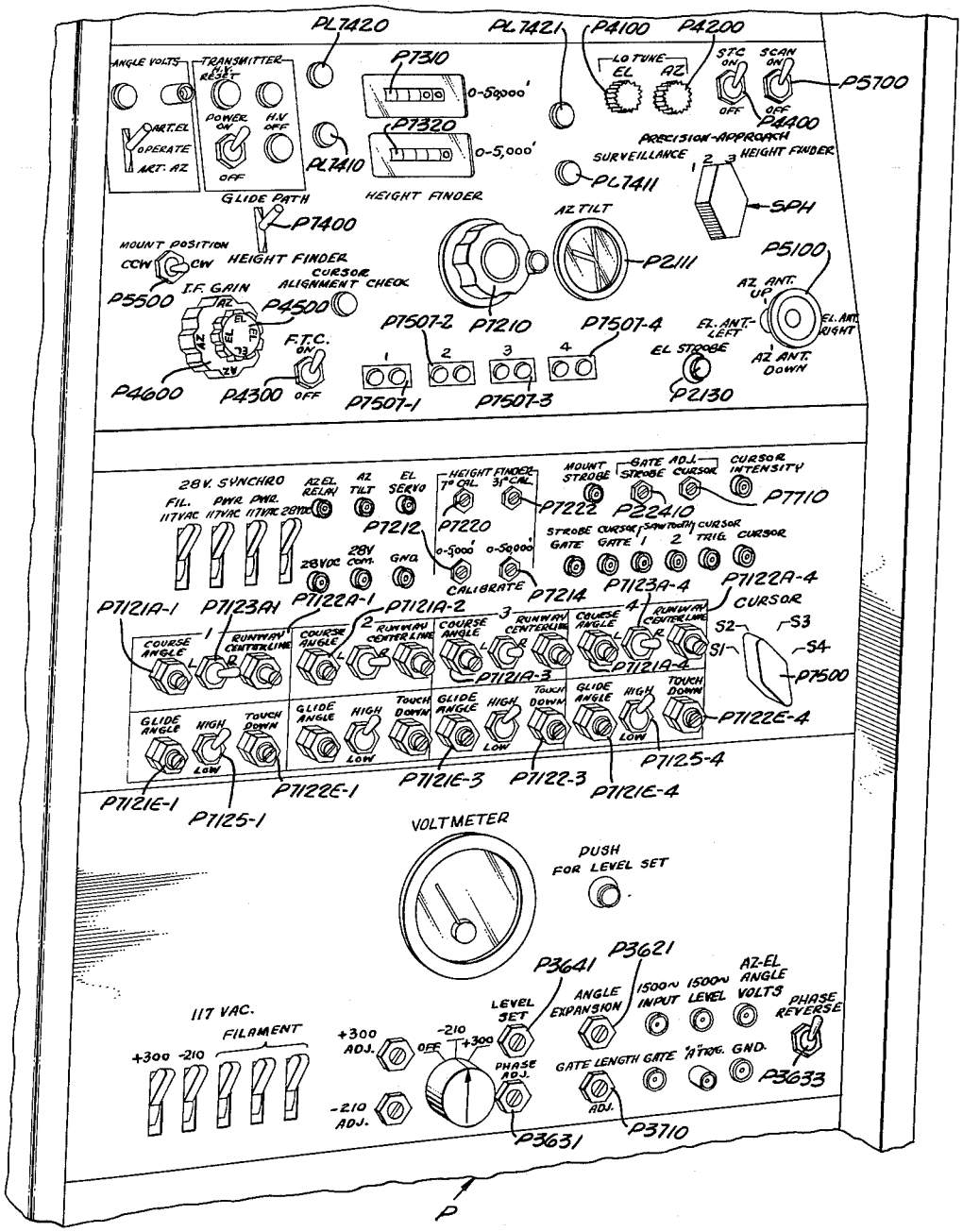
FIG. 24.b.
INVENTORS
ROBERT W. LANDEE
JAMES R. DEEN
JOHN J. FLING
ROBERT G. SHAW
RONALD R. DAVIS
JAMES K. JOHNSTON
PAUL L. BENNETT United States Patent Office 2,975,413
Patented Mar. 14, 1961

2,975,413

SIMPLIFIED GROUND CONTROLLED APPROACH SYSTEM INCLUDING ADAPTATIONS FOR SURVEILLANCE, PRECISION APPROACH, TAXI AND HEIGHT FINDING

Robert W. Landee, Encino, James R. Deen, John J. Fling, and Robert G. Shaw, Los Angeles, Ronald R. Davis, Ontario, James K. Johnston, Hollywood, and Paul L. Bennett, Burbank, Calif., assignors to Gilfillan Bros. Inc., Los Angeles, Calif., a corporation of California Filed May 27, 1955, Ser. No. 511,456

33 Claims. (Cl. 343—5)

This invention relates to ground-controlled approach systems and, more particularly, to an improved and simplified system of this type which is adapted for surveillance, precision approach, taxi and height finding operations.

In the typical ground-controlled approach system (GCA) previously available, completely separate facilities are provided for locating an aircraft to be guided, the operation being referred to as search or surveillance; and for guiding an aircraft located in search along predetermined ideal glidepath and course line paths, where the operation is referred to as precision approach. Thus in the typical aircraft control system such as is described in the patent to L. W. Alvarez et al. No. 2,555,101, two distinct control systems are required for surveillance and precision approach, respectively.

More specifically in this regard it will be noted that Fig. 14 of this patent relates to the P.P.I. or search system and includes its own antenna structure 340, 341 and 342 and an electronic system 344, as is fully described in column 27 of the patent. The Alvarez invention then relates only to the precision approach system which is associated with the independently operating P.P.I. system.

In addition to the requirement of separate systems for the search and precision operations, the prior art also contemplated an additional unit for height finding computation where it was desired. Thus typically a height finding system was provided, such as is described in the patent to R. W. Lee, No. 2,700,762. Another height finding computing technique is shown in the patent to R. O. Bolster et al., No. 2,693,647.

In view of the separate existences of the various systems in the prior art, the conventional facility has become rather cumbersome and typically may be housed in a truck transporting unit, as shown in the Alvarez patent. This arrangement makes it possible to move the system over level terrain but necessitates a readjustment of the units after every reorientation, so that the search and guidance information is properly calibrated.

As a consequence of the above attributes, the conventional arrangement is not well adapted for small airport facilities where economy is of the essence, and is even too cumbersome for large facilities where it may be necessary to control precision landing on any of a multitude of different landing strips. Furthermore, the size of the prior art arrangement prohibits its tactical military usage where it may frequently be necessary to move the system to a new location over rather rough terrain, and to reorient the system for accurate operation.

A further limitation in previously known systems is that once the aircraft has been guided to its landing, guidance becomes impossible from the radar control station. Since a taxi control, such as is contemplated by the present invention, is not available, additional ground safety measures must be employed such as a provision of ground guidance vehicles to direct the aircraft after landing.

The present invention obviates the above and other disadvantages inherent in previously available GCA systems by providing a multiple purpose system with a wide range of versatility but which nevertheless is relatively simple, economical to construct, and compact so as to allow ease in tactical movement. In accordance with the basic principles of the invention, provision is made whereby the same radar transmitting and receiving system, including the antenna structure required, may be utilized for surveillance and precision approach operation.

Where these embodiments of the invention are employed, a single operator may locate aircraft in search or P.P.I. operation, noting its P.P.I. position on a cathode ray tube display device; may then switch to a precision approach operation, after having guided the aircraft into the proper proximity of the available landing strip, the precision information being available on the same cathode ray tube display; and finally, after properly guiding the aircraft to its landing by observing the ideal glidepath and course lines displayed on the cathode ray tube, the operator may perform a final switching operation whereby radar taxi information becomes available on the cathode ray tube and guidance control on the ground is then possible from the radar control station.

It may be noted here that while it has been previously possible to have a one-man operation for both search and precision approach, this arrangement has been quite complicated due to the fact that the operator had to observe separate displays for search and precision and had to be familiar with a multitude of disassociated control operations.

The invention not only allows the utilization of the same circuit means and antenna structure for both search and precision approach operations but also provides a convenient and accurate means of noting the precision approach orientation of the antennas during the time that a surveillance operation is being performed. In particular, the operator is provided with strobe marking lines on the P.P.I. or search display, indicating the precision orientation that the azimuth and elevation antennas will assume when he makes the appropriate switch selection. One of the strobe lines displayed in the P.P.I. or polar presentation indicates the center of scan of the azimuth precision angle and may be considered to be representative of the runway orientation to which the aircraft may be directed. In addition, at the operator's selection, a strobe line may be displayed indicating the azimuth orientation of the elevation antenna so that he may determine whether or not elevation radar echoes will be seen when the precision operation begins.

Another feature of the invention is the provision of means for rotating the entire antenna mount structure so as to reorient both the azimuth and the elevation antennas for precision scanning directed to a different runway. Provision is made here for maintaining the P.P.I. or search display in a fixed absolute reference position so that true north, for example, remains stationary on the display in spite of the mount rotation.

Thus in this manner the operator may not only detect the location of the targets in search but may also vary the position of the antenna structure until the strobe lines available indicate that the precision scanning to follow will be properly lined up with an available runway. Then the operator may guide the aircraft to the vicinity of the azimuth center-of-scan line and will know when he may properly switch to the precision operation. And he will be further assured that after he has actuated the switching control he will have both azimuth and elevation information required for precision approach.

In addition to providing an economical and efficient GCA system where search, precision approach and taxi controls may all be effected from the operator's control panel, the invention also contemplates utilization of the same electronic circuits for a height-finding operation. In this operation the elevation antenna is actuated, at the operator's selection, to scan through either of two angular ranges, such as a −1 to 6°, and a −1 to 30° referred to herein as a 31° scan. The small scanning angle, namely −1 to 6°, may be the same as the elevation precision scan and may be utilized to detect the height of lower flying aircraft, perhaps in the order of magnitude in height of 500 to 5000 feet. The large angle scan, on the other hand, may be utilized to detect the height of aircraft at greater altitudes in the order of 5000 to 50,000 feet. The same height-finding operation is readily adapted for determining the altitude of other objects such as cloud banks where it is desired to determine a weather ceiling.

According to the invention, the height-finding operation is performed by varying the position of a cursor line which is similar to the azimuth course line but appears in the elevation display. This cursor line is varied until it passes through the target position as indicated by its echo on the cathode ray tube.

The system of the present invention embodies a multitude of improved means which are described herein in terms of their functional relationship to the system. Reference for a detailed description of these components is made to the following copending applications and patents:

(1) "System for Selecting and Controlling Surveillance and Precision Displays for Ground Controlled Approach" by Robert Wayne Landee, Serial No. 498,237, filed March 31, 1955; where mechanism and circuits are shown providing an indicator device. In this device the same deflection circuit and antenna position indicating means may be utilized to provide displays representing either search or precision scanning, at the operator's selection. In a particular aspect the device of this copending application allows the utilization of a rotatable deflection element such as a magnetic yoke for surveillance where it is rotated in synchronism with the 360° rotation of the azimuth antenna and then at the operator's selection the yoke is positioned in accordance with a fixed synchro signal in a predetermined coordinate direction which may correspond to the horizontal range vector position of a "B" display.

(2) "Selectively Operable Strobe Marking Circuit" by Lawrence Michels, Serial No. 502,047, filed April 18, 1955; where improved circuit means are provided for making search and precision strobes available indicating the azimuth center-of-scan position as well as the azimuth and elevation angular limits in the non-scanning coordinate directions of the respective antennas. This invention allows an efficient and accurate display of the various strobe lines which the operator needs in order to properly position the antenna mount in alignment with a runway, and then to guide aircraft in search to this location. In addition, the angular limit indicating signals are available for the precision approach operation so that antenna orientation variations may still be made to ensure that both elevation and azimuth information are continuously available.

(3) "Cursor Generator with a Height-Finding Adaptation" by Lawrence Michels, Serial No. 489,359, filed February 21, 1955, now Patent No. 2,823,374, which teaches a height finding technique requiring only a simple adaptation of an azimuth course line generator, where effectively a rotation of 90° in space is introduced and the azimuth distance-to-runway location is translated into a distance to a horizontal flight reference line, which is made variable. This invention makes it possible for the operator, through a simple control selection, to vary the elevation horizontal reference line in altitude until it appears to intersect the target, there being simultaneously available a height indication corresponding to the position of the horizontal (in space) reference line.

(4) The height finding adaptation is preferably adapted for use with the circuit of copending applications:

(a) "Cursor Line and Map Generator" by David J. Green et al., Serial No. 222,511, filed April 23, 1951, now Patent No. 2,862,202.

(b) "Doubly Variable Signal Comparison Method and Apparatus for Generating Pulses Representing a Cursor Line" by Lawrence Michels, Serial No. 484,997, filed January 31, 1955, now Patent No. 2,887,681.

The application of Green et al., referenced as (4)(a) above, introduces the basic technique for electronically simulating glidepath and course lines for precision display; and the application of Lawrence Michels, referenced as (4)(b) above, describes an improved technique allowing a circuit simplification, which is somewhat less sensitive to noise and transients.

(5) "Periodic Reference Signal Modulation Method and Apparatus for Representing the Position of a Device" by Thomas J. Johnson, Jr., Serial No. 488,795, filed February 17, 1955, where an improved technique is introduced for remoting antenna position-indicating signals from the scanning location, which is near the runway, to the operator's location which may be referred to herein as an indicator group. The technique of this copending application is preferred in the practice of the present invention due to the simplification it allows without any loss of efficiency and accuracy. A subcombinational aspect of this position-representing technique is covered in:

(a) "Fast Acting Bipolar Sampling Circuit" by Thomas J. Johnson, Jr., Serial No. 492,507, filed March 7, 1955, now Patent No. 2,840,707; where a sampling circuit is described which is utilized in the decoder of the indicator group to translate the modulated antenna reference signals into corresponding continuously varying voltage levels representing the position of the respective antennas.

(6) "Variable Range Marking Circuit with Signal Modulation for Display Identification" by Lawrence Michels, Serial No. 489,360, filed February 21, 1955, now Patent No. 2,937,339. The method of range mark modulation introduced here makes it possible for the operator to switch from one display to another similar display, at a different range, without any confusion as to which display he is viewing. In general the technique provides distinct range mark line patterns so that a long-range search display can easily be distinguished from a short-range display without counting the number of range mark lines and checking to determine the setting of the range marking circuit.

(7) "Radar Scanning System" by Stein et al., Serial No. 506,696, filed May 9, 1955; where the antenna structure and control means are described and claimed. The invention described in this copending application relates to the scanning control mechanism which allows the utilization of the azimuth antenna for a search operation during which it is rotated through 360°, providing information which may be displayed on a P.P.I. pattern, as well as a precision operation at the operator's selection. This application also describes the means by which the entire antenna structure may be rotated without disturbing the absolute reference which is needed in order to maintain the search or P.P.I. display in terms of absolute coordinates.

(8) "Expanded Presentation Produced with Logarithmic Sweeps" by H. G. Tasker et al., Serial No. 175,168, filed July 21, 1950, now Patent No. 2,737,654; where circuits are shown for generating logarithmic range marks which may be utilized for a combined azimuth and elevation indicator display (AZ–EL). This type of range mark display is utilized in the present system for the 10 mile precision approach display.

(9) "Single Scope Two Coordinate Radar System," Patent 2,649,581 to Tasker et al. This patent relates to the basic concept of the combined azimuth and elevation two coordinate display on the same indicator tube. The general switching techniques which are employed in this patent are incorporated herein for reference and are shown in general form in the present drawing but are not specifically described.

(10) Patent 2,483,644, to Kelsey et al., for "Electronic Angle Indication with Particular Reference to Radar Systems." This patent introduces the basic concept of the strobe marking circuits which are employed herein for indicating the azimuth and elevation angle ranges in the non-scanning coordinate direction.

(11) Patent 2,698,401 to Korelich for "Direct Reading Range Mark Circuit." This patent teaches a technique for allowing the shifting of the range marking lines with respect to the indicating surface of the cathode ray tube in order to allow the positioning of these lines in proper reference to the point of touchdown in the precision display.

Accordingly, it is an object of the present invention to provide an improved ground-controlled approach system where versatility is achieved without the necessity of a complexity of structure, duplication being avoided wherever possible.

Another object is to provide a radar scanning system where the same circuits and mechanism may be utilized for surveillance, precision approach, taxi and height-finding operations.

A further object is to provide an aircraft guidance system which is of a tactical size and can be readily and accurately relocated and reoriented with a minimum of trouble and time.

Still another object is to provide a radar guidance system which may be employed by a single operator to locate aircraft by means of a searching operation; to orient the scanning equipment properly with respect to an available landing strip; to guide the aircraft to the precision angular range; and, finally, to aid the aircraft in its precision approach.

A more specific object in this respect is to provide a GCA system where a remote antenna scanning arrangement may be controlled by an operator at an indicator station in a manner allowing: a PPI surveillance; mount reorientation of the scanning device for proper alignment with an available runway; guidance of the aircraft to the precision vicinity of the runway; switching to the precision approach operation for landing; and control of the aircraft during the taxi on the runway, all of the various phases utilizing the same equipment, and the control information being available on the same cathode ray tube display device.

Yet another object is to provide an aircraft guidance system which may be employed in the alternative as a height-finding device, the high altitude scanning which is available being also useful for helicopter precision approach.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a perspective view of a typical multiple runway installation where a transmit-receive group of apparatus is remotely located near the runway and an indicator group and operator are shown removed therefrom;

Fig. 2 is a composite set of display diagrams representing the various operations which may be controlled from the indicator group, the figure being divided into sections A and B respectively showing surveillance and precision displays, and taxi and height finding displays;

Fig. 3 is a block diagram of the transmit-receive group and indicates the signals which are remoted to and from the indicator group;

Figure 5:
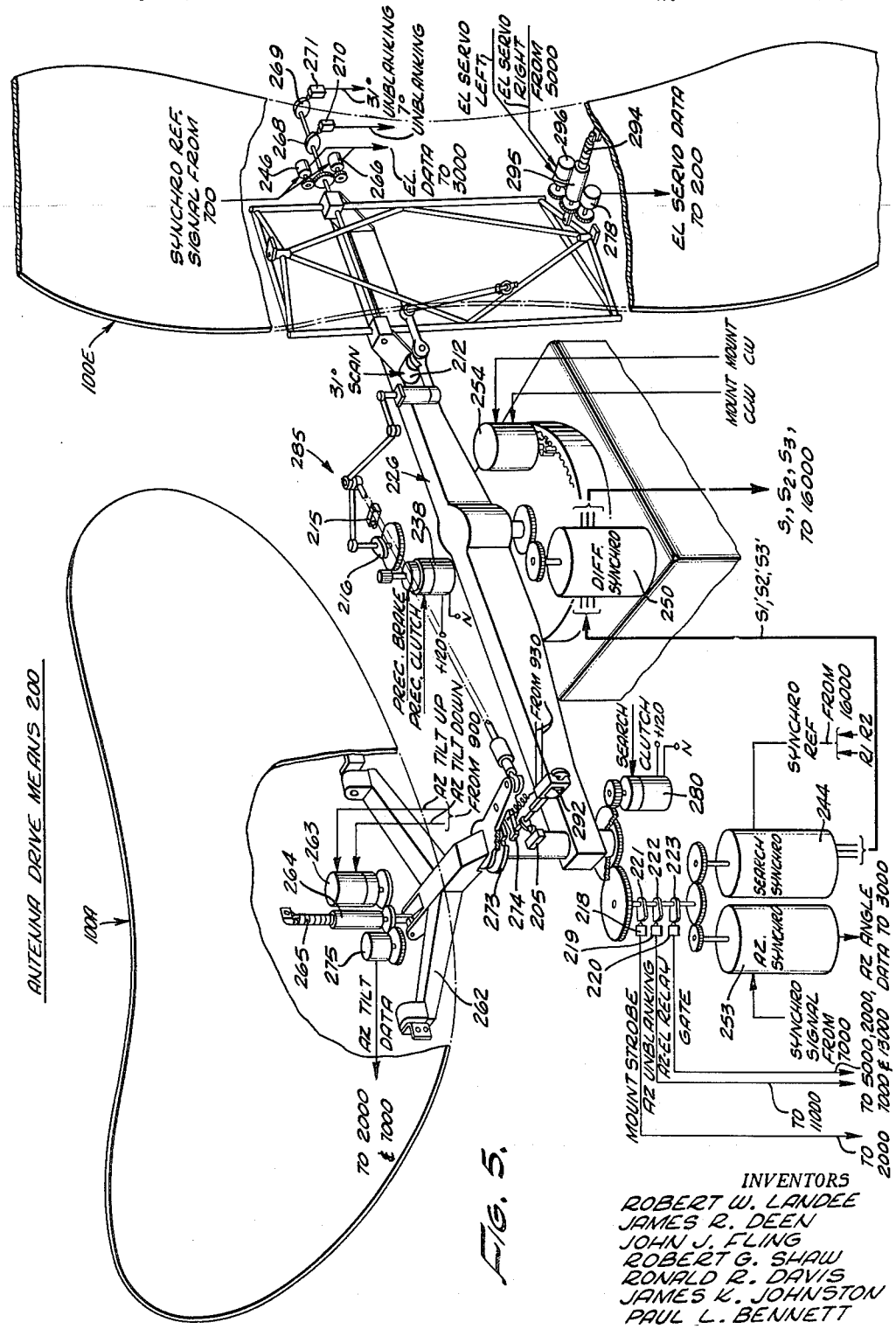
Figure 6:
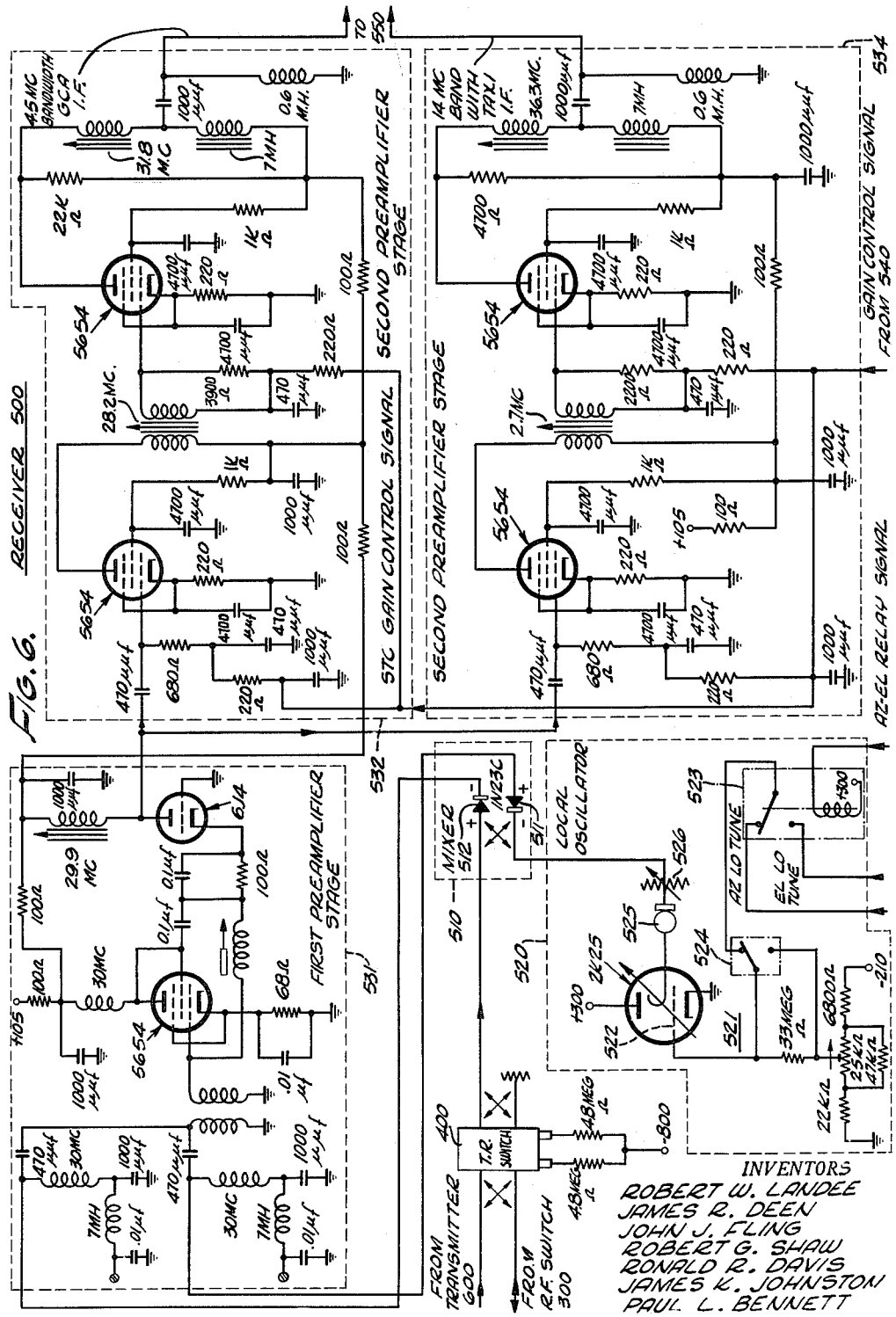
Figure 7:
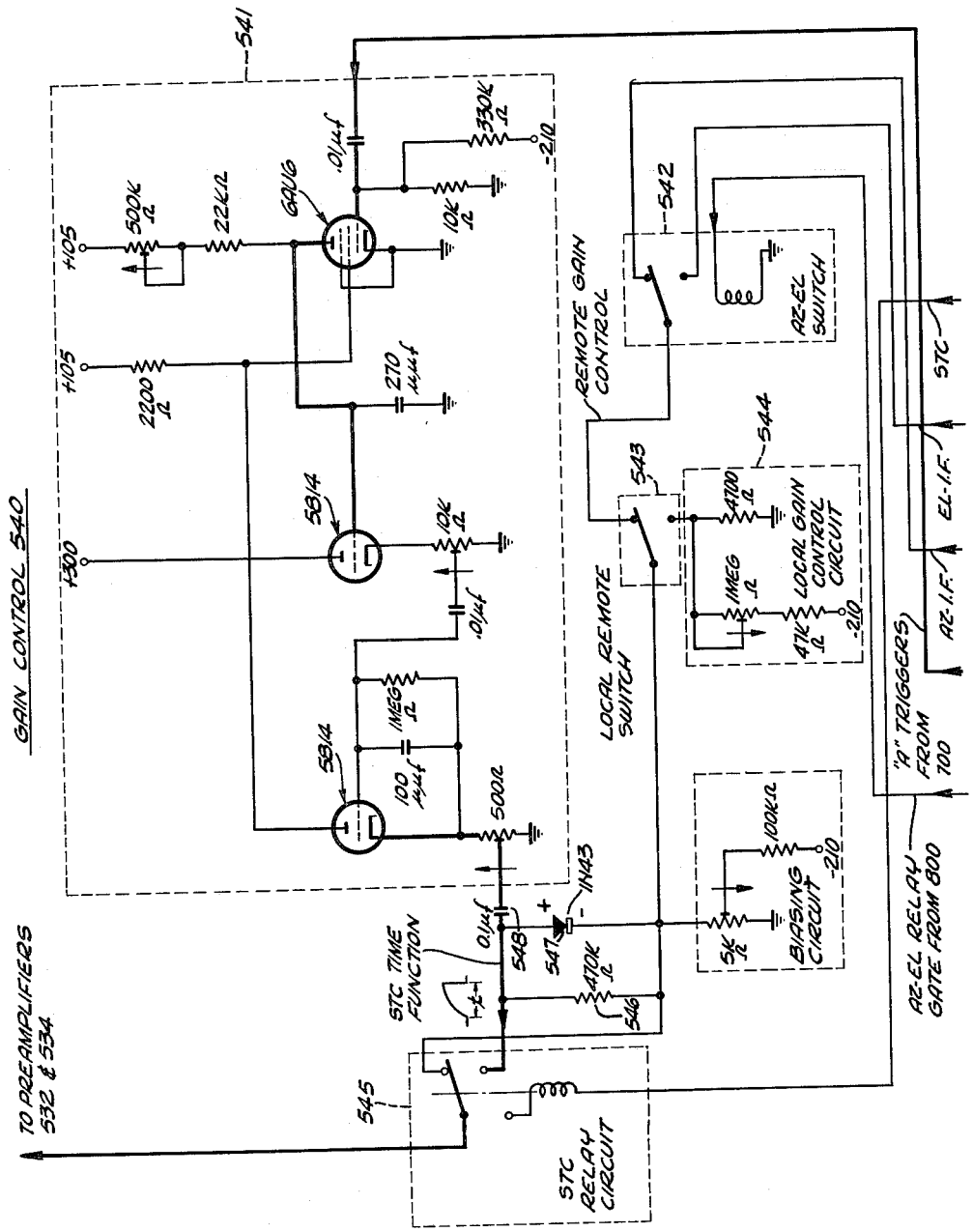
Figure 8:
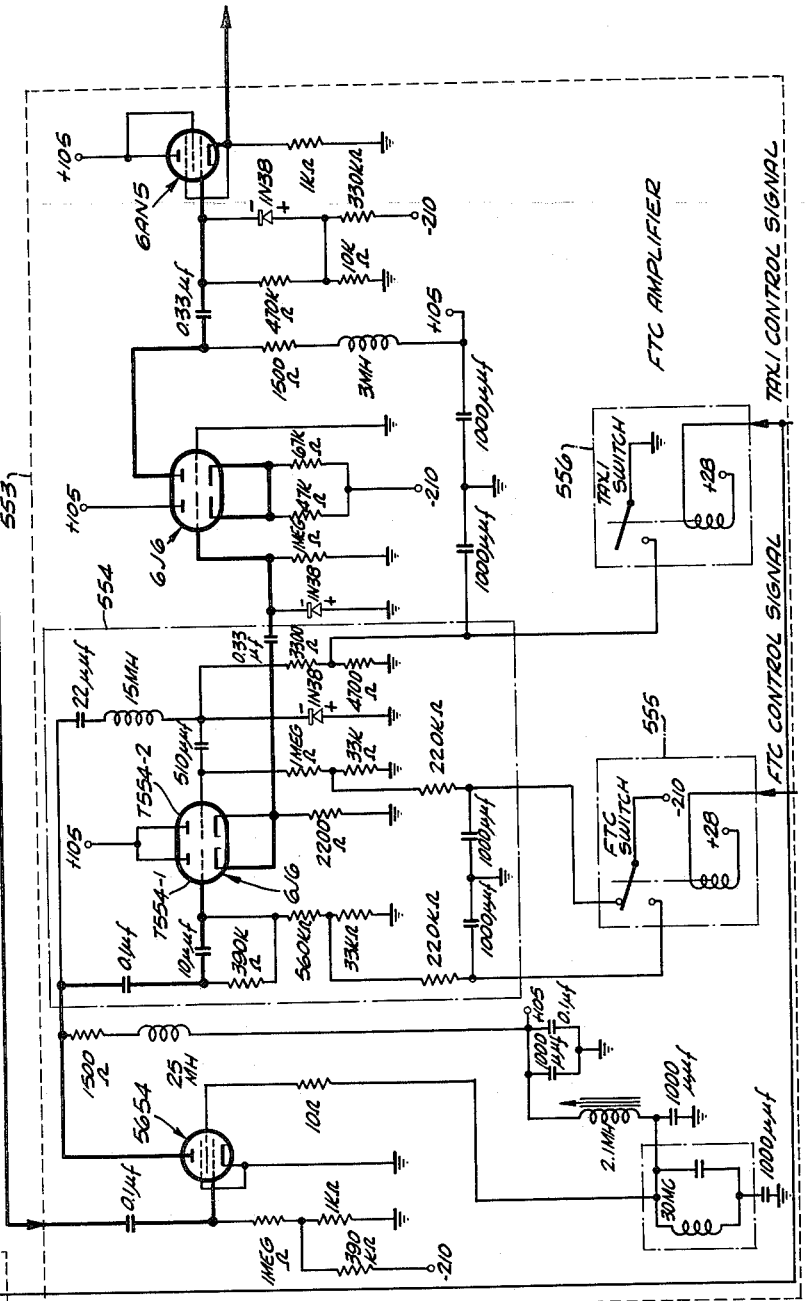
Figure 9:
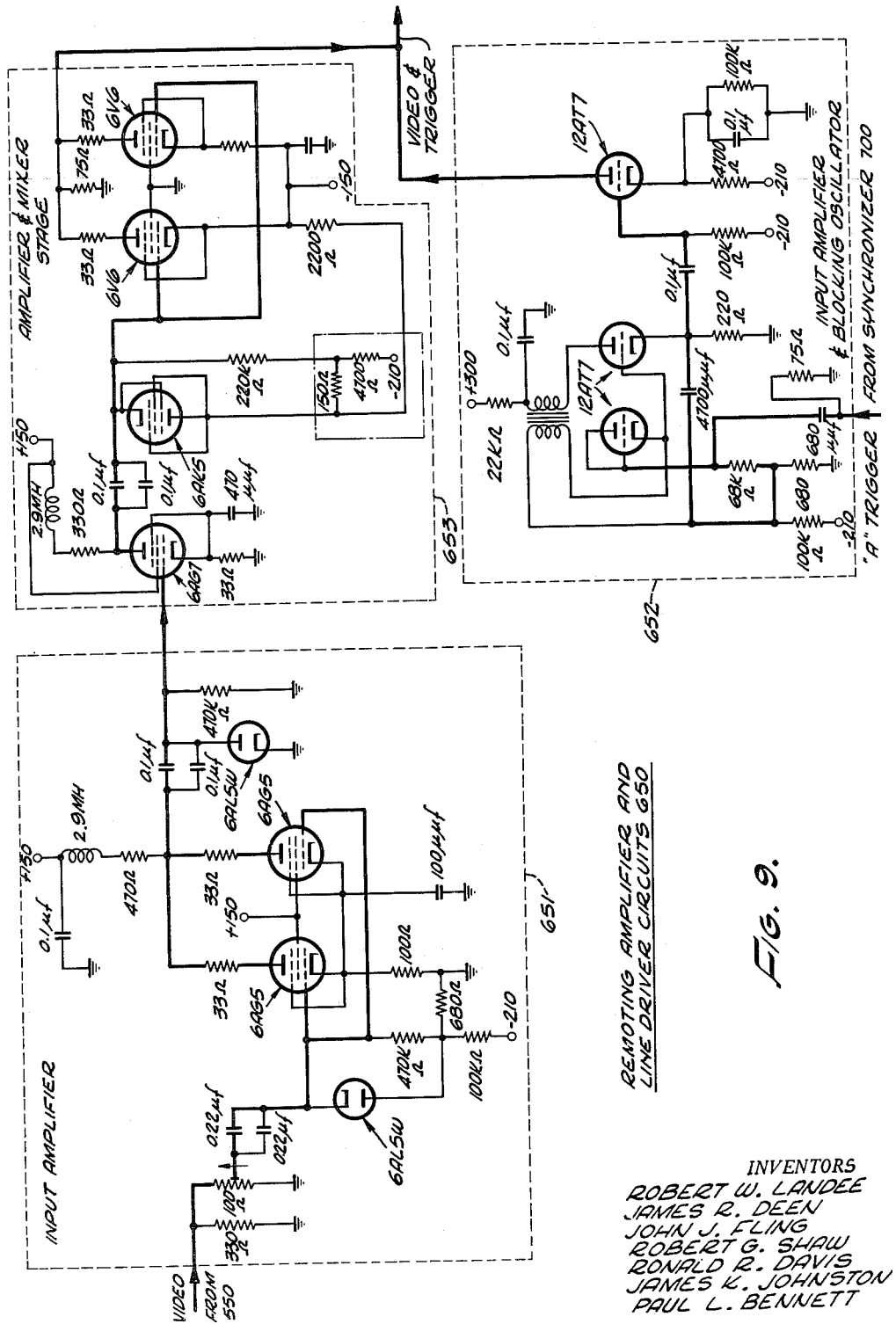
Figure 10:
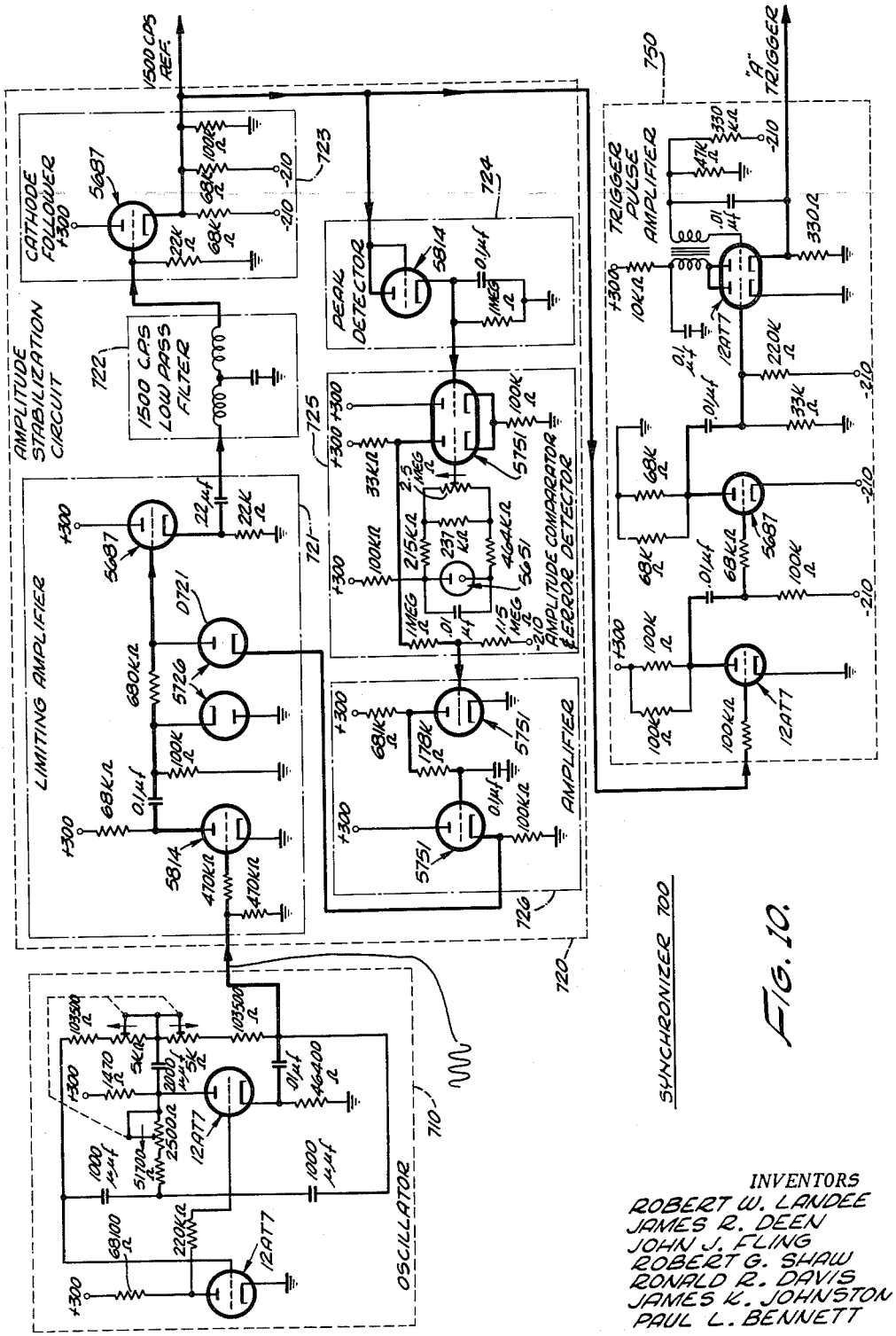
Figure 11:
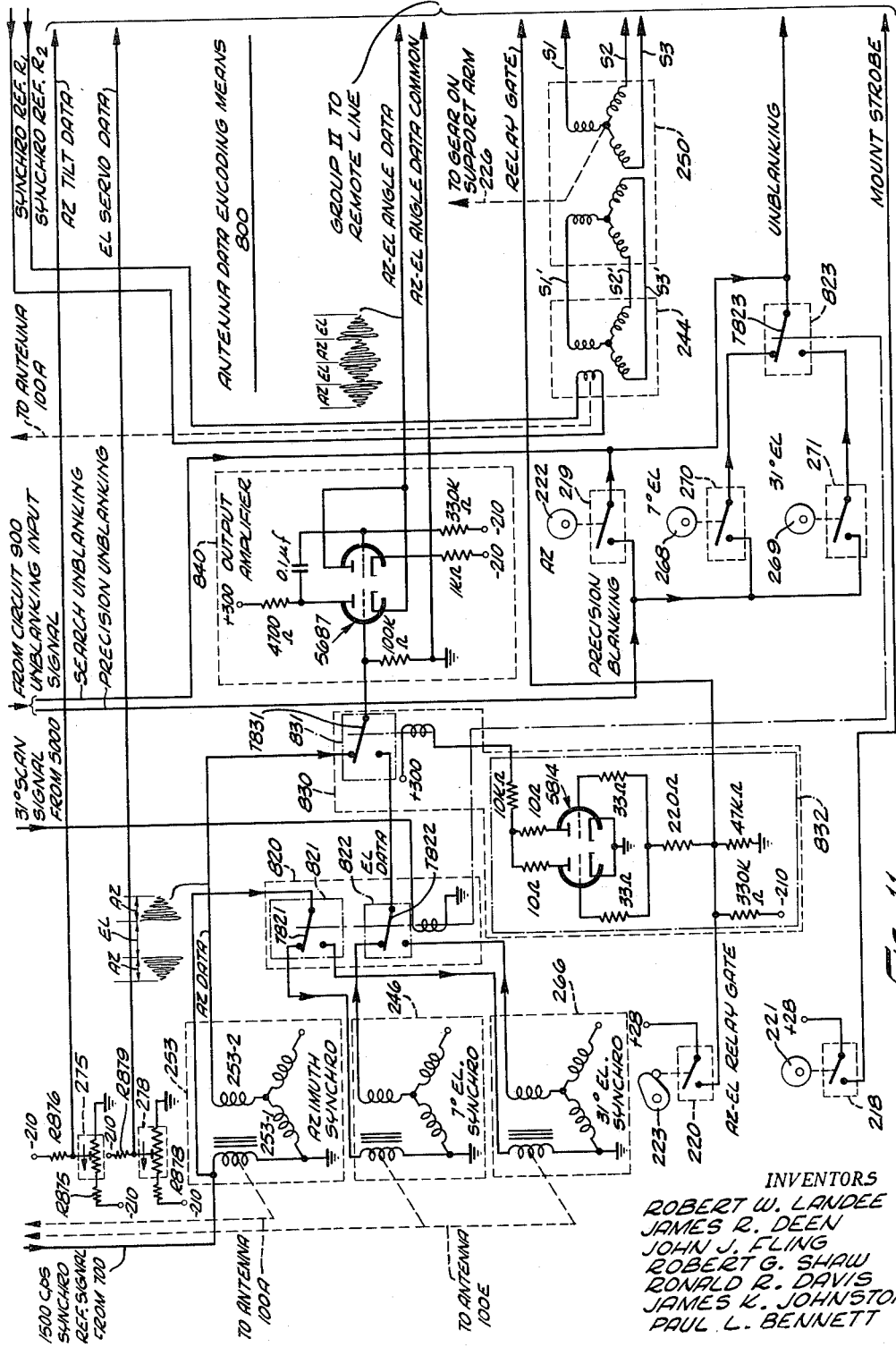
Figure 12:
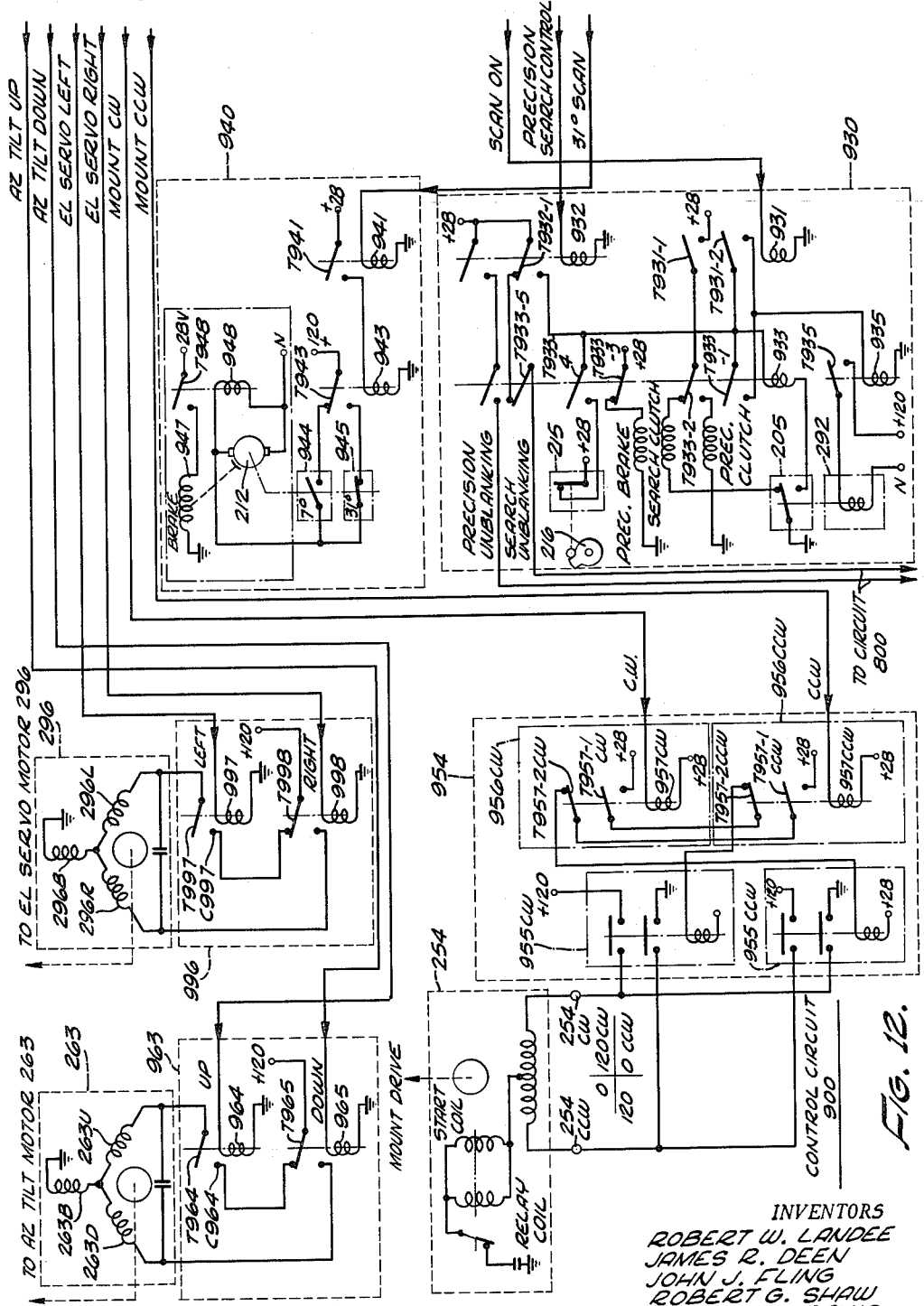
Figure 13:
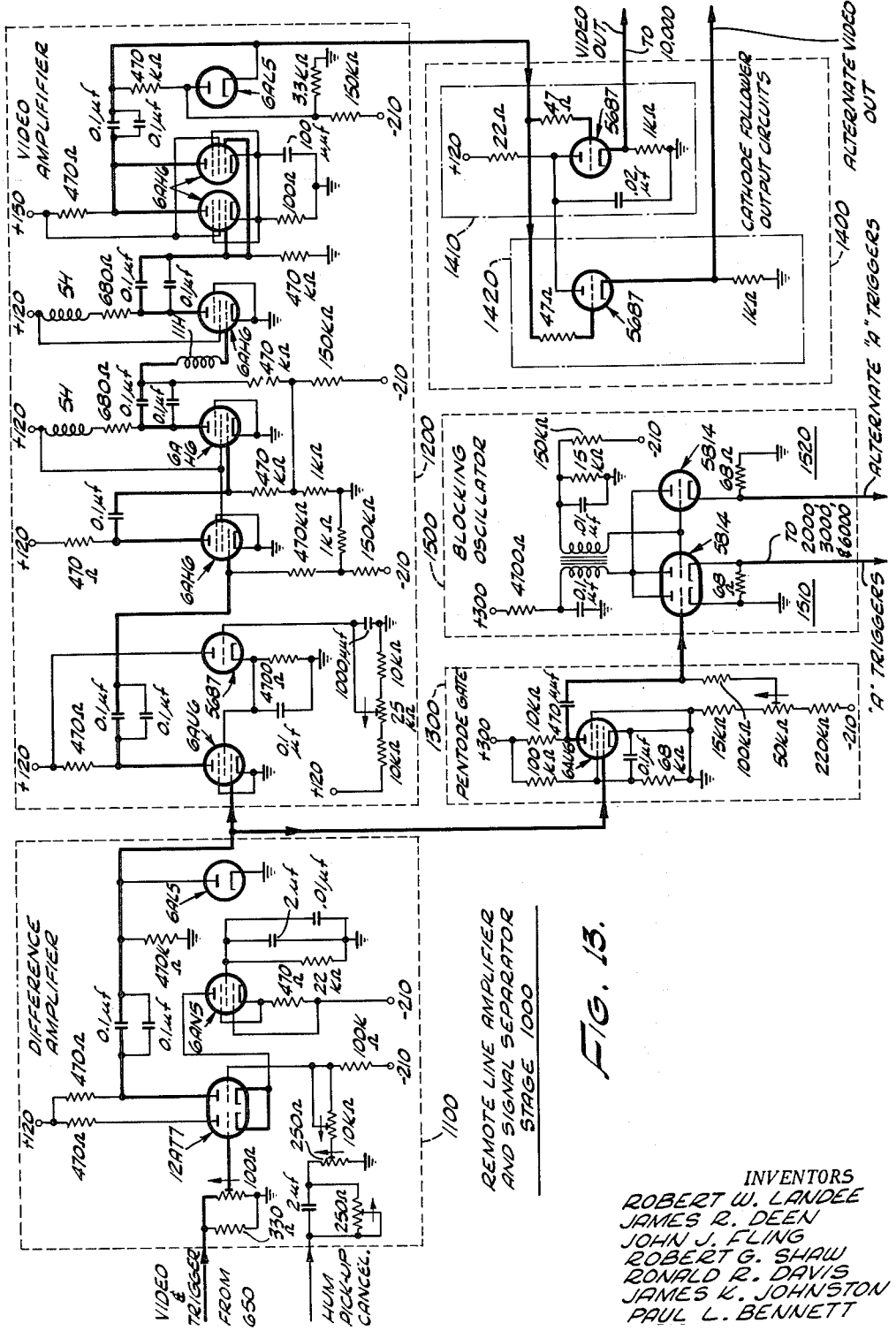
Figure 16A:
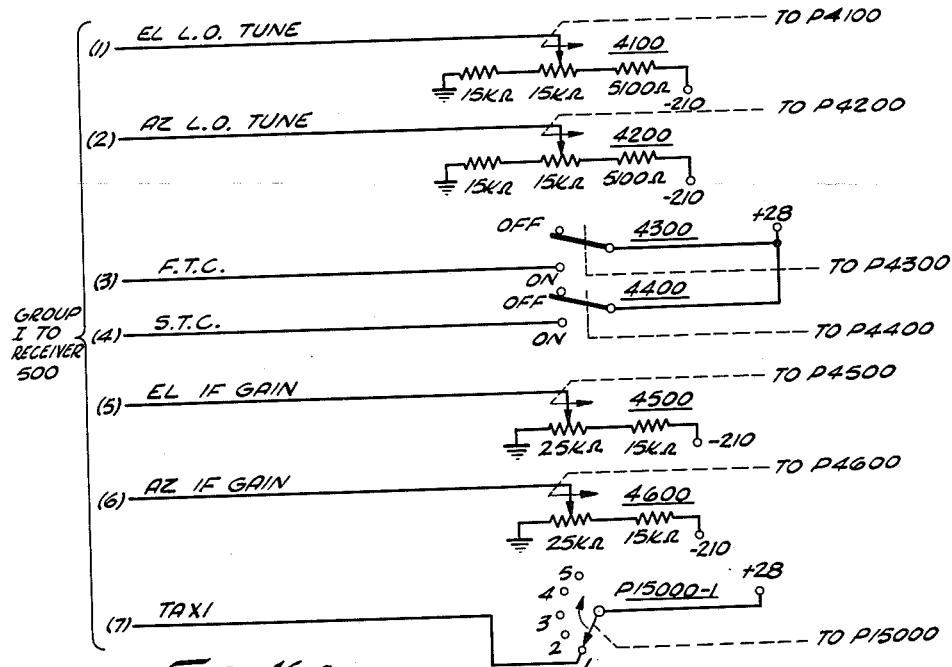
Figure 16B:
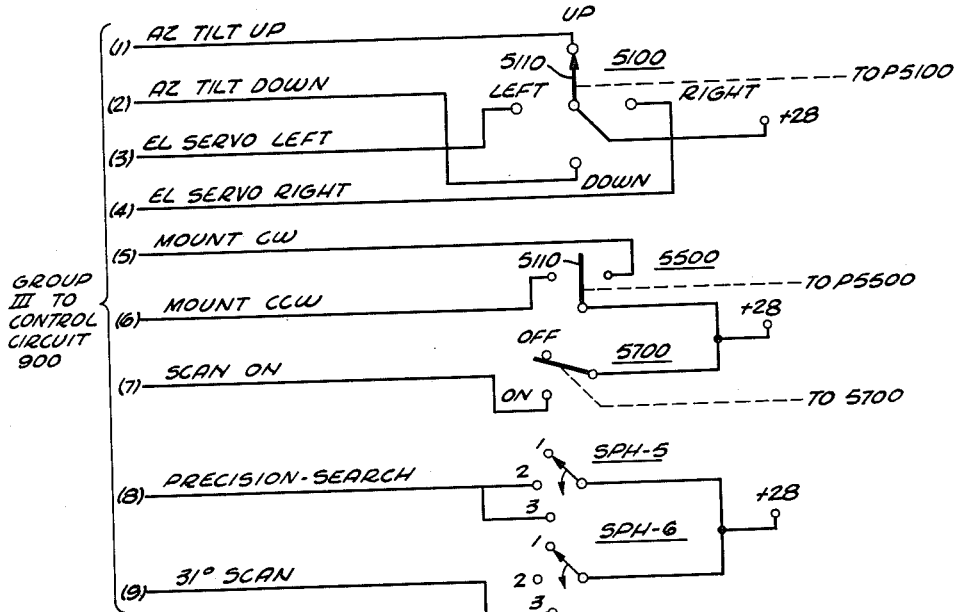
Figure 19:
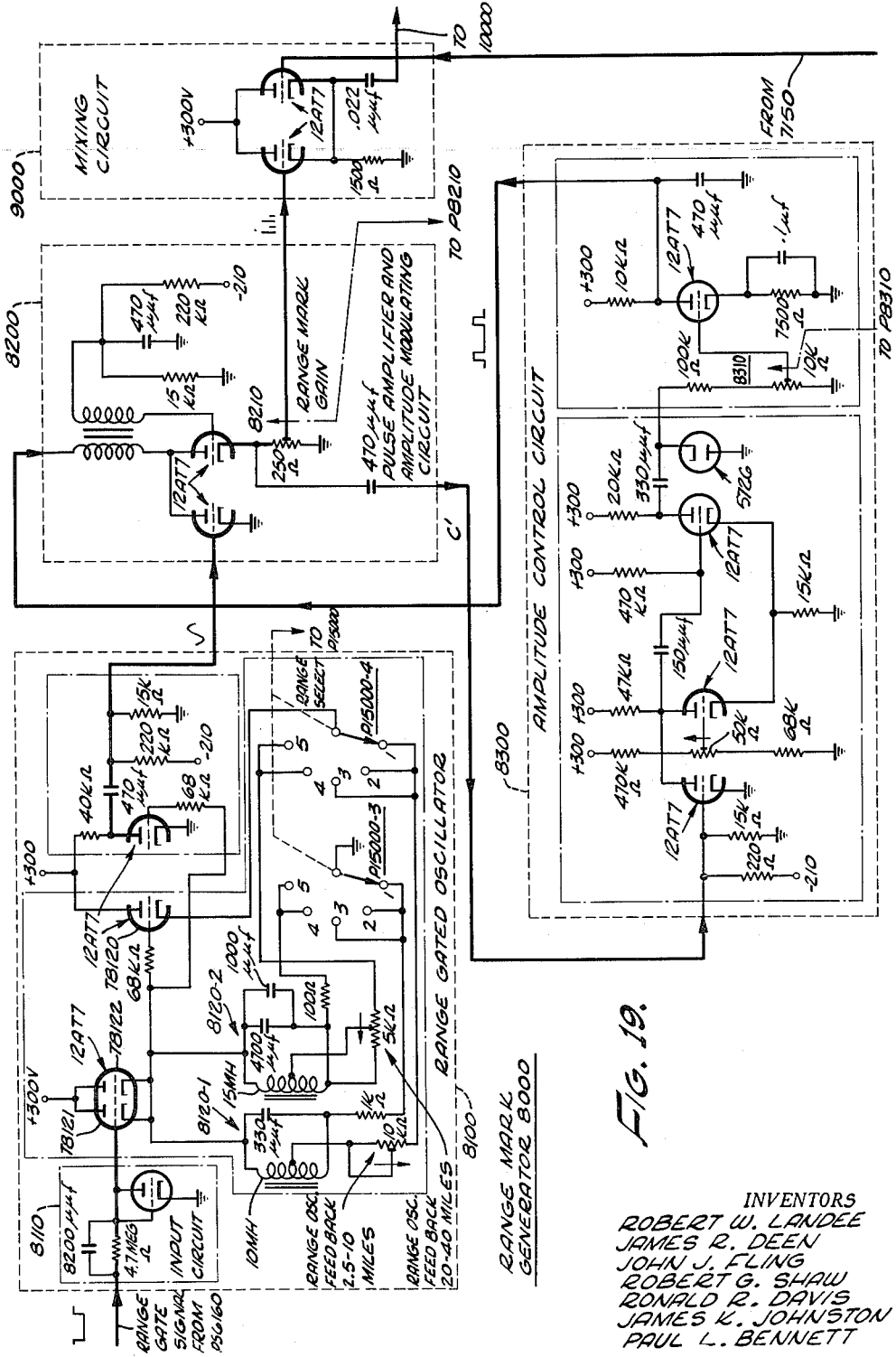

Figs. 4a and 4b together form a block diagram of the indicator group and show the various signals which are remoted to and from the transmit-receive group to allow complete control by the operator through the control panel therein;

Fig. 5 shows a specific mechanism suitable for antenna drive means 200 in the transmit-receive group of Fig. 3;

Fig. 6 shows a suitable schematic circuit arrangement of mixer 510, local oscillator 520 and preamplifier 530 forming part of receiver 500 in the transmit-receive group of Fig. 3;

Fig. 7 shows a suitable schematic form of gain control circuit 540 forming part of receiver 500;

Fig. 8 shows a suitable schematic arrangement of IF and FTC amplifier 550 in circuit 500;

Fig. 9 indicates a schematic arrangement with a suitable type of remoting amplifier and line drive circuit 650 in the transmit-receive group of Fig. 3;

Fig. 10 is a schematic arrangement of a suitable form of synchronizer 700;

Fig. 11 is a schematic illustration of one form of antenna data encoding means 800;

Fig. 12 is a schematic arrangement of one form of control circuit 900;

Fig. 13 illustrates a suitable schematic arrangement of remote line amplifier and signal separator 1,000 forming part of the indicator group of the invention shown in Fig. 4;

Fig. 14 illustrates an appropriate schematic form for the strobe marking circuit 2,000 in the indicator group;

Fig. 15 illustrates a suitable form for decoder 3,000 in the indicator group;

Fig. 16a illustrates a suitable from for receiver control signal generating circuit 4,000;

Fig. 16b illustrates one form of antenna control signal generating circuit 5,000;

Fig. 17 illustrates a suitable arrangement of trigger delay circuits and range gate generator 6,000;

Figs. 18a, 18b and 18c together form a schematic diagram of one arrangement of cursor generator 7,000;

Fig. 19 shows one form of range mark generator 8,000 and a suitable form for mixer circuit 9,000;

Fig. 20 is a schematic diagram of one form of video amplifier 10,000, intensity gate circuit 11,000, and intensity control circuit 12,000;

Fig. 21 shows suitable schematic arrangements for vertical deflection amplifier 13,000 and for horizontal deflection amplifier 14,000;

Fig. 22 illustrates a typical arrangement of range sweep generator 15,000;

Fig. 23 shows a typical form for position control device 16,000; and

Figs. 24a and 24b show the upper and lower portions of operator's control panel P, respectively.

Reference is now made to Fig. 1 wherein a perspective view is shown of a typical ground-controlled approach installation employing the present invention. As indicated in Fig. 1, the invention comprises two principal groups, namely: a transmit-receive group, which includes the necessary radar transmitting and receiving circuits as well as scanning antennas and appropriate control means therefor; and an indicator group, which receives signals from and remotes signals to the transmit-receive group via appropriate buses.

In Fig. 1 four targets W, X, Y and Z are designated and will be referred to throughout the specification in order to illustrate the operation of the invention. Target W represents a plane which may be detected in search but which is beyond the range of the precision controlling operation and has not yet been directed to the proper runway area for precision approach. Target X represents a plane which has already been guided to the proper approach area and is being controlled for precision landing. Target Y represents a plane which has already landed and may be guided by the taxi operation provided by the invention. And target Z represents a helicopter which may be guided for landing during the last part of its descent by means of the extended elevation range which is provided in accordance with the present invention, for the height finding operation.

In addition to guiding a target such as W to a proper approach area, as has already been done for target X, the operator may determine the height of W after having made the necessary switch selection, as will be more fully described below. In addition, this height-finding operation may be performed during a precision approach, and thus the height of target X may be determined during its guided flight to landing.

GENERAL DESCRIPTION OF THE BLOCK DIAGRAM SYSTEM OF THE INVENTION

*(As shown in Figs. 3, 4a and 4b)*

The general arrangement of the transmit-receive group and indicator group are shown respectively in the block diagrams of Figs. 3 and 4. Before considering the general arrangement of these groups it is helpful to point out the reference numbering convention employed herein so that the reader may readily determine the specific form of circuits or mechanisms which are utilized in the basic components shown.

The first thing to note is that any structure in the transmit-receive group is given a reference number which is less than 1,000, whereas the structures in the indicator group have reference numbers which are greater than 1,000. Any subcomponents which are included within a block, representing a major component, are given the highest place reference digit of the block and then may be distinguished by the variations in the lower place digits. Thus any subcomponent utilized in antenna drive means 200 shown in Fig. 3 has a reference number in the 200 series. In a similar manner, further divisions within the components of the indicator group are given the higher place digit of the superior component.

In addition, an attempt has been made to allow a convenient reference to the specific description of the above-mentioned copending applications by incorporating the reference numbers of these copending applications within the major reference digit of the same component in the present specification, wherever it is possible. Thus decoder 3,000, shown in the indicator group block diagram of Fig. 4, includes a phase-shift control circuit 3,600 which further includes a band pass filter 3,610, and amplifier 3,620, a phase shift circuit 3,630, and an output amplifier 3,640, corresponding to the similar components shown in Fig. 3 of the above-mentioned copending application by Thomas J. Johnson, Jr., Serial No. 488,795.

It is believed that the clear reference to the applicable copending application as well as to the patents which are relevant makes it unnecessary to dwell herein to any great length in considering the operation of these components. Therefore, an attempt will be made to limit the description herein to the system concepts involved with a brief functional description of the corresponding components, in order to indicate how they are incorporated into the system rather than to indicate the particular theory of their respective operations and structures.

Referring now again to Fig. 3, it will be noted that the transmit-receive group includes elevation and azimuth antennas 100E and 100A, respectively. These antennas are controlled through the various scanning operations by means of an antenna drive means 200 which is shown in further specific detail along with the antenna structure in Fig. 5.

It may be noted that the block diagrams of Figs. 3, 4a and 4b include references to the relevant schematic diagrams in the other figures, in corresponding blocks. Accordingly, hereafter it will be considered unnecessary to indicate where the specific detailed structure of a component may be found.

Antenna drive means 200 is also mechanically connected to a radio frequency switch 300 which is designed to provide the desired microwave switching between the elevation and azimuth antenna waveguides during the precision operation. Radio frequency switch 300 is not shown in specific detail herein since it may be of the same type shown in Fig. 7 of the above-mentioned patent to H. G. Tasker et al., No. 2,649,581. Furthermore, the general sequence of the azimuth and elevation (AZ-EL) operation as well as the necessary switching which is required will not be considered in great detail herein since they are amply covered in the Tasker et al. patent and form no part of the present invention.

The radar signals which are received and pass through switch 300 are then applied to microwave duplexers 400 which may include the well-known TR switch providing a two-way operation for reception and transmission, where a receiver 500 is operative through switch 300 part of the time, and a transmitter 600 passes signals through duplexers 400 and switch 300 to the antennas part of the time.

Transmitter 600 will not be considered in further detail herein since its function is conventional in all respects and is not electrically modified in order to allow the special operation of the invention. Receiver 500, on the other hand, is shown in specific detail in order to point out the circuit techniques which are employed for the taxi operation, wherein an automatic frequency time control (FTC) is effected and other circuits are shown which allow the operation to select a predetermined sensitivity time control (STC), as will be explained.

As indicated within block 500 the receiver may include a mixer 510 which receives input signals from duplexers 400, and also local oscillator signals produced by a circuit 520, and then produces an intermediate frequency output signal which is applied to a preamplifier stage 530.

Preamplifier stage 530 is controlled in accordance with the gain signals of a gain control circuit 540 and also in accordance with a taxi signal which determines the bandwidth of the signals which are passed through to an IF and FTC amplifier stage 550, providing video output signals representing a target.

These output signals are applied to a remoting circuit 650 which also receives trigger signals produced by a synchronizer 700; circuit 650 then produces composite video and trigger signals which are applied to a remoting line and sent therethrough to the indicator group for appropriate display, as will be explained below.

Synchronizer 700 produces the system trigger signals which actuate transmitter 700, and in addition provides an accurately stabilized reference signal having the same frequency as the trigger pulse frequency which is applied to an antenna data encoding means 800. In encoding means 800 antenna position signals are converted into modulated periodic reference signals of the trigger pulse frequency. It may be noted here that synchronizer 700 and part of data encoding means 800 are shown in the above-mentioned copending application by T. J. Johnson, Serial No. 488,795, where the specific technique of angle data encoding is introduced.

Antenna data encoding means 800 also receives a precision-search control signal which is remoted from the indicator group, and has a plurality of other functions related to deriving electrical signals representative of various conditions in elevation and azimuth antennas 100E and 100A which are coupled to the various means therein.

Antenna drive means 200 is controlled through a control circuit 900 in accordance with a set of remoted signals received from the indicator group. The signals which are remoted to and from the transmit-receive group shown in Fig. 3 are arranged in three principal groups I, II and III relating to receiver 500, antenna data encoding means 800, and control circuit 900, respectively. Considering first those associated with receiver 500 in group I, it is noted that the following signals are included, an appropriate definition being associated with each signal:

I. RECEIVER CONTROL SIGNALS (1) EL L.O. Tune—This is a variable voltage signal which is applied to local oscillator 520 and controls the tuning thereof during elevation scanning.

(2) AZ L.O. Tune—This is similar to the elevation local oscillator tuning signal for the azimuth scanning time period.

(3) F.T.C.—This is a frequency time control signal which is either on or off in accordance with the operator's desire to have the fast or normal time constant circuit in the IF amplifier stage 550.

(4) S.T.C.—This is a sensitivity time control signal allowing the operator's on or off selection of a gain modifying function provided by sensitivity time control circuit 540.

(5) EL IF Gain—This is a variable voltage signal which may be selectively combined with the sensitivity time control signal produced by circuit 540 and utilized to control the gain of preamplifier 530.

(6) AZ IF Gain—Similar to the elevation IF gain signal allowing a different operator's selection for the azimuth scanning operation.

(7) Taxi—This is a control signal which is either on or off at the operator's selection and may be utilized to actuate certain switching functions in IF and FTC amplifier 550 in order to allow a broadened bandwidth for the taxi operation as well as an automatic FTC control so as to eliminate the effect of ground clutter at short ranges.

II.

The following signals are produced by data encoding means 800 and represent various antenna data as follows:

(1) AZ Tilt Data—This is a voltage signal which indicates the degree of the azimuth antenna rotation in elevation with respect to a predetermined reference.

(2) EL Servo Data—This is a voltage signal similar to (1) indicating the amount of elevation antenna rotation, postive or negative, in azimuth, related to a predetermined reference line.

(3) AZ–EL Angle Data—This is a modulated periodic reference signal having an envelope which indicates the variable positions of the elevation and azimuth antennas during their intermittent scanning operation for precision approach.

(4) Angle Data Common—This provides a reference, such as ground, for the angle information provided by the AZ–EL Angle Data signal, introduced in (3).

(5) AZ–EL Relay Gate—This may also be referred to as AZ–EL Switching Signal and has an on and off state during a precision operation corresponding to elevation and azimuth scanning, respectively.

(6), (7) and (8) are referred to as Synchro Signals S1, S2 and S3, respectively, and are derived from an azimuth antenna synchro providing useful information during the surveillance operation.

(9) Unblanking Signal—This is a composite signal indicating the non-scanning periods for the azimuth elevation antenna so that appropriate blanking may be controlled at the cathode ray tube in the indicator group.

(10) Mount Strobe—This is a microswitch signal which changes levels when the azimuth antenna passes a predetermined position referenced to the base and is utilized as a mark to indicate the position of the center line of the azimuth scanning for precision approach.

The following signals are on-off control signals which are applied to circuit 900.

III. ON-OFF CONTROL SIGNALS APPLIED TO CIRCUIT 900

(1) AZ Tilt Up—When this signal is on, a motor is actuated which rotates the azimuth antenna in elevation. In this manner the azimuth antenna may be positioned so that its beam encompasses the target during its scan in azimuth, either for surveillance or for precision approach.

(2) AZ Tilt Down—This is similar to the signal (1) and allows a control of the same motor for reverse rotation.

(3) EL Servo Left—This signal specifies that the elevation antenna is to be rotated in azimuth and has a similar function to the AZ Tilt signal above.

(4) EL Servo Right actuates the same motor as (3) in the opposite direction.

(5) Mount CW is a signal which specifies that the mount is to be rotated in a clockwise direction, allowing alignment for guidance to a different runway.

(6) Mount CCW specifies a mount rotation in the counterclockwise direction.

(7) Scan On is a master on-off control for all scanning operations.

(8) Precision-Search Control—This signal is defined as having an "on" state when the precision approach operation is to begin and otherwise as being in the "off" state. It will be noted that the definitions of the precision-search control signal and the AZ–EL relay gate signal have been selected so that when both signals are "off" the system is ready for surveillance operation; whereas when the precision-search signal is "on," the AZ–EL relay gate signal changes from "off" to "on" for azimuth and elevation scanning, respectively.

(9) 31° Scan—When this signal is on, it specifies that the elevation antenna is to be scanned through its larger or 31° scan, rather than the normal elevation 7° scan, which is specified in the absence of the signal. As pointed out above, the 31° scan may be utilized for a height-finding operation, or for guiding the vertical descent of a helicopter.

In addition to the above control and data signals, it will be noted that video and trigger signals are remoted from circuit 650; that a hum pick-up signal is remoted for cancellation at the indicator group; that one or more ground reference signals are remoted; and that two synchro reference signals, indicated as R1 and R2, are remoted to the encoding means 800 from the indicator group and specifically to the azimuth synchro therein, providing a reference for synchro signals S1, S2 and S3, introduced above.

The video and trigger signals provided by the transmit-receive group shown in Fig. 3 as well as in the hum pick-up are remoted to a remote line amplifier and signal separator stage 1,000 shown in block diagram form in Fig. 4 and in specific detail in Fig. 13. Stage 1,000 also has the function of providing a separation of "A" trigger signals corresponding to the system trigger signals developed by synchronizer 700 in the transmit-receive group and of amplifying the video signals.

The "A" triggers are then applied to a strobe marking circuit 2,000 which also receives the signals AZ Tilt Data, EL Servo Data, AZ–EL Angle Data; AZ–EL Relay Gate; Mount Strobe; Azimuth Center of Scan; and Precision-Search. Marking circuit 2,000 then is operative to convert this input data into an output signal for controlling the beam intensity of the indicator group cathode ray tube, referenced herein simply as tube CRT.

A suitable form for circuit 2,000 is shown in Fig. 14 and its operation will be generally described in connection therewith, reference for more specific details being also made to the above-mentioned copending application by Lawrence Michels (reference 2 above).

The "A" trigger signals derived through circuit 1,000 are also applied to a decoder circuit 3,000 which further receives AZ–EL Angle Data and Angle Data Common, the angle data signals being translated herein to a voltage variable signal having an amplitude representing the instantaneous position of the azimuth and elevation antennas during precision approach, or the position of the azimuth antenna alone during searching operation. The translated output signal is referred to herein as AZ–EL Angle Volts in order to distinguish it from the input signal although it will be understood that a current signal would serve as well.

It will be noted in Fig. 4 that the control signals required are provided by two separate circuits corresponding to the groups of signals I and III applied to receiver 500 and control circuit 900, respectively. Thus receiver control signal generating circuit 4,000 provides control signals in group I which are remoted to receiver 500, and antenna control signal generating circuit 5,000 provides signals in group III for controlling the various movements of the azimuth and elevation antennas through circuit 900.

It should also be noted here that some of the control signals are applied to circuits in the indicator group such as the Precision-Search signal applied to marking circuit 2,000. In this case it is not necessary that the signal be an electrical signal such as is required for the remoting operation but rather may be a direct mechanical connection by way of a rotary switch, for example. Accordingly, the term signal as utilized herein is intended to designate direct mechanical control as specified by the operator, as well as electrical control which may take the form, for example, of a +28 volt "on" signal suitable for operating a remote relay or an open circuit designating an "off" signal.

The "A" trigger signals are also applied to trigger delay circuits and range gate generator 6,000 providing delayed "C" trigger signals, as well as surveillance and precision sweep gates. In addition, two range gate signals are provided, one for beam intensity control and the other for controlling a range mark generator to be described.

The "C" triggers are delayed by an amount which is sufficient to allow various other display controlling circuits to be operative, after the "A" trigger signals. The delay provided by circuit 6,000 is made variable in order to properly adjust this delay. Hereafter, when the "C" triggers are referred to, it will be understood that the time base considered is referenced to a zero point on the display of tube CRT rather than to the actual radar or "A" trigger signals.

The "C" trigger signals are applied to a cursor generator 7,000 which also receives AZ–EL Angle Volts; the AZ–EL Relay Gate; and the 31° Scan signal, as well as certain other signals from the operator's control panel which is referenced herein as panel P. It may be noted again that these signals may be effected through direct mechanical switch control. As a convenient convention the various elements of panel P are referenced, where possible, with respect to the device which is controlled by the operator's action. Thus the various control selections which actuate the cursor generator 7,000 are referenced with numbers in the 7,000 series prefixed by the letter P.

Cursor generator 7,000 provides intensity controlling pulses which are generated during respective successive range gated intervals, each pulse having a time position in the respective range gated interval corresponding to a point on a predetermined glidepath or course line. In addition, means is provided in accordance with the present invention for varying the position of a horizontal flight path representing line until it intersects a target representing spot on tube CRT.

Fixed-length range gate signals G1 are produced by generator 6,000 and are applied to a range mark generator 8,000 which also produces intensity controlling pulses of the same general nature as the cursor pulses although spaced in time-positions representing range. Range gate signals G1 are initiated after a variable delay provided in circuit 6,000 so as to allow the shifting of the zero range mark line in the manner more fully described in the above-mentioned patent by Korelich (reference 11 above).

The range marking pulses and the cursor pulses are then combined in a mixer circuit 9,000. These intensity control signals then are utilized to control a video amplifier 10,000 which also receives the output signals provided by remote line amplifier 1,000. Amplifier 10,000 is shown by way of illustrative operation as being connected to the cathode of tube CRT, although other arrangements are possible.

The Unblanking signal received via a remoting line in group II is combined with a positive, variable length, range gate signal G2 produced by circuit 6,000, in an intensity gate circuit 11,000 providing a composite output signal which controls the blanking and unblanking of tube CRT. Signals G2 are initiated in response to "C" triggers so that the range gate signal produced thereby is properly positioned in time to turn on the beam of tube CRT for display.

This output signal then is applied to an intensity control circuit 12,000 which also receives the strobe gate signal produced by marking circuit 2,000. The control signal produced by circuit 12,000 then is shown as being applied to the grid of tube CRT and modifies the intensity thereof in accordance with the signals which are received.

It should be noted here that the cursor generator pulse provided by circuit 7,000, the range marking pulses provided by circuit 6,000, strobe signals produced by circuit 2,000 and the blanking signals derived through circuit 11,000 may be utilized in various combinations to control the operation of tube CRT. Thus the polarity of the signals applied to the cathode of tube CRT may be inverted and the same signals may be utilized as a control signal applied to the grid of this tube. Consequently, it will be understood that the particular arrangement of the circuits shown in Fig. 4 is not intended as a limitation of the invention but merely illustrates a general arrangement which is suitable.

In addition to being utilized in the control of cursor generator 7,000, the AZ–EL Angle Volts signal is also applied to a vertical deflection amplifier 13,000 controlling a magnetic deflection element on tube CRT. The signals produced by amplifier 13,000 then are utilized during the precision operation to provide the angle variable deflection such as may be employed in a "B" display.

The beam of tube CRT may be deflected for initial positioning in a horizontal direction by means of an amplifier 14,000. Amplifiers 13,000 and 14,000, it will be noted, both receive the Precision-Search signal and are controlled so that during searching operation they provide offcentering signals which allow the PPI display to be positioned in a manner allowing a centered view of an area of search referenced to an offcentered origin. During the precision operation amplifiers 13,000 and 14,000 are operated to allow a vertical deflection in accordance with the AZ–EL angle information and a horizontal offcentering signal which allows a variation in video information positioning.

The range sweeps of tube CRT are controlled by a range sweep generator 15,000 which receives the range gate signals produced by circuit 6,000 and drives a rotatable deflection element R associated with tube CRT, where this element may be a magnetic yoke.

Amplifiers 13,000 and 14,000 are set to provide the desired offcentering and deflection operation by means of controls which are derived through panel P. In a similar manner the operation of range sweep generator 15,000, as well as range gate generator 6,000 which controls it, are specified in accordance with signals received from panel P. As indicated above, the device in panel P which is utilized for a control is generally given a reference number corresponding to the associated circuit so that the reader may readily determine the control device on panel P which is involved.

It is impractical, however, to utilize the same reference number for panel P where several components are controlled as is the case for circuits 6,000, 8,000 and 15,000, which are all controlled by means of the same rotary range switch. In this case the panel control switch is referred to as P15,000 since most of the switching functions are performed in sweep generator 15,000.

Just as deflection amplifiers 13,000 and 14,000 have different operations during search and precision phases, range sweep generator 15,000 provides either search or precision sweep signals under the control of the search precision signal applied thereto.

Rotatable deflection element R on tube CRT is controlled through a yoke position control device 16,000 so that it may be utilized for either search or precision operation. During the searching operation control device 16,000 receives synchro signals S1, S2 and S3 remoted from the transmit-receive group which are utilized therein to develop a corresponding rotational control whereby element R is rotated in synchronism with the azimuth antenna, at the remote location. During this state of the operation tube CRT is operated as a conventional PPI device, and all target information is therefore referenced in polar coordinates. As pointed out above, however, the origin of the polar coordinates may be varied through the utilization of deflection amplifiers 13,000 and 14,000.

During the precision operation position control device 16,000 responds to the precision control signal applied thereto and automatically controls rotatable deflection element until it is aligned in a predetermined coordinate direction such as may provide a horizontal range sweep for a "B" display.

The general operation of the invention will be described by considering the manner in which guidance information may be relayed to targets W, X, Y and Z, and by indicating the function of the various major components which are involved as they are indicated in Figs. 3 and 4.

SURVEILLANCE OPERATION OF THE INVENTION

*(Reference being made to Fig. 1, displays (1) and (2) of Fig. 2A; and Figs. 3 and 4)*

Reference is first made to Fig. 2A, and in particular to the search display (1) therein, and to Figs. 1 and 3. The display shown is obtained when the operator's selection switch on panel P is in the search position and the range mark selection switch is set for 40 miles.

In this situation then the Precision-Search signal produced by circuit 5,000 of the indicator group is an "off" signal and control circuit 900 then actuates drive means 200 to disengage the elevation and azimuth antennas so that only the azimuth antenna is driven by a search control motor. The azimuth antenna then is rotated throughout a 360° scan corresponding to the conventional P.P.I. operation. At the same time then radio frequency switch 300 is positioned in an azimuth position and the AZ–EL Relay Gate signal is held in its low state indicating that an azimuth scanning operation is being performed. Thus antenna data encoding means 800 provides output signals which provide positional data relating only to the azimuth antenna.

Azimuth antenna 100A is rotated in search, and radar video information representing various targets such as W is received and passed through radio frequency switch 300 and microwave duplexers 400 to receiver 500. Since the operator may desire constant intensity radar echoes on the search display, he may actuate the STC switch to the "on" position with the result that circuit 540 operates and controls the gain of preamplifier 530 in accordance with a predetermined function. The operator may also adjust the azimuth IF gain and the azimuth local oscillator tuning at this time.

The radar video information which may relate to target W detected in search is then mixed in remoting circuit 650 with trigger signals produced by synchronizer 700, and the mixed signals are transmitted along with hum pick-up signals to remote line amplifier and signal separator circuit 1,000 at the indicator group. The video information is separated therein and applied to video amplifier 10,000 and modifies the beam intensity of tube CRT, accordingly.

As the azimuth antenna rotates throughout 360° in search, an azimuth search synchro forming part of data encoding means 800, is rotated with the result that synchro signals S1, S2 and S3 derived from the stator thereof are modulated correspondingly in amplitude providing an effective reference vector which rotates in synchronism therewith.

Referring to Fig. 4, then, it will be noted that signals S1, S2 and S3 are applied to position control device 16,000 mechanically connected to the rotatable deflection element R of tube CRT. It should be also noted that control device 16,000 receives the Precision-Search signal and includes internal switching which is operative during the precision operation for disconnecting the synchro signals S1, C2 and S3 and replacing these with a fixed synchro reference signal which will position deflection element in a predetermined coordinate direction which typically may represent range.

In this manner then video signals relating to target W are derived from azimuth antenna 100A and are utilized to control the beam intensity of tube CRT through video amplifier 10,000 after having been separated from the trigger signal in remote line amplifier and separator circuit 1,000. At the same time the proper P.P.I. range sweep length and time duration are controlled in range gate generator 6,000 and in range sweep generator 15,000 in accordance with the the operator's selection made at panel P; the resulting sweep signal controlling the rotatable deflection element or yoke. Effectively then, with the operator's selection switch in the search position the components thus far described may be considered to form part of a P.P.I. system where the rotational movement of the scanning azimuth antenna is synchronized with the rotational movement of the P.P.I yoke.

In addition to the conventional P.P.I presentation which is provided for the searching operation, several important additional features are provided so that the operator may guide a target, such as W, to the vicinity of an available landing strip while viewing the search display. Furthermore, provision is made whereby the operator may make changes in the range selection without there being any ambiguity as to which display is being presented.

The operator is continuously informed of the precision center line position for the azimuth antenna by means of a strobe line which is shown on the P.P.I. display, referenced as line AzCl. This strobe line is obtained by generating a strobe gate signal by means of a microswitch arrangement in encoding means 800 each time the azimuth antenna is rotated through its precision center line position referenced to the base. If the antenna mount is rotated at any time about its base the data signals S1, S2 and S3 are translated by means of a differential synchro forming part of means 800 so that the video information displayed is always referenced to absolute space.

This means that a rotation of the mount will cause the strobe AzCl to rotate a new position corresponding to the position of the corresponding line in absolute space. Since the operator knows the location of the runways by way of P.P.I position he may determine whether the line AzCl is properly positioned in alignment with an available landing strip.

The line AzCl thus provides the operator with guidance information that he may relay to the pilot of a plane, such as W. The target W then may typically be guided along a guided line path indicated in display (1), (although it does not form an actual part thereof), to the precision area in the vicinity of the strobe line.

If the operator knows by way of taxi information to be discussed below or through other means that the runway corresponding to the position of the strobe line AzCl is not available, he may rotate the antenna mount about its base by means of control signals Mount CW or Mount CCW, whichever is appropriate. This operation does not affect the PPI presentation but will rotate the strobe line AzCl until it is properly aligned with an available runway.

When the target W gets within the approach area, the operator may switch to an offcenter search display such as the 10 mile offcentered search display shown in A(2), allowing an expanded presentation. In this operation deflection amplifiers 13,000 and 14,000 function as static deflection amplifiers positioning the PPI origin point as desired. Deflection amplifiers 13,000 and 14,000 also are utilized in the precision operation as it is described below. It will be noted that a target W' is shown representing the position that the target W may occupy after having been guided in search to the approach area along the typical guidance path shown in display A(1).

The offcentered PPI display is made possible due to the fact that the video information which is available exists in a range interval which is greater than the sweep range of the centered display. Thus effectively part of the centered search display for 5, 10 and 20 mile search displays is not shown since the sweep reaches the end of tube CRT.

When the 5, 10 and 20 mile displays are offcentered to the edge of tube CRT, however, search information is available to the ranges 10, 20 and 40 miles, respectively, measured from the edge of tube CRT.

It will be understood, of course, that the particular range selection discussed herein is not essential to the invention, many other presentations being possible. It is an important feature of the invention, however, that the operator is provided with an offcentering control, where the circuits employed may also be utilized in a precision operation as is described below.

In view of the various range selections that may be made as well as the further variety in the offcentering control several of the range marker patterns would normally appear to be similar and might create some confusion in interpreting the display. Accordingly, range mark generator 8,000 is selected to provide a display identifying function which is more fully described in the above-mentioned copending application by Lawrence Michels, Serial No. 489,360 (reference 6 above).

The general function of this circuit will be described for both search and precision operations here since the operation of generator 8,000 is in no way affected due to the switching from the search to the precision operation.

The range mark technique employed is best illustrated by considering the specific operation which is provided by the illustrative circuits described below. These circuits are arranged to provide search range intervals measured along the radius of the PPI sweep assumed to be centered. Provision then is made for sweep intervals of 5, 10, 20 and 40 nautical miles in centered search. The 5, 10 and 20 mile sweep signals are actually 10, 20 and 40 miles in range gated duration, the amplitude of the sweep being of double range length. Thus the offcentering of the 5, 10 and 20 mile search displays provides a maximum of 10, 20 and 40 miles visible in search where the origin point of the PPI display is positioned at an extreme edge of tube CRT. The 40 mile search display, on the other hand, is not overdriven beyond tube CRT so that the offcentering of this display provides no additional video information.

The precision range sweeps then are started from the left hand edge of tube CRT and consequently are similar in length to the offcentered search displays so that the range sweep signals for 5, 10 and 20 miles of centered search correspond to 10, 20 and 40 miles of precision information, respectively.

With this arrangement there could be confusion between any displays which have nearly the same number of marks thereon such as a 5 mile display with 1 mile range markers and a 20 mile display with 5 mile range markers. In accordance with the invention therefore a range mark modulation technique is employed, suitable circuits therefore being fully described in the above-mentioned copending application by Lawrence Michels, Serial No. 489,360 (reference 6 above). According to this technique certain range marks are modulated in intensity in the short range intervals, such as 5 or 10 miles. In the specific circuits shown herein the intensified marks occur at 2 mile intervals, as is illustrated in displays (2), (3) and (4) of Fig. 2A.

The convention, then, is to modulate the even-mile markers in the 5 and 10 mile displays, where the basic marker employed is a 1 mile marker; while the marks in the 20 and 40 mile displays are not modulated, and are even-intensity 5-mile markers. Consequently the operator is immediately provided with a distinguishing pattern identifying short and long range intervals. Two range intervals having the same pattern are readily distinguished by the considerable difference in the number of lines therein, the difference being a factor of two.

In referring to display (1), then, it is readily determined, without counting the number of marks, that this is either a 20 or 40 mile display with 5 mile markers. Since the number of markers is clearly more than four, the operator immediately recognizes this as a 40-mile display.

In a similar manner display (2) is recognized as one in the short-range class, where either 5 or 10 mile scanning is employed. However, since the display is a search offcenter display, the operator recognizes that twice the number of modulated marks are present so that a 10-mile offcentered search display includes twenty marks, ten of which are intensified at 2-mile intervals.

Another important feature available in the search display is the elevation of servo strobe referenced as Els in display (1), which identifies the azimuth position of the elevation antenna. The line Els informs the operator as to whether or not the elevation antenna will detect target information when the precision operation begins. This is noted by observing the proximity of the target in the search display, such as target W' in either display (1) or display (2) of Fig. 2A. If target W' is within the angular proximity included in the elevation beam width in azimuth, the operator is sure that the video information will be available in the precision operation to follow at his selection.

The line Els is obtained by comparing the Angle Volts signal derived through decoder 3,000, in the indicator group, with the EL Servo signal provided by encoding means 800, the comparison being performed in strobe marking circuit 2,000. Effectively circuit 2,000 provides a comparison operation where equality in amplitude between the azimuth portion of the AZ–EL Angle Volts signal and the EL Servo Data signal results in a pulse which occurs at the time during the P.P.I. 360° cycle that the radial sweep is positioned at the polar angle of the elevation antenna. The comparison pulse is then utilized to modulate the beam intensity for one sweep interval. Whenever the mount is rotated about the antenna base then line Els is rotated to its new position in the P.P.I. display along with line AzCl as pointed out above.

PRECISION APPROACH OPERATION (*Reference being made to displays (3) and (4) in Fig. 2A, as well as Figs. 1, 3, and 4*)

The operation now to be described relates to the guidance of typical target X, shown in Fig. 1, during a proper landing approach along predetermined glidepath and course lines, such as are represented in display (3), where the target echoes representing X are also shown. It will be noted that display (3) is referred to as a left-of-runway display whereas display (4) is a right-of-runway display. The positions left and right are defined from the point of view of the pilot as he approaches landing and refer to the position of the transmit-receive group relative to the runway of approach. Thus the target X is shown approaching runway rX, where the transmit-receive group appears to be to the left of the runway, and display (3) then represents the approach information. In a similar manner a target similar to X, referred to herein as X', may be guided to an approach on runway rX', by means of the guidance information provided in display (4), referred to as a right-of-runway display.

It will be noted that displays (3) and (4) are AZ-EL "B" displays where the abscissa or horizontal variable in the display is the range variable; the corresponding range marks running vertically; and the ordinate or vertical variable is antenna scanning angle, where the angle variation in the lower portion represents azimuth and typically varies from −15 to +15°, as indicated; and the upper portion of the display represents elevation where typically the scanning angle varies from −1 to +6°, as indicated.

The range variation is shown to be logarithmic over 10 miles, with the appropriate range mark modulation for display identification as discussed above. The logarithmic range variation provides an expanded view of the target as it nears the touchdown point referenced as Td in the display, and consequently provides a greater target resolution where it is most important. The linearity angle variation in elevation and azimuth ("B" display) is not a necessary feature of the invention although it allows a simplicity of circuits in accordance with the basic philosophy of the system. However, it will be understood that the partial P.P.I. sector display provided by H. G. Tasker et al. in the above mentioned patent may be employed, as well as other types of presentation.

In the precision operation control circuit 900 is actuated by an "on" Precision-Search signal which then causes the corresponding antenna drive means in device 200 to link the elevation in azimuth antennas together for intermittent scanning in their respective coordinate planes. As is more fully described in the above-mentioned patent by H. G. Tasker et al. the azimuth and elevation antennas scan intermittently substantially 90° out of time phase so that the same indicator tube may be time shared during the respective periods of operation.

During this AZ-EL scanning operation, then, radio frequency switch 300 is operative to allow the transfer of microwave energy from the elevation and azimuth antennas during their respective periods of scanning. These signals are passed to and from microwave duplexers 400 which operate in a conventional manner to allow transmission and reception during the azimuth and elevation scanning period. The operation of receiver 500 and remoting circuit 650 is the same as discussed above and will not be reconsidered here.

In a similar manner remote line amplifier 1,000 and video amplifier 10,000 function in a manner similar to that described above for the search operation in providing a video display on tube CRT; and range mark generator 8,000 and range sweep generator 15,000 operate in a similar manner although deflection element or yoke R is held in a static direction corresponding to range or abscissa coordinate of the display.

Range gate generator 6,000 provides a separate precision gate for range mark generator 8,000 so that the range marks may be positioned as desired in accordance with the disclosure of Korelich mentioned above as reference 11.

During the precision approach operation antenna data encoding means 800 has a dual function of providing composite AZ-EL angle data as well as other data relating to both elevation and the azimuth antenna separately. The AZ-EL Angle Data is obtained as before by modulating a synchronizing reference signal produced by circuit 700 in accordance with the respective antenna position. This modulation is achieved through separate resolvers or synchros during the precision approach operation and the separately modulated signals which are produced in this manner are then combined under the control of the AZ-EL Relay Gate which indicates which period of operation is involved, either azimuth or elevation.

As pointed out above the AZ-EL Relay Gate signal is defined so that it is in a low or unactuating state during the azimuth scanning and in a high actuating state during the elevation scanning.

In the precision approach operation the mount strobe indicating the azimuth center line is no longer needed and synchro signals S1, S2 and S3 are not employed. On the other hand, an unblanking signal is required which was not previously needed, where this signal indicates the periods between elevation azimuth scanning where the cathode ray tube is to be allowed to fly back or to be repositioned in accordance with the AZ-EL, two coordinate display, technique of H. G. Tasker et al. mentioned above. The Unblanking signal is obtained by combining separate unblanking signals derived from the elevation and azimuth antennas through associated microswitch and cam arrangements and may also include a search indicating signal which specifies that the cathode ray tube is to be continuously unblanked as far as the angle scanning is concerned.

During the precision operation the AZ Tilt Data signal as well as the EL Servo Data signal are remoted to strobe marking circuit 2,000, in the indicator group. These signals are compared, during respective scanning periods, with the AZ-EL Angle Volts signal which is derived through decoder 3,000. Strobe marking circuit then provides pulses which are applied to intensity control circuit 12,000 which intensifies one range sweep line or horizontal line in display B(3) at the corresponding angle. Thus the line marked AZT (AZ Tilt) in display (3) represents the center-line of the azimuth antenna in elevation. The operator may then utilize the AZ Tilt Up or AZ Tilt Down control signals to rotate the azimuth antenna in elevation, through the controlling action of circuit 900 and driving means 200, until the line is within azimuth beam width of the target. Thus in display (3) the line AZT passes through the target echoes X.

In a similar manner a strobe pulse is produced when the EL Servo Data signal is equal to the elevation portion of the AZ-EL Angle Volt signal and the elevation servo strobe line Els is marked on the azimuth part of display (3), marking the center line of the elevation antenna in azimuth. The operator may then adjust the position of the elevation antenna in azimuth until it is properly positioned with reference to the target by means of the control signals EL Servo Left and EL Servo Right, whichever is appropriate.

An important portion of the precision display is provided by the cursor lines marked Glidepath and Course as shown in displays (3) and (4). These lines are obtained by means of a series of intensifying pulses occurring during successive range sweeps, the pulses being produced by cursor generator 7,000. Generator 7,000 may be selectively operated to provide any of a plurality of cursor lines corresponding to a plurality of different approaches on different runways. In this manner then the operator is able to reorient the equipment by rotating the mount as explained above and then simply has to switch to the desired cursor site and guidance information is automatically provided in accordance with previously calibrated signals.

In addition, generator 7,000 is adapted to allow a simple switching from a left-of-runway control to a right-of-runway control so that the target X, for example, could be landed on runway rX' (then being referred to as target X'), where the antenna scanning device is to the right of the runway.

When the antenna is in the left-of-runway position as shown in display (3) and scanning is considered as increasing in angle in counterclockwise rotation, the course line appears in the upper half of the azimuth portion of the display starting from 0°, which is assumed to represent a scanning line parallel to the runway. The non-linearity of the cursor lines is due in part to the "B" type display and in part due to the use of a logarithmic range measurement. This non-linearity, however, causes no difficulty in the operator's control and the "B" display provides better target resolution at short ranges than the so-called partial PPI sector.

In a similar manner the course line in the right-of-runway situation as shown in display (4) exists only in the lower portion of the azimuth display between —15° and 0°, where again the 0° azimuth angle corresponds to an azimuth scanning angle parallel to the runway.

The general technique whereby the cursor line representing pulses may be generated is considered below, and a detailed description is found in the above-mentioned copending application by Lawrence Michels Serial No. 484,997 (Patent No. 2,887,681—reference 4b above).

In precision operation position control device 16,000 automatically positions the rotatable deflection element controlling tube CRT so that it is oriented in the desired range sweep direction which is assumed to be horizontal in displays (3) and (4). Range sweep generator 15,000 then operates in a similar manner as previously except that all of the range sweeps are horizontal, where a "B" type of display is contemplated. Horizontal deflection amplifier 14,000 then is employed to position the zero range points properly at the left-hand side of the screen or may be controlled as desired for a horizontal precision offcentering.

Vertical deflection amplifier 13,000 then receives the AZ–EL Angle Volt signal from decoder 3,000 and is utilized to move the beam vertically in accordance with the decoded angle information. In addition, amplifier 13,000 receives certain zero-setting vertical signals so that as one sweep is completed, such as elevation or azimuth, the beam is immediately switched to the zero or starting reference position for the following scan. It is during this period that the Unblanking signal prevents any display information from appearing on tube CRT.

From the description thus far it should now be apparent that the combined PPI and precision system provided by the invention makes an efficient and economical use of the components therein. The same range sweep amplifier, it will be noted, is employed for both PPI and the precision operation. Furthermore, the static or slowly operating vertical and horizontal deflection amplifiers are useful in both operations, allowing a convenient offcentering control for the search operation, as described above, as well as vertical angle control and horizontal offcentering for precision operation. In addition, the same radar video circuits and antenna structure are employed for both operations, all information being displayed on the same CRT.

As in the search operation the operator may have several range selections under his control through the operator's panel P. As an illustrative case it is assumed herein that the precision ranges which may be selected are 10, 20 and 40 miles. As pointed out above, the 10-mile range is made logarithmic in order to provide the best target resolution at the shorter ranges.

TAXI OPERATION

*(Reference being made to displays (1) and (2) of Fig. 2B as well as Figs. 1, 3 and 4)*

After a target such as X has been guided to the proper landing, the operator may then switch to a taxi operation which effectively is a short range PPI. A typical display of this type is shown in displays (1) and (2) of Fig. 2B wherein the dotted series of echoes referenced by Y correspond to the display of the target Y as it moves on the ground.

In the taxi operation an FTC (fast time constant) control may be effected so as to remove the greater part of the ground clutter echoes. This then provides the operator with a landscape view of the immediate vicinity and, as shown in displays (2) and (3), provides an outline of the runways.

The taxi operation also automatically changes the bandwidth of preamplifier 530 from a normal search bandwith which may be in the order of 4 megacycles to a broader taxi bandwidth which may be in the order of 14 megacycles, providing better close-range resolution.

In addition, the taxi switching operation provides a range sweep control allowing a sweep deflection variation in the range of 1 to 3 miles. It will be noted again that the 3-mile display includes an intensified 2-mile marker, in accordance with the display identification schedule mentioned above.

HEIGHT FINDING AND VERTICAL DESCENT OPERATION

*(Reference being made to displays (3) and (4) of Fig. 2B as well as Figs 1, 3 and 4)*

In addition to providing the operator with the ability to perform search, precision and taxi operations through substantially the same mechanisms and circuits, the invention also allows a height-finding operation with a minimum of additional equipment, the essential changes being made in cursor generator 7,000 by means of a height-finding adaptation therein, as is further described in the above-mentioned copending application by Lawrence Michels Serial No. 489,359 (reference (3) above). In addition, mechanism is provided in elevation antenna drive means 200 for allowing an expanded angle scan so that altitudes in the range of 5,000 to 50,000 feet may be measured. This expanded elevation scan angle also may find utility, as described below, in the guidance of a vertical descent by a target such as Z shown in Fig. 1, which is representative of a helicopter.

In general, the height-finding operation may be performed either during a precision approach, at which time the smaller elevation scanning angle is available (typically being a 7° scan angle), or it may be performed for more distant targets such as W simply as a means of relaying altitude information, in which case the extended elevation scanning angle is employed, a suitable angular range being in the order of 30°.

Although other arrangements may be employed, the particular technique described herein for height finding is one where the operator may interrupt a normal precision display where glidepath and course line are available as shown in displays (3) and (4) of Fig. 2A and may transfer a switch to a height-finder position resulting in a replacement of normal glidepath line with an elevation cursor line representing a horizontal flight line.

The measured height of this horizontal flight line is varied until it appears to intersect the video display indication of the target position. Thus in display (3) a 7° 10 mile scanning operation is represented and two horizontal flight cursor lines are indicated to show how the position of these lines may be varied. The solid horizontal flight cursor line will be noted to pass through a target display and is intended to illustrate a typical situation which may occur when a target such as X, shown in Fig. 1, is being guided in precision approach and the operator is requested to relay height information to the pilot.

As the operator varies the position of the horizontal flight cursor line through the control means provided he also has available a height measuring display device which may typically be a voltmeter, as is described in the copending application by Lawrence Michels, Serial No. 489,359 (Patent No. 2,823,374—reference 3). A variation is illustrated in the present specification in the form of two height counters which provide decimal digital presentations for height ranges of 0–5,000 feet and 0–50,000 feet, respectively.

The manner in which cursor generator 7,000 may be adapted to perform this height measurement is fully described in the copending application by Lawrence Michels, and a general functional description is found below in the circuit discussion which follows.

When the operator desires to measure the height of a distance target such as W in the altitude range above 5,000 feet he turns a master selection switch (SPH—see below) to a height finding position, providing control signals causing the elevation antenna to scan through an extended angle, typically in the order of 31°. The type of presentation which then results is shown in display (4) of Fig. 2B where a 31° scan is being performed and the range interval is 40 miles. It will be noted again that the operator is provided a convenient distinguishing range mark intensity pattern so that the 10 mile range of display (3) has alternately intensified 1 mile markers, whereas the 40 mile range presentation in display (4) includes no intensity modification since all the markers are 5 mile markers. Furthermore, it will be noted that a linear scale is employed in the 40 mile range.

When the master selection switch SPH is in the height-finding position, it is also possible to perform precision control landings for targets which descend at relatively steep glidepath angles. A typical situation is the descent of a helicopter, such as target Z of Fig. 1. In this case then the height finder switch (different from switch SPH) is not actuated so that the normal glidepath line is displayed in the elevation portion of the display. Accordingly, provision is made for either high or low cursor lines so that targets may be guided along flight paths of varying degrees of steepness.

The foregoing introductory discussion has pointed out in general terms the multitude of functions which may be performed in accordance with the invention, with a minimum of duplication in mechanism and circuits. Thus the cursor generator circuits have a multiple function in that a simple adaptation therein allows the presentation of the horizontal flight path line, providing a useful height finding operation which otherwise would require a separate rather complex system.

In the discussion which follows now the various components introduced above will be specifically described in terms of their respective functions in the system. In many cases, however, specific details of operation and structure of the components will be omitted here, reference being made to the corresponding copending applications or patents discussed above.

TRANSMIT-RECEIVE GROUP MECHANISM AND CIRCUITS

The transmit-receive group mechanism and circuits will be considered in figure number order although it will be understood that the particular sequence is not intended to indicate a degree of importance.

ANTENNA DRIVE MEANS 200
(Reference being made to Fig. 5)

Whenever possible the reference numbers utilized in Fig. 5 are made to correspond to those utilized in the above-mentioned copending application by J. F. Nameth et al. Serial No. 506,696 (reference 7 above). The various elements forming means 200 will not be considered in reference number sequence but rather first in the sequence of group III, relating to the various control functions and then in the sequence of group II, relating to the various data providing functions.

Referring now to Fig. 5, it is noted that a motor 263 (motor 68 in the copending application) receives up and down control signals provided by control circuit 900 in response to signals AZ Tilt Up and AZ Tilt Down, respectively. Motor 263 then controls a screw member 265 (member 65 in the copending application). Motor 263 drives screw member 265 so as to vary the length thereof which is pivotally connected between antenna 100A and its support 262 (lateral arm 62 of the copending application).

As is more fully described in the copending application, antenna 100A is journalled in suitable bearings about the ends of yoke arms forming part of support 262 allowing a tilt adjustment about a horizontal axis. Thus as motor 263 is rotated either in a forward or reverse direction, an azimuth tilt up or tilt down motion in the elevation plane may be effected.

In a similar manner there is included an elevation servo motor 296 (96 in the copending application) which received right and left control signals produced in circuit 900 and drives an extensible link arrangement similar to that associated with the azimuth antenna, the arrangement including a screw member 294 and a link 295. Thus when motor 296 is rotated in the forward or reverse direction, the elevation antenna may be pivoted about a vertical axis and varied in its azimuth position.

As is further considered in the copending application azimuth and elevation antennas 100 are supported rotatably on a beam 226 (referenced as 26 in the copending application) and provision is made whereby the entire antenna mount may be rotated through the actuation of a mount control motor 254 (referenced as 54 in the copending application) which receives control signals CW and CCW specifying the clockwise and counterclockwise rotation of beam 226. Beam 226 is connected to a suitable bearing arrangement and is driven through a pinion and ring gear mechanism as is further described in the copending application.

As motor 254 is rotated, turning beam 226, the position of the output winding of a differential synchro 250 is also changed and is utilized to provide a re-referencing of synchro signals S1, S2 and S3, as will be more fully explained below.

When scanning is to begin, as indicated by the presence of remote signal Scan On, control signals are provided by circuit 900 for actuating either precision scanning motor 238 (corresponding to motor 138 of the copending application) or search scanning motor 280 (corresponding to motor 80 of the copending application). During the precision operation both the azimuth and elevation antennas are driven through the desired fractional and intermittent scanning by means of a crank arm arrangement 285 (covering elements 125, 126, 128, 145 in the copending application) which is shown in Fig. 5 but which will not be described herein since it is amply described in the copending application.

At this time azimuth antenna 100A is engaged to crank arm system 285 by means of a pawl-locking arrangement which is actuated by a solenoid 292 (referenced as 92 in the copending application). Hereafter the copending application reference number will be indicated, if different, by the number enclosed in parentheses. This arrangement includes a pawl or dog 274 (174) which engages a notch in a collar 273 (162) attached to the azimuth antenna.

When the system is to be returned to search, certain switching functions are performed in control circuit 900, as will be described, which involve the utilization of a microswitch 205 actuated when solenoid 292 (92) is energized. A further transition switching operation is performed by a microswitch 215 which is actuated by a transition cam 216 driven by precision motor 238 (138). Microswitch 215 is opened, terminating the precision crank arm motion, at a rotary position which is selected to allow the minimum starting load on motor 238 (138) at any subsequent transition from surveillance to precision operation. In other words, crank arm system 285 is positioned so that the initial oscillating movement thereof is in the same clockwise direction for the azimuth antenna as is the search operation.

Motor 238 (138) drives the crank arm system through a clutch and the drive mechanism is stopped through a suitable braking arrangement. Thus it will be noted that a precision brake and precision clutch signal are indicated, being provided in control circuit 900, discussed below. These signals are provided in the proper sequence to allow the transition between search and precision scanning.

An elevation scanning angle control is provided through a motor 212 (120) which drives a variable length linkage arrangement coupling elevation antenna 100E to the crank arm arrangement 285 driven by precision motor 238. Motor 212 then may be driven to either a 7° or a 31° position under the control of limiting switches shown in control circuit 900 to be described. Thus when the normal precision scanning is being performed a 7° elevation range is specified and motor 212 is driven to a position where the lever arm driving antenna 100E has the proper length; and when the operator switches to the height finding position requiring a 31° scan, the effective lever arm is extended to provide the driving action required.

The AZ Tilt Data signal is derived through a potentiometer unit 275 which is connected through a suitable gearing arrangement to motor 263 and provides a substantially linearly variable voltage representing the tilt up or down position of antenna 100A.

In a similar manner potentiometer 278 provides the EL Servo Data signal and is driven by motor 296 through a suitable gearing arrangement; the output signal being a variable voltage representing the amount of servoing of the elevation antenna in azimuth, either to the left or to the right.

The AZ–EL Angle Data signal is obtained by modulating the reference signal produced by synchronizer 700 which has the same frequency as the pulse repetition rate of the system, which may be in the order of 1500 c.p.s. The azimuth portion of this signal is obtained through a precision synchro 253 which is driven through a suitable gear linkage arrangement connected to azimuth antenna 100A. Synchro 253 thus receives the synchronizer signal from circuit 700 and produces an output signal referenced as AZ Angle Data. A typical waveform is illustrated in Fig. 11 where the data signal generating circuits are further described.

The elevation angle data is obtained from either a 7° elevation synchro 246 (264) or a 31° elevation synchro 266, each of which receives the synchronizing reference signal from circuit 700 and provides elevation angle data for the corresponding scanning interval.

The azimuth angle data then is combined with either the 7 or 31° elevation angle data in circuit 800 which produces the composite AZ–EL Angle Data signal as is explained below.

Also linked to azimuth antenna 100A through a suitable gear mechanism is a search synchro 244 which receives the synchro reference signals remoted from the indicator group. Synchro 244 then produces output signals S1′, S2′ and S3′ which represent the angular position of the antenna referenced to support beam 226. These signals then are re-referenced through differential synchro 250, introduced above, which is rotated due to the motion of beam 226 about the base or mount of the antenna structure. The operation of synchro 250 then results in output signals S1, S2 and S3 which are shifted in phase with respect to input signals S1′, S2′, S3′ so as to be representative of the truth space position of the azimuth antenna. This means that the antenna structure may be rotated about the base or mount without disturbing the PPI display based upon absolute coordinates.

The AZ–EL Relay Gates signal is obtained through a microswitch 220 operated by a cam 223 of suitable configuration.

The Unblanking signal which must be produced by circuit 800 is also a composite function which must be utilized to control the display at the indicator group for either search, precision, or 31° scanning. The azimuth portion of the Unblanking signal is obtained through a microswitch 219 driven by a cam 222, and two Elevation Unblanking signals are obtained through a first microswitch 270 driven by a cam 268 for producing a 7° Unblanking signal, and a second microswitch 271 driven by a cam 269 providing a 31° Unblanking signal.

Finally, a Mount Strobe signal is obtained through a microswitch 218 driven by a cam 221 which closes the switch once during each revolution of azimuth antenna 100A when the antenna passes through its center line position for precision azimuth scanning.

In its general operation mechanism 200 provides search scanning under the control of motor 280 which rotates azimuth antenna 100A through 360° at this time. The precision crank arm arrangement at this time is disengaged because solenoid 292 has not yet received an actuating signal for precision operation.

As antenna 100A rotates in search operation synchro 244 provides corresponding rotational signals S1′, S2′ and S3′ referenced to the support arm 226 and these signals then are converted to absolute position signals S1, S2 and S3 through differential synchro 250; these signals being then remoted to position control device 16,000 further described below as part of the indicator group.

Also during the search operation the Mount Strobe signal is produced indicating the center line position for the azimuth antenna, this signal being converted to a corresponding beam intensity modifying signal in strobe marking circuit 3,000 in the indicator group.

At the same time synchro 253 provides modulated synchronizer signals or AZ Angle Data which is converted in decoder 3,000 to a corresponding angle volts signal and is then compared with the EL Servo Data signal in strobe marking circuit 2,000 to generate the elevation strobe signal which indicates the elevation position of the azimuth antenna. It may be noted here that the signals AZ Tilt Data and AZ Angle Data are both referenced to the support arm 226 so that as this arm is rotated about the mount the corresponding strobe signals are rotated on the PPI display to the new position.

In the precision operation, then, solenoid 292 is actuated to engage the precision crank arm arrangement whereupon precision motor 238 is operative, the precision clutch being engaged and the precision brake being released. Antennas 100A and 100E are then actuated through their AZ–EL intermittent scanning as is more fully explained in the copending application by Nameth et al. During this operation then the AZ–EL Relay Gate signal is utilized to signal the respective scanning periods and the AZ and EL Angle Data signals are combined to produce the composite AZ–EL Angle Data signal. It is also at this time that the azimuth and elevation unblanking signals are combined to form the composite Unblanking signal utilized in the indicator group.

RECEIVER 500, INCLUDING MIXER 510, LOCAL OSCILLATOR 520, AND PREAMPLIFIER 530

(*As shown in Fig. 6*)

As previously pointed out, TR switch 400 is alternatively operative to route microwave signals from transmitter 600 to RF switch 300 and thence to the antennas for radiation; and then to route received radar echoes from the antenna, through RF switch 300 to receiver 500. In particular, the received signals are applied to a mixer circuit 510 which also receives the signals produced by local oscillator 520, including a Klystron arrangement 521.

Klystron 521 includes a voltage sensitive element 522, which may be referred to as a repeller electrode, which receives the AZ or EL oscillator tuning control signals from the remote lines. These signals are combined through an AZ–EL switch 523 and a local-remote switch 524. The local-remote switch 524 allows the introduction of a local oscillator tuning control voltage provided through a circuit 525. As is well known, the variation in voltage applied to the repeller element in a Klystron results in a change in frequency. Thus a local adjustment of frequency, or a remote adjustment by the operator at the indicator group, may be made through the voltage control provided. At the indicator group the voltage control signal is provided in circuit 4,000, to be described. The output signals produced by Klystron 521 are then passed through a coaxial coupling device 526 and through an attenuator 527 to a diode 511 in mixer 510. The input signals from TR switch 400 are applied to a second diode 512 in mixer 510. The operation of mixer 510 and of local oscillator 520 in providing heterodyned IF signals is well known and will not be further described. The IF signals which result are applied to a first preamplifier stage 531 which is coupled to two second preamplifier stages 532 and 534 connected in parallel. Second preamplifier stages 532 and 534 provide normal GCA and taxi IF bandwidth which may be of 4.5 megacycles and 14 megacycles bandwidths respectively.

It will be noted that stages 532 and 534 are staggered tuned to provide the desired bandwidth; stage 532 including circuits tuned to 28.2 megacycles and 31.8 megacycles and stage 534 including circuits tuned to 23.7 megacycles and 36.3 megacycles, providing the desired bandwidth. It should also be noted that each of these stages receives the gain control signal produced by circuit 540 as will be considered below.

GAIN CONTROL CIRCUIT 540
(As shown in Fig. 7)

Circuit 540 receives the "A" trigger signals which are applied to a sensitivity time control circuit 541 therein. Circuit 541 may be conventional and produces a signal which varies in time according to a predetermined function which allows the presentation of radar information over a wide range without substantial variation in intensity. This type of circuit is now well known and therefore will not be further described, reference being made to Patent 2,583,173 to C. W. Hargens for "Radar Receiver" issued January 22, 1952; where a typical arrangement is described in further detail.

A switching arrangement is also shown in Fig. 7 whereby the time varying sensitivity time control signal may be selectively combined with AZ and EL IF gain control signals which are provided at the indicator group and remoted to the transmit-receive group.

The AZ and EL IF gain signals are combined through an AZ–EL switch 542 and passed through a local remote switch 543 which also receives a local gain control signal from a circuit 544. This signal then is applied to the upper terminal of a STC relay circuit 545 so that prior to actuation of this circuit by the STC remote signal the output signal produced by circuit 540 is an AZ and EL IF gain control signal without any sensitivity time control modulation thereon. The sensitivity time function signal then is applied to the lower contact of switch 545 so when the STC signal is "on" and this relay switch is actuated the output signal provided is an IF gain signal with the STC time modulation superimposed.

The STC signal and AZ–EL IF gain are combined through a resistor 546 shunted by a diode 547. Resistor 546 provides a buffering impedance so that when switch 545 is "off" no STC signal appears in the output signal; and diode 547 is a DC restorer diode which returns the output capacitor 548 connected to circuit 541 to the DC level of the AZ–EL IF signal.

IF AND FTC AMPLIFIER CIRCUIT 550
(As shown in Fig. 8)

The normal GCA and taxi signals provided by pre-amplifiers 532 and 534 discussed above are received in circuit 550 by a coaxial relay switch 551 which is actuated by the taxi control signal remoted from the indicator group. In its upper position coaxial relay 551 receives the 4.5 megacycle bandwidth normal GCA IF signal from circuit 532 whereas when the taxi control signal is received and switch 551 is actuated to its lower position it receives the 14 megacycle taxi bandwidth IF signal from circuit 534.

The selected IF signals then, either GCA or taxi, are applied to an IF strip 552 which is not shown in specific detail since it may be conventional in all respects.

The output signal of IF strip 552 is then applied to an FTC amplifier stage 553 which also receives FTC and taxi remote control signals which specify the time constant of a circuit in a manner to be described.

In most respects FTC amplifier 553 is conventional and is designed to amplify the IF signals passed through IF strip 552 for either the GCA or taxi bandwidth. The important thing to note for the purpose of the present system is the presence of gating amplifier stage 554 included within amplifier 553. It will be noted that this stage includes a first tube T554–1 and a second tube T554–2 which receive negative grid biasing signals from the lower and upper contacts respectively of an FTC switch 555. Thus, when switch 555 is in its unactuated or upper position a cut-off potential is applied to the grid of tube T554–2 so that only tube T554–1 is operative. This state of the circuit corresponds to an "off" FTC situation where the time constant of the grid input circuit for tube T554–1 is relatively high so that the video input signals are not differentiated as is the case when the FTC signal is "on."

When the FTC signal is "on" tube T554–1 is cut off due to the negative bias applied to the grid thereof through switch 555 and tube T554–2 then is operative to amplify the applied IF input signal. The time constant of the grid input circuit for tube T554–2 is selected to be moderately small in accordance with the requirement of a normal GCA FTC operation, such as is further described in the patent to Tryon 2,698,914 for "Fast Time Constant Circuit with Clipping Diode" issued January 4, 1955.

When FTC switch 555 is "on" and a taxi operation is being performed, a taxi switch 556 is effective to further reduce the time constant of the input circuit of tube T554–2 by shunting out one of the input resistors to ground. Thus the FTC taxi operation has a very short time constant so that the effect of ground clutter is substantially eliminated and the operator then is provided with a clearer view of the landing strip area and may readily detect the presence of a moving target on the ground.

The input signals produced by IF and FTC amplifier 550 then are suitable for normal GCA video, for GCA FTC video, or for GCA taxi video, where the FTC operation may also be effective.

REMOTING AMPLIFIER AND LINE DRIVER CIRCUIT 650
(As shown in Fig. 9)

The video output signals provided by receiver 500 are then applied to remoting circuit 650 which also receives the trigger signals from synchronizer 700. In particular, it will be noted in referring to Fig. 9 that the video input signals are applied to an input amplifier 651 and the trigger signals are applied to an input amplifier and blocking oscillator stage 652. The amplified video signals then are applied to a second amplifier 653, the output circuit of which is connected to the output circuit of amplifier 652. The output signal derived at the junction of the output circuits of stages 652 and 653 is mixed video and trigger signals.

In other respects remoting circuit 650 is conventional and provides the desired amplification, signal mixing, and line matching which is required.

SYNCHRONIZER 700
*(Reference being made to Fig. 10)*

In its general operation synchronizer 700 has a dual function. Firstly, it provides the system trigger signals referred to herein as "A" triggers which actuate transmitters 600 to produce the well-known radar transmission pulse. Secondly, synchronizer 700 provides a stabilized reference signal having the same frequency as the trigger signal, the reference signal being utilized in data encoding means 800 to be described where it is modulated in amplitude in accordance with the angular position of the antennas.

Referring to Fig. 10 then, it will be noted that an oscillator 710 provides a periodic or sinusoidal output signal of predetermined frequency which may be typically 1500 c.p.s. corresponding to the pulse repetition rate of the radar scanning system.

The output signal of oscillator 710 is then applied to an amplitude stabilization circuit 720 which includes several subcomponents arranged to provide an accurately stabilized periodic reference output signal which has the same frequency as the output signal of oscillator 710 but has an amplitude which is stabilized to ensure that the angle-representing modulation which is to be performed in circuit 800 will accurately represent the positions of the respective antennas.

Within stabilization circuit 720 then there is included a limiting amplifier 721 which receives the output signals of oscillator 710 and produces output signals which are then passed through a low pass filter circuit 722, thence to a cathode follower circuit 723, and thence to a peak dectector circuit 724.

Essentially the operation of circuits 721, 722, 723 and 724 is to derive a direct current signal from the input signal applied to circuit 721 where the amplitude of this signal represents instantaneous modulation amplitude of the oscillator signal. The signal available at the output circuit of peak detector 724 is then compared to an accurate reference signal amplitude in an amplitude comparator and error detector circuit 725. Circuit 725 then produces an output signal which represents the difference between the reference amplitude desired and the actual amplitude detected in the oscillator input signal applied to circuit 721.

This difference signal is then passed through an amplifier stage 726 to a clipping diode D721 in limiting amplifier circuit 721, diode D721 being operable to combine the unstabilized output signal of oscillator 710, as amplified in circuit 721, with the detected error signal derived through amplifier stage 726, so that the resulting output signal available at the output circuit of cathode follower 723 is stabilized in accordance with the reference signal amplitude.

In this manner then an accurately stabilized periodic reference signal is available at the output of cathode follower circuit 723 and is then applied to data encoding device 800 and specifically to the rotors of certain resolvers or synchros therein as shown schematically in Fig. 11 below.

This periodic reference signal is also applied to a trigger pulse amplifier circuit 750 which converts the sinusoidal signal applied to it into sharp "A" trigger signals which are suitable for actuating transmitter 600 and which are also combined with the video signals in remoting circuit 650 as has been described above.

ANTENNA DATA ENCODING MEANS 800
*(Reference being made to Fig. 11)*

As indicated in Fig. 11 the AZ Tilt Data and EL Servo Data signals are derived from respective potentiometer center taps in devices 275 and 278, respectively, also shown in a perspective view in Fig. 5 discussed above. The ends of these potentiometers receive suitable potential through respective bleeder resistors R875 and R878, such as −210 volts. A minus potential is utilized to represent the AZ Tilt or EL Servo Data so that these voltages may then be combined directly in strobe marking circuit 2,000 of the indicator group in a comparison with the positive AZ–EL Angle Volt signal available in this group through decoder 3,000. This comparison operation is more fully described in the indicator group section which follows and therefore will not be further considered here.

It will also be noted that the center tap of potentiometers 275 and 278 receive suitable compensating potential through respective compensation resistors R876 and R879. The purpose of this compensating potential is to correct for the nonlinearity which would otherwise occur due to the fact that the linear rotation of tilt motor 263 and servo motor 296, shown in Fig. 5, does not result in a perfectly linear rotation of the respective antennas. The manner in which this compensation may be introduced is well known in the art and will not be further considered here.

As previously indicated above the synchro reference signal, which conveniently may be 1500 c.p.s. corresponding to the pulse repetition rate of the system, is applied to the rotor winding of the azimuth synchro 253 shown in Fig. 5 and shown schematically in Fig. 11. Only two of the stator windings of synchro 253 are utilized then for the data encoding operation. One of these windings is grounded, namely winding 253–1 and the other, winding 253–2, provides a modulated periodic output signal which varies in amplitude in accordance with the azimuth antenna position. The general form of the signal which is produced through this operation is indicated on the output lead of synchro 253. The elevation portion is not shown since it is not utilized. As is more fully explained in the above-mentioned copending application of T. J. Johnson, Jr., Serial No. 488,795 (reference 5 above) the modulation of the applied periodic reference signal is linear if the angular rotation of the rotor in synchro 253 is small.

This is the case during the operation of synchro 253 in its precision azimuth scanning. However, during the search operation when antenna 100A is rotated throughout 360° the modulated output signal then has a sinusoidal envelope and is only linear in the small angle range. This causes no difficulty in strobe marking circuit 2,000 described below, however, where the AZ–EL volts signal is compared to the EL Servo Data to form the line E*ls*, representing the azimuth position of the elevation antenna as shown in displays (1) and (2) of Fig. 2A.

The reason by the nonlinearity is permissible is that the elevation servo angle is still relatively small as referenced to arm 226 discussed above, so that the only portion of the azimuth data signal which is utilized during surveillance operation to produce the line E*ls* is the portion which is substantially linear in the region of the angle variation of the elevation antenna in azimuth.

The synchronizer difference signal is also applied to the 7 and 31° elevation synchros 246 and 266 through 7–31° switch section 821 which forms part of a switch 820. When switch 820 is in its upper position, the synchronizer reference signal is applied through a transfer element T821 and upper contact to the rotor winding of synchro 246; whereas when a 31° elevation scanning operation is being performed and switch 820 is actuated to its lower position, the rotor synchro 266 receives the synchronizer reference signal through element T821.

As is also pointed out in the application by T. J. Johnson, Jr., it is not necessary to utilize synchros since actually the operation performed is a resolver operation where the input reference signal is modulated in accordance with the sign of the angle of rotation of the rotor. However, it is convenient to use synchros since they allow either a synchro or resolver operation and therefore allow interchangeability in parts.

Switch 820 also includes a second section 822 which derives the elevation data signal from either of synchro 246 or 266 depending upon whether the scanning angle is 7° or 31°. Thus in its upper position a 7° elevation signal is passed through element T822 and in its lower position a 31° elevation signal is passed therethrough.

The elevation data and azimuth data signals then are combined through an AZ–EL switch and amplifier circuit 830 which includes a switch section 831 shown in its unactuated upper position where it receives the AZ Angle Data signal produced by synchro 253. Circuit 830 also includes an amplifier 832 which receives the AZ–EL relay gate signal derived through microswitch 220 discussed above with reference to Fig. 5.

The output signal derived through the transfer element T831 of switch section 831 is a composite AZ–EL Angle Data signal and is then further amplified in an output amplifier stage 840 which provides the AZ–EL Angle Data and AZ–EL Angle Data Common signals, which are remoted to the indicator group. The typical appearance of this signal is indicated on the corresponding output leads. The AZ–EL Relay Gate signal derived through microswitch 220 as actuated by cam 223 is also remoted for further utilization in the indicator group.

The schematic arrangement of search synchro 244 and differential synchro 250 is shown in Fig. 11 in order to indicate the general manner in which the output signals S1, S2 and S3 are obtained. It will be noted that synchro reference signals R1 and R2 are received via the remote line and applied to the rotor of search synchro 244. Synchro 244 thus produces output signals S1′, S2′, and S3′ which represent the angular position of the azimuth antenna referenced to the support arm 226. Signals S1′, S2′ and S3′ then are converted to output signals S1, S2 and S3 through differential synchro 250. As pointed out above, the output three phase winding thereof is rotated through a gear linkage with support member 226 as it moves about the antenna mount structure.

In this manner then signals S1, S2 and S3 effectively represent the rotational position of the azimuth antenna in absolute space so that the position of rotatable element R at the indicator group to be considered below is properly oriented.

The Unblanking signal which is produced in circuit 800 is a composite function of the azimuth and elevation unblanking signals as well as a search unblanking signal which is made available through control circuit 900 to be discussed below.

Provision is made in circuit 900 to eliminate the Unblanking signal during any transition period from search to precision or vice versa. Thus an unblanking input signal for precision operation is received from circuit 900 as long as it is not in a transition operation and in a similar manner a search signal is received as indicated in Fig. 11.

The precision unblanking signal then is applied to three microswitches 219, 270 and 271 providing AZ unblanking, 7° elevation unblanking and 31° elevation unblanking, respectively. The 7° and 31° elevation unblanking signals are applied to upper and lower contacts respectively, of a switch section 823, which forms part of switching circuit 820. In its upper position the transfer element T823 of switch section 823 receives a 7° elevation blanking signal and in its actuated and lower position the transfer element T823 receives the 31° elevation unblanking signal.

The search unblanking signal received from circuit 900, the azimuth unblanking signal derived through microswitch 219, and the elevation unblanking signal derived through switch section 823 are then combined to form a composite Unblanking signal which is remoted to the indicator group.

Finally, it will be noted that the Mount Strobe signal is derived directly through microswitch 218 which is also shown in Fig. 5. The signal provided is a +28 volt signal which changes its level at the point in the azimuth antenna rotation motion corresponding to the azimuth center line position, referenced to support arm 226.

CONTROL CIRCUIT 900

(Reference being made to Fig. 12)

As indicated in Fig. 12, the AZ Tilt Up and Down signals and EL Servo Left and Right signals are applied to motor control circuits 963 and 996 controlling motors 263 and 296, respectively. It will be noted that these control circuits are identical except that circuit 963 controls an up and down actuating movement of motor 263 whereas circuit 996 controls a left and right movement in motor 296. Accordingly, only circuit 963 will be described in specific detail.

It will be noted that the AZ Tilt Up and AZ Tilt Down signals are applied to first and second solenoids 964 and 965 respectively controlling transfer elements T964 and T965.

When an AZ Tilt Up signal is applied, transfer element T964 is closed and associated contact C964 receives motor driving potential through unactuated transfer contact T965 associated with solenoid 965. In this manner then a suitable motor actuating potential such as 120 volts A.C. is applied to up winding 263U in motor 263 and causes a corresponding rotation of motor 263 resulting in the desired actuation of the azimuth antenna in the tilt up direction. It will also be noted that the actuating signal passes through a "dead man" type of break 263B to ground. This type break is normally engaged and disengaged when actuating power is received.

In a similar manner the AZ Tilt Down signal actuates solenoid 965 and transfer element T965 so that down control winding 263D of motor 263 operates to control the motion of motor 263 in the corresponding direction. It will be noted that if both the up and down tilt signals are received, motor 263 is driven in the down direction since the power path for the up winding 263U is opened, when element T965 is transferred. This arrangement prevents actuating power from being applied to both motor control windings.

The operation of control circuit 996 is similar in that a solenoid 997 is actuated in response to the EL Servo Left signal providing actuating power for the left motor control winding 296L and a solenoid 998 is actuated in response to the EL Servo Right signal providing motor actuating power to a control winding 296R.

The control switching for the mount rotation motor 254 is provided through a control section 954. As indicated in Fig. 12 circuit 954 effectively provides a double-pole double-throw power switching function for motor 254 where motor output terminals 254CW and 254CCW receive actuating power in response to control signals Mount CW and Mount CCW respectively.

Thus terminal 254CW receives a suitable potential such as +120 volts A.C. and terminal 254CCW is grounded when output switch section 955CW is actuated; and motor input terminal 254CCW receives the actuating potential and terminal 254CW receives the ground potential when output switch section 955CCW is actuated.

A protective arrangement is provided in circuit 954 to prevent simultaneous actuation of switches 955, which would cause a direct short between the motor actuating supply (+120 volts A.C.) and ground. This is accomplished in an input switch 956 which receives the signals Mount CW and Mount CCW supplied to solenoids 957CW and 957CCW respectively.

When solenoids 957 are actuated separately a +28 volt signal passes through the lower transfer element T957–1 which is associated with the solenoid actuated, and then through the upper transfer element T957–2 of the unactuated solenoid, providing a corresponding control signal. Thus, in a specific example output switch section 955CW is actuated when signal Mount CW is applied to switch section 956CW and no control signal is applied to section 956CCW. In this case solenoid 957CW is actuated through unactuated element T957–2CCW and actuated element T957–1CW.

The manner in which the control signal Mount CCW may be effective if applied separately should be readily understood from this example.

It should also be appreciated that if both signals Mount CW and Mount CCW are applied, neither of input switches 957 provides a controlling +28 volt signal for the corresponding output switching section 955, so that there is no possibility that a short circuit can occur.

As a matter of interest the windings of a typical type of motor 254 are shown, but will not be described here since the type of motor which is employed does not form an important part of the present invention.

It is convenient to consider the "scan on" and "precision-search control" operations together since they are achieved through a fairly complex switching arrangement provided in control circuit 900. This control is accomplished in a circuit 930 which receives the Scan On signal and Precision-Search Control signal applied to input solenoids 931 and 932, respectively.

When the Scan On signal is received the transfer elements T931–1 and T931–2 associated with solenoid 931 are actuated. Element T931–1 then receives a +28 volt potential which is applied to a transfer element T933–2 controlled by a solenoid 933. If the Precision-Search Control signal then is in an "off" state, representing the search operation, element T933–2 is not actuated and the Scan On signal then provides an actuating signal for the search clutch. Thus the search motor engages the azimuth antenna and causes it to rotate throughout its 360° scanning cycle.

It may also be seen that when solenoid 933 is actuated, in a manner to be described, the precision clutch receives actuating signals through transfer element T933–2, so that this clutch engages the precision motor 238 for its driving action through the precision crank arm arrangement 285 as has been discussed above.

When the "on" Precision-Search signal actuates solenoid 932, element T932–1 is transferred providing a +28 volt signal for solenoid 933. However, solenoid 933 cannot become effective until microswitch 205 associated with the operation of solenoid 292 (see Fig. 5) is switched when pawl 274 is engaged in the transition from search to precision scanning. The manner in which this transition occurs is more fully described in the above-mentioned copending application by Stein et al. Serial No. 506,696 (reference 7 above), but will be briefly considered here.

As long as the Scan On signal is present, the search clutch is actuated through untransferred element T933–2 so that the azimuth antenna is driven in rotation. This continues, even though a precision-indicating control signal has already been received, until the azimuth antenna reaches the position where pawl 274, actuated by solenoid 292, may be engaged so that the precision crank arm arrangement then is coupled to the azimuth antenna.

When this occurs, microswitch 205 is closed and solenoid 933 receives an actuating signal. As a result element T933–2 is transferred and the precision clutch is actuated.

When the Precision-Search signal is "on" a +28 volt signal then passes through element T932–1 and through transfer element T931–2 to solenoid 935 which closes element T935 providing actuating power for solenoid 292 forming part of the antenna driven mechanism shown in Fig. 5.

Thus although solenoid 292 is actuated immediately upon receipt of the "on" Precision-Search signal after the Scan On signal has been applied, the transition is not complete until the azimuth antenna has been rotated to the pawl engaging position, at which time microswitch 205 is transferred.

When microswitch 205 is transferred and solenoid 933 has been actuated, a precision holding circuit is completed through transferred element T933–1 which receives actuating current through transferred element T932–1 and passes it to solenoid 935. Thus it is possible that the "scan on" switch may be turned off at the indicator end but solenoid 292 will remain actuated for the precision operation where pawl 274 is engaged.

When solenoid 933 is actuated transfer element T933–3 is also transferred removing actuating current from precision brake allowing the precision crank arm arrangement to be oscillated by precision motor 238.

From the description of circuit 930 thus far it may be seen that the precision motor is not engaged through the precision clutch and the precision brake is not released until solenoid 292 has been actuated and pawl 274 has been completely transferred to its engaging position where microswitch 205 is transferred.

Just as provision must be made in circuit 930 to ensure the proper transition from the search to the precision operation, means must be provided for the reverse transition namely from the precision to the surveillance operation. This is accomplished in the following manner.

After the Precision-Search Control signal returns to its "off" state and solenoid 932 is released resulting in the transfer of element T932–1 to its upper position, solenoid 933 receives its holding current through transfer element T933–4 and closed microswitch 215, considered above with reference to Fig. 5. As has been previously pointed out microswitch 215 is actuated by a cam arrangement 216 so that it is opened at a predetermined point in the cycle of the crank arm arrangement shown in Fig. 5 where the oscillatory movement of the azimuth antenna for precision is in the same direction as the movement which the azimuth antenna has for the search operation.

Thus the actuating current for solenoid 933 is removed when the precision crank arm reaches the transition point since microswitch 215 opens. When solenoid 933 is released all of its transfer elements return to their upper position so that the search clutch is engaged and the precision brake is actuated.

Thus the surveillance operation may begin and the precision crank arm is braked to the proper position for the next transition from the search to the precision operation.

In addition to controlling the search and precision scanning operations as discussed above, circuit 930 also provides search and precision unblanking signals which are utilized in circuit 800 discussed above. The search unblanking signal is present when neither solenoid 932 nor solenoid 933 has been actuated. This ensures that the display at the indicator group is interrupted during any transition period when solenoid 932 is actuated or when a precision operation has previously been performed and solenoid 932 has just been released, a transition interval remaining during which time transfer element 935–5 associated with solenoid 933 is in its lower position so that the search unblanking signal is not present.

In a similar manner the precision unblanking signal is present only when the precision-search control signal is in its "on" state and solenoid 933 has been actuated, indicating that the pawl has been completely transferred resulting in the engaging of the precision crank arm.

The final circuit to be considered in Fig. 12 is the 31° scan control circuit 940 which receives a 31° scanning control signal applied to a low current input solenoid 941 which actuates transfer element T941. When element T941 is in its actuated or transferred position, 28 volts is applied to a higher current solenoid 943 causing the transfer of element T943.

In its upper position element T943 provides actuating motor power through a 7° limit switch 944 so that motor 212 is caused to rotate until the 7° limit switch is open. When the 31° scan signal is applied, an element T943 is transferred. Actuating power is then passed through 31° limit switch 945 to motor 212. The motor then rotates until this switch is open and then stops.

In this manner then motor 212 is automatically positioned to either one of two positions depending upon whether transfer element T943 is in its upper position for a 7° elevation lever arm, or whether it is transferred in response to the 31° Scan signal resulting in a 31° elevation lever arm.

As a matter of interest the typical internal winding structure for motor 212 is shown and it is indicated therein that a release type brake 947 may be employed which normally engages the rotor of the motor but is disengaged whenever motor 212 receives actuating power through either limit switch 944 or 945 as described above. The brake 947 is actuated through motor solenoid 948 which closes transfer element T948, and provides actuating current for brake 947.

INDICATOR GROUP MECHANISM AND CIRCUITS

The indicator group circuits will be considered in their figure number order, which also corresponds to the sequence order of the reference numbers. It will be understood of course, that the sequence order in no way indicates a degree of importance but rather provides a convenient mode of description.

REMOTE LINE AMPLIFIER AND SIGNAL SEPARATOR STAGE 1000

*Reference being made to Fig. 13*

As indicated in Fig. 13, the mixed video and trigger signals remoted from circuit 650 in the transmit-receive group are applied to a difference amplifier stage 1100 which also receives the hum pick-up signals for cancellation. In general, the function of stage 1100 is to remove the hum picked up by the remoting coaxial cable and to cancel this from the video and trigger signals. The general technique employed is described in copending application for "Differential Amplifier Method of Cancelling Ripple Pick-Up," Serial No. 224,972 by David J. Green et al., filed May 7, 1951, now Patent No. 2,734,944.

The output signals produced by stage 1100 then are substantially free of the line hum and are applied to a video amplifier stage 1200 and a pentode gate stage 1300.

Video amplifier 1200 is designed to provide the desired bandwidth for the radar scanning information which is obtained through antennas 100. The amplified video signals provided thereby then are applied to cathode follower circuits 1410 and 1420 which provide video output signals and alternate video output signals, respectively. Two cathode follower stages are shown in order to allow the isolated utilization of the video signals where one cathode follower may provide actual signals for use in the system and the other cathode follower may provide signals for testing or for a second indicator group.

Pentode gate 1300 is biased in a well-known manner so that only trigger signals which exceed a predetermined bias level will pass therethrough and relatively low level amplitude video information will not pass. As a a result, the output signals of gate 1300 are "A" trigger signals corresponding to the trigger signals provided by synchronizer 700, at the transmit-receive group. These signals then are applied to a blocking oscillator 1500 which is shown as including two cathode follower output circuits 1510 and 1520, providing "A" triggers and alternate "A" triggers, which may be utilized in a manner similar to the video and alternate video signals provided by circuits 1410 and 1420.

The specific operation of these circuits will not be considered further since they are conventional; suitable circuit values being shown therein to aid those skilled in the art in practicing the invention.

The important thing to note for the purpose of the system description is that circuit 1,000 provides "A" trigger signals through cathode follower 1510 and video output signals through cathode follower 1410.

STROBE MARKING CIRCUIT 2,000

*(As shown in Fig. 14)*

As indicated in Fig. 14, the EL Servo Data signal and the AZ Tilt Data signal are applied to combining circuits 2100 and 2110, respectively. These circuits also receive the AZ–EL Angle Volt signal. Circuits 2100 and 2110 are designed to provide a difference signal which passes through zero whenever the sense of the difference between the applied input signals changes.

Considering circuit 2100 specifically then, it is noted that the EL Servo Data and the AZ–EL Angle Volt signals are combined through respective adding resistors R2101 and R2102. The EL Servo Data signal is selected so that the amplitude of the rotation of the elevation antenna in azimuth is represented by a negative signal of corresponding amplitude.

The time when the EL Servo Data signal will be equal in an opposite sense to the varying amplitude of the AZ–EL Angle Volt signal may be adjusted by means of a phase adjust circuit P2104, which includes a potentiometer receiving a suitable source negative potential, the other end being connected to ground. Phase adjust circuit P2104 then allows the difference signal available at the junction of resistors R2101 and R2102 to be varied so that the resulting signal passes through zero when the azimuth antenna is in a zero reference azimuth orientation.

The operation of combining circuit 2110 is similar except that provision is made therein for combining the AZ–EL Angle Volt signal with AZ Tilt Data for either the 7° or 31° scan situation. In general circuit 2110 must provide a scale factor difference between the AZ Tilt Data signal presented when the elevation scale is in the 7° range and when it is in the 31° range. In addition, it will be noted that the AZ Tilt Data signal is measured through a meter P2111 which forms part of panel P as shown in Fig. 24b. Meter P2111 is in series with suitable biasing means to ensure the proper current therethrough for measurement.

The required scale factor for 7° and 31° display is achieved by passing the AZ Tilt Data signal through an amplifier A7,000 which also forms part of cursor generator 7,000 to be described. Accordingly, amplifier A7,000 will not be described here, and certain of the input switching functions which are shown in Fig. 14 will not be described since they are considered below.

It will be noted that the AZ Tilt Data signal passes through a switch SPH forming part of the surveillance, final approach and height finder switch as shown in the upper panel of Fig. 24b.

Switch SPH is a master control and has various elements which will be referred to throughout the present specification. As a convenient reference the three positions of surveillance, precision approach and height finder will be referred to as positions 1, 2 and 3 as shown in Fig. 14. All of the switch sections, such as SPH–1 shown in Fig. 14, are illustrated in position 1 corresponding to surveillance. Amplifier A7,000 then receives the AZ Tilt signal when switch SPH is moved to position 2, corresponding to 7° precision scanning.

With switch SPH in position 2, the output signals of amplifier A7,000 are passed through a second section SPH–2. Thus an amplified AZ Tilt Data signal passes therethrough to a combining circuit similar to that in circuit 2100 described above. As above this circuit includes a phase adjust circuit 2114A similar to circuit P2104 described above. It will be noted that the phase adjustment is considered to be a 7° phase adjustment due to the fact that the signal derived through amplifier A7,000 corresponds to the amplified AZ Tilt Data signal for 7°.

The AZ Tilt Data signal is also applied directly to a second phase adjust circuit 2114B having its output terminal connected to position 3 of switch section SPH–3. The transfer element of switch SPH–3 then is connected to an adding resistor R2112 which operates in a similar manner to resistor R2102 considered above, to add the AZ–EL Angle Volt signal to either the 7° or 31° AZ Tilt Data signal.

Thus in this manner amplified AZ Tilt Data signal is derived through amplifier A7,000 during normal precision approach where 7° scanning is performed, and the AZ Tilt Data signal is combined directly with the AZ–EL Angle Volt signal when a 31° scanning operation is being performed. Suitable adjustment in phase adjust circuits 2114A and 2114B then will ensure that the output signal passes through zero at the time that the scan angle position of the elevation antenna whether for 7° or 31° scan passes through the azimuth tilt center-line position.

The difference signals produced by circuits 2100 and 2110 then pass through zero at times during respective azimuth and elevation scanning intervals when the azimuth and elevation antenna positions pass through the servo and tilt orientation of the elevation and azimuth antennas, respectively. These signals then are applied to first and second input terminals 2121 and 2122 of a switching circuit 2120 which also receives the AZ–EL Relay Gate signal. Circuit 2120 then is operative to present the difference signals produced by circuit 2100 and 2110 to a comparator circuit 2200. In particular, circuit 2120 is shown as including a relay amplifier which receives the AZ–EL Relay Gate at its grid and has its anode connected in series with an actuating solenoid S2120. Solenoid S2120 controls a transfer element T2120 so that element T2120 is in its upper or unactuated state during azimuth scanning, at which time the EL Servo Data difference signal passes to comparator 2200, and is in its lower or actuated state during elevation scanning when the AZ Tilt Data difference signal for 7° or 31° is passed through to comparator 2200.

Comparator circuit 2200 then produces output pulses during respective azimuth and elevation scanning periods indicating the times that the difference signals applied thereto pass through zero. Circuit 2200 thus may be considered as having the function of translating the input data signals into corresponding pulses occurring during respective scanning periods, where the time-position of each pulse represents the angle of elevation servo or azimuth tilt, whichever is the case.

The particular structure of comparator 2200 will not be considered here since it is fully described in the above-mentioned copending application by Lawrence Michels Serial No. 502,047 (reference 2 above).

In addition to providing time phase pulses representing the elevation and azimuth antennas in their non-scanning coordinate positions, circuit 2,000 also provides pulses which are phased in the PPI cycle interval representing the azimuth center-line position for the precision operation. These pulses are obtained from the Mount Strobe signal received from the transmit-receive group which is passed through a differentiator circuit 2140. Circuit 2140 translates the changing level of signal Mount Strobe into a corresponding pulse which is then applied to a selection switch 2130, which also receives the output signals of comparator 2200. Switch 2130 is shown in its upper position so that the differentiated Mount Strobe signal is applied therethrough to input terminal number 1 of switch section SPH–4 forming part of the search precision height finding switch SPH on panel P.

Switch 2130, it will be noted, is referenced as switch P2130 on panel P as shown on the upper panel of Fig. 24b. This switch allows a button control by the operator so that normally the azimuth center line strobe is presented corresponding to the differentiated Mount Strobe signal, but when the operator pushes the button P2130 referenced as the "El strobe" button in Fig. 24b, the elevation antenna strobe signal is shown. Thus line AzCl appears on the search display prior to the actuation of button P2130 and the line Els appears when button P2130 is actuated.

It will be noted that contacts 2 and 3 of switch section SPH–4 receive the output signal of comparator 2200 so that in either the 7° precision approach or the 30° height finding operation, the output signal of this switch is derived from comparator circuit 2200; whereas the output signal of switch 2130 is passed therethrough during search operation. It may be noted here that the operator performs the necessary switching when he makes a master control selection. However, the same operation may be performed to actuate a relay including a two-position element, where in the unactuated or search position the element receives the output signal of switch 2130 and in the actuated or precision position the element receives the output signals of comparator 2200. This latter arrangement is illustrated in the above-mentioned copending application by Lawrence Michels.

The signals derived through switch SPH–4 are then applied to a gating circuit 2300 which also receives "A" trigger signals separated in circuit 1,000 discussed above. Gating circuit 2300 then is operative to pass at least one system trigger signal whenever a pulse of a somewhat longer duration is received through switch section SPH–4. Circuit 2300 is designed so that it is polarity discriminative and is not actuated unless the pulse received is negative. This operation is more fully described in the application by Michels.

Circuit 2300 then effectively provides gated trigger signals during the pulse interval of the applied input signals and these gated trigger signals are applied to an inhibited multivibrator circuit 2400.

Multivibrator 2400 has only one stable state during which time an output signal is available which may be utilized to control the intensity for a normal display. This circuit is "triggered" in response to the first gated trigger signal and then assumes an unstable state during which time an output signal is available which may be utilized to control the display of a modified intensity which may, for example, be utilized to display a brightened strobe line. Multivibrator 2400 is designed to return to its stable state after a period which is approximately equal to the duration between trigger signals but yet includes an inhibiting characteristic which renders it insensitive to subsequent input signals for a relatively long period thereafter, which may be in the order of 20 trigger signal intervals.

Summarizing then, it will be noted that at least one trigger signal is gated through circuit 2300 each time one of the input signals specifies that a strobe is to be presented at the particular angular position represented by the AZ–EL Angle Volts signal. The trigger signal gated in this manner then is effective to actuate multivibrator 2400 which, in turn, produces an output signal suitable for modifying the intensity of the display device for one range sweep interval. Furthermore, the operation of multivibrator 2400 is inhibited thereafter for a period of a relatively large number of sweep intervals to ensure that no false signals may be translated into strobe marking signals at that time.

DECODER CIRCUIT 3,000
*(Reference being made to Fig. 15)*

Referring now to Fig. 15, it is noted that decoding circuit 3,000 comprises a bandpass filter 3610 which receives the AZ–EL Angle Data signal provided by data encoding means 800 in the transmit-group. Filter 3610 is designed to separate out the fundamental periodic reference signal frequency of the encoding signal. As pointed out above, this frequency may be 1500 cycles per second, corresponding to the trigger pulse frequency of synchronizer circuit 700.

Circuit 3000 also receives the "A" trigger signals which effectively mark the amplitude points in the AZ–EL Angle Data signal which accurately represent the position of the respective antennas during the corresponding scanning period. These trigger signals then are translated into corresponding sampling or gate signals through a gate generator 3700.

The amplitude of the AZ–EL Angle Data signal then is adjusted through an amplifier stage 3620, and specifically through a gain-control potentiometer 3621 therein. Potentiometer 3621 is controlled through panel element P3621 shown in Fig. 24b.

The phase of the signal derived through amplifier 3620 is adjusted in a phase-shift circuit 3630. Specifically, this control is effected through a potentiometer 3631 controlled through panel element P3631 shown in Fig. 24b. A phase reversal is also possible through P3633.

The length of the sampling or gate signal is controlled in circuit 3700 through a potentiometer 3710 which varies the time constant of the multivibrator circuit shown therein, so that it is triggered in response to received "A" trigger signals and returns to its initial state at the end of the sampling period.

As more fully discussed in the above-mentioned co-pending application by Thomas J. Johnson, Jr., Serial No. 488,795 (reference 5 above), the level of the AZ–EL Angle Data signal may be adjusted through a potentiometer 3641 associated with panel control element P3641 so that this signal may have the required amplitude for sampling.

The phase and amplitude adjusted output signals of amplifier 3640 and the gating or sampling signal of circuit 3700 are then applied to a sampling circuit 3800. In this circuit, the modulated periodic reference signal constituting the angle data is translated to a corresponding variable voltage, having an instantaneous amplitude representing the angular position of the antennas during respective scanning periods. This variable voltage is referred to herein as AZ–EL Angle Volts.

A typical form of the AZ–EL Angle Volts signal which is derived through circuit 3,000 is shown in Fig. 15; reference being made to the above-mentioned copending application by Thomas J. Johnson, Jr., Serial No. 492,507 (reference 5a above), for a further description.

It is helpful here to briefly reconsider the operation of data encoding means 800 in providing the AZ–EL Angle Data information and the general method of translating this information to a corresponding voltage which is then utilized in various other operations.

It will be recalled that the rotor of azimuth precision synchro 253 receives the synchronizer reference signal produced by circuit 700. As this rotor is rotated due to its coupling to azimuth antenna 100A the applied reference signal is modulated to provide azimuth angle data. In a similar manner the 7° and 31° elevation synchros 246 and 266, respectively, receive the synchronizing reference signal from circuit 700 and provide corresponding elevation angle data.

As previously explained, the AZ–EL Angle Data signal is then obtained by passing the separate azimuth and elevation data signals as obtained above through an AZ–EL switch actuated by the AZ–EL Relay Gate Signal.

This data then, along with the "A" trigger signals, provides antenna information which is translated through decoding circuit 3,000. The various adjustments provided in circuits 3620, 3630, 3640 and 3700 make it possible to compensate for any attenuation and phase shift which may result in the transmission through the remoting line. In this manner then the gating signals and angle data information available in circuit 3,000 are properly calibrated so as to accurately represent the antenna information.

The translation then is performed by detecting the amplitude of the AZ–EL Angle Data signal during successive pulse repetition periods, marked by the "A" triggers. The detected amplitude is then stored in circuit 3700 to provide the AZ–EL Angle Volts output signal.

RECEIVER CONTROL SIGNAL GENERATING CIRCUIT 4,000
*(As shown in Fig. 16a)*

As indicated above circuit 4,000 produces the following signals which are utilized in receiver 500 as described above: (1) EL L.O. Tune, (2) AZ L.O. Tune, (3) F.T.C., (4), S.T.C., (5) EL IF Gain, (6) AZ IF Gain, (7) Taxi.

In referring to Fig. 16a then it will be noted that the signal EL L.O. Tune is derived from a potentiometer 4100 which receives a suitable potential such as −210 volts at one end and is grounded at the other end. This variable voltage signal then controls the tuning of local oscillator 520 as pointed out above. In a similar manner signal AZ L.O. Tune is derived from a potentiometer 4200. The variable center tap of these potentiometers are adjusted in position through the operator's control of panel elements P4100 and P4200 which control the corresponding potentiometers.

The F.T.C. signal is obtained through an on-off switch P4300 on panel P as shown in Fig. 24b, the schematic arrangement being shown in Fig. 16a where it will be noted that a suitable control signal such as +28 volt signal is applied to the remote line when the switch is actuated to its "on" position whereas otherwise no signal is present.

In a similar manner the STC. control signal is derived as an on-off signal through a switch P4400 shown on panel P of Fig. 24b and causes a switch closure as shown in Fig. 16a where +28 volts is applied to the remote line in the "on" position.

The EL and AZ IF Gain control signals are derived through potentiometers 4500 and 4600, respectively. A variable voltage is obtained through the variable center tap position of these potentiometers under the control of panel knobs P4500 and P4600 shown in Fig. 24b—upper panel.

The Taxi signal is provided in a similar manner except that it is derived through the range selection switch P15,000 and particularly section P15,000–1 thereof as shown in Fig. 16a. In this case +28 volt signal appears on the remote line when the switch is in position 1 as will be more fully understood from the description of the range sweep and gating operation below.

ANTENNA CONTROL SIGNAL GENERATING CIRCUIT 5,000
*(As shown in Fig. 16b)*

Signal generator 5,000 produces the following signals: (1) AZ Tilt Up, (2) AZ Tilt Down, (3) EL Servo Left, (4) EL Servo Right, (5) Mount CW, (6) Mount CCW, (7) Scan On, (8) Precision-Search Control, (9) 31° Scan.

The first four signals are provided in a switch arrangement 5100 which is mechanically connected to a panel control knob P5100. The rotatable element 5110 of switch 5100 receives a suitable control signal potential such as +28 volts and may assume any of the four positions indicated as up, down, left and right. When rotatable element 5110 then is in any of these positions the corresponding output lead receives an "on" control signal indicating that the corresponding antenna movement is specified.

The mount control operation of the antenna is controlled through a switch 5500 having a three position toggle connected to panel element P5500. In its left position the toggle provides a +28 volt "on" signal representing Mount CCW and in its right position the toggle provides a +28 volt "on" signal representing Mount CW.

The Scan On signal is provided by a two position toggle 5700 coupled to element P5700 of panel P. In its "off" position this toggle is open and in its "on" position a +28 volt signal is applied to the lead (7) in group III.

The Precision Search Control signal and 31° Scan signal are obtained through switch sections SPH-5 and SPH-6 forming part of switch SPH on panel P as discussed above. The Precision Search signal is "on" when this switch is in either position 2 or 3 in which case the +28 volt signal is applied to the corresponding line (8) in group III. This state of the switch corresponds to either a precision scanning operation in 2° or a 31° height finding operation, during both of which cases an AZ-EL display is employed and the azimuth and elevation antennas are actuated through their intermittent fractional scanning operation.

The 31° Scan signal is obtained when switch SPH is in position 3 for height finding during which time the elevation antenna is to be rotated through 31°.

TRIGGER DELAY CIRCUITS AND RANGE GATE GENERATOR 6,000
(As shown in Fig. 17)

"A" trigger signals which are separated out in circuit 1,000 are applied to input amplifier 6110 which drives a first delay multivibrator 6120. The "A" trigger signals are also applied to a second isolation amplifier and delay multivibrator circuit 6220.

The output signals produced by multivibrators 6120 and 6220 are passed through associated amplifier stages 6130 and 6230 respectively; and are also differentiated by the associated coupling constants.

The differentiated signals produced at the outputs of amplifiers 6130 and 6230 are applied to gate generators 6140 and 6240, respectively.

It may be noted that the circuits thus far described are divided into two groups, those in the 6100 series and those in the 6200 series. The 6100 series group is designed to provide range sweep gate signals which are then utilized to actuate sweep generator 15,000, and also provide "C" trigger signals corresponding to the trailing edge of the delay multivibrator signal produced by circuit 6120. The "C" trigger is power amplified and shaped through a blocking oscillator circuit 6150 which is transformer coupled to circuit 6120 by means of a common pulse transformer 6151. Other pulse coupling, of course, may be suitable.

The circuits in the 6200 series, on the other hand, are arranged to provide a precision gate signal for driving range marking circuit 8,000 during the precision operation. Separate circuits are utilized here in order to effect the preferred direct-reading range mark technique of the above-mentioned Korelich patent (reference 11 above). In accordance with this technique the gating of mark generator 8,000 is controlled independently so that the range marks may be positioned as desired with a zero range mark, for example, intersecting the touchdown point (Td).

It will be noted that the range gate signal produced by circuit 6140 is applied to one input terminal of a switch PS6160 and the output signal of circuit 6240 is applied to the second input terminal thereof. Switch PS6160 then is actuated in response to the Precision-Search Control signal and provides an output signal which is applied to range mark generator circuit 8,000.

In its general operation circuit 6,000 provides delayed "C" trigger signals through the operation of delay multivibrator 6120 and blocking oscillator 6150. The "C" trigger signals then are utilized to actuate a range gate generator 6140 which may be varied as to the gate duration through a switch section P15,000-2 which is actuated through selection knob P15,000 on panel P as shown in Fig. 24a. It will be noted that section 15,000-2 has five positions corresponding to five range positions as follows: (1) Taxi, (2) 5 Mile Search Or 10 Mile Precision, (3) 10 Mile Search Or 20 Mile Precision, (4) 20 Mile Search Or 40 Mile Precision, (5) 40 Mile Search. As pointed out above, the search measurement in range is made along the radius of the PPI display and consequently an off-centered display makes available twice the range of the radius, or a diameter of range in one direction.

Switch P15,000-2 is utilized in circuit 6140 to provide a variable time constant which determines the duration of the range gate in a well-known manner.

The range gate circuits in the 6200 series described above operate in a similar manner to those in the 6100 series except that the gate duration is not made variable. This means that as the precision range intervals are changed range marks are still generated over the entire fixed interval which may be 40 miles.

Several panel controls are possible as shown in Fig. 24a. The operator may adjust the sweep delay through element P6121 which controls the potentiometer 6121 in delay multivibrator 6120. In a similar manner the precision delay may be adjusted through P6221 controlling potentiometer 6221 in multivibrator 6220.

The sweep and precision gate lengths may be adjusted through elements P6141 and P6241, respectively, controlling potentiometers 6141 and 6241 in gate generators 6140 and 6240.

CURSOR GENERATOR 7,000
(Reference being made to Figs. 18a, 18b, 18c)

The reference numbers employed in this description correspond to those utilized in the above-mentioned copending application by Lawrence Michels Serial No. 489,359 (reference 3 above) the digit 7 being added to the fourth place to indicate block 7,000 of the present system. It will be noted then that the second digit from the left of the reference number in the present specification corresponds to the first digit from the left in this copending application. It may further be noted that the second digit from the left in the copending application of reference 3 corresponds to the first digit on the left of the above-mentioned copending application by Lawrence Michels Serial No. 484,997 (Patent No. 2,887,681—reference 4b above).

Thus azimuth signal generator 7,120A in the present specification corresponds to generator 120A of reference 3 and 200A of reference 4b.

Although in general the circuits employed in the system are the same as those previously described in the copending applications certain important modifications are made in accordance with the basic system concept herein.

The first thing to be noted is that four sets of azimuth and elevation signal generators 7,120A and 7,120E are provided in generator groups 7120-1, 7120-2, 7120-3 and 7120-4, as indicated in Fig. 18b. This arrangement allows the separate provision of four cursor lines which are available at the operator's selection through a site selection switch 7,500 also shown in Fig. 18b.

It will be noted that the circuit values shown for the various components which form signal generators 7,120 are the same as those shown in copending application reference 3, as shown in generator group 7120-1 of Fig. 18b. The various cursor line specifying signals then may be adjusted by the operator through panel P, in the corresponding site section. In each of these sections then six signals are provided. Three of the signals specify the azimuth course line, the corresponding panel elements being suffixed with the letter A. Thus the operator may adjust the course angle by means of a signal provided through control P7121A (Figs. 18b and 24b) and may adjust the distance to runway parameter by means of a control 7122A. A selection switch 7123A is provided to allow switching for either left or right of runway course line representation.

In specifying the glidepath line the operator adjusts a control element 7121E for the glidepath angle, and an element 7122E for the distance to touchdown parameter, where the suffix E indicates an elevation control. The function of these various signals in the cursor generating operation are amply described in reference 4b above and will not be further considered here.

In addition to these basic parameters a high-low switch 7125 is provided for each of the site controls allowing the operator to specify either a high scale-factor cursor line for relatively large glidepath angles, or a low scale-factor for small glidepath angles. The manner in which this operation is effected will be more fully understood from the description which follows relating to amplifier 7,000A shown in Fig. 18a.

In panel P the operator's controls for the various site positions are distinguished through the utilization of an associated hyphenated number. Thus the course angle signal adjustment is referenced P7121A-1, P7121A-2, P7121A-3 and P7121A-4 for sites 1, 2, 3 and 4 respectively.

The site selection through switch 7500 then is made through a matrix 7510 which couples each of the six output signals of a generator group to an input terminal in an associated switch section of switch 7500, the terminal having a number corresponding to the site group. Thus six sections are provided in switch 7500 referenced as 7501, 7502, 7503, 7504, 7505 and 7506 corresponding to the six signals: (1) left of runway course angle, or AZ–EL Angle Volts signal, depending upon the position of switch 7123; (2) AZ–EL Angle Volts signal or right of runway course signal; (3) distance to runway signal; (4) AZ–EL Angle Volts signal high or low, depending upon the position of switch 7125; (5) glidepath angle signal; and (6) distance to touchdown signal.

Each input terminal of a switch section then receives the corresponding one of the six signals from the group having the same reference number. Thus input terminal 2 of switch section 7501 receives the first signal representing left of runway course angle or AZ–EL Angle Volts signal from site 2.

As previously explained switch 7500 is controlled through panel selection switch P7500 which has four corresponding positions. It will also be noted that a section 7505 is included for providing a light switching arrangement so that panel light group 7507-1, 7507-2, P7507-3 and P7507-4 are illuminated for site positions 1, 2, 3 and 4 respectively.

Site selector switch 7500 has six output signals corresponding to the selected set of six output signals of the four site positions. These signals then correspond to those previously considered in the above-mentioned copending application so that the connections to height finder switch 7400 shown in Fig. 18b and those to AZ–EL switch 7130 will be observed to be the same as those in Fig. 2, of reference 3 cited above.

As is further described in copending application reference 3, when height finder switch 7400 is in its upper position it receives signals representing the glidepath line in elevation and passes signals through to leads 7400-1, 7400-2, and 7400-3 representing AZ–EL Angle Volts, glidepath angle and distance-to-touchdown, respectively. It will also be noted that switch 7400 includes a fourth switch referenced as 7404 which is closed when switch 7400 is in the height finding position and supplies a +28 volt potential to a switch section SPH-7, also forming part of search precision height finding switch SPH on panel P as discussed above. When switch SPH is in position 2, panel lights PL7410 and PL7411 are lighted associated with the 0–5,000 foot height finder counter display as shown in Fig. 24b—upper panel. When switch SPH is in position 3, corresponding to a 31° scan, panel lights PL7420 and PL7421 are lighted illuminating counter display for 0–50,000 feet.

The circuits employed in generating cursor pulses in the present system are similar to those previously described in the copending application reference 4b. Thus it will be noted in referring to Fig. 18c that two sawtooth generators Nos. 1 and 2 are included referenced as 7110-1 and 7110-2, respectively. These generators are coupled to fixed and variable offset circuits referenced as 7140-1 and 7140-2, respectively. As is fully described in copending application reference 4b, variable offset circuit 7140-2 receives signals through switch section 7133 of AZ–EL switch 7130 representing the distance to runway during azimuth scanning, distance to touchdown during elevation scanning, and the variable height signal derived through switch section 7403 of the height finder switch when it is in its height finder position.

The offset output signals produced by generators Nos. 1 and 2 are then applied to a comparator circuit 7150 which is similar to that described in reference 4b; further description and claims thereon being found in copending application Serial No. 462,654, for "Differential Amplifier" by Lawrence Michels, filed October 18, 1954.

One modification which is made in the present system which will be noted, however, is that the same gating signals which actuate sawtooth generators Nos. 1 and 2 are also utilized to inhibit the action of comparator 7150 prior to the cursor generating operation being applied as negative cut-off signals to the left-hand grid of differential amplifier stage 7153 thereof. This further prevents any spurious pulses from being produced outside of the proper interval for comparison where such pulses may appear, for example, to be system triggers. The gate signals are provided by a gate generator 7700 which receives the "C" triggers from circuit 6,000. A fixed gate length is employed so that cursor pulses are generated for a predetermined period, such as during a 20 mile range interval covering any precision landing range. The cursor gate length may be adjusted through panel element P7710 controlling potentiometer 7710 in circuit 7700.

A few modifications will be noted in the height finder portion of circuit 7,000, although in principle the circuit is the same as that shown in Fig. 2 of reference 3. Referring to Fig. 18a, it will be noted that in place of the voltmeter display circuit 300 of the copending application the present system contemplates the use of height finder counters 7310 and 7320 which are arranged to display digital altitude measurement in the ranges 0–50,000 feet and 0–5,000 feet, respectively.

These counters are mechanically coupled to the variable center tap of a potentiometer 7210 in height finder signal generator 7200. Potentiometer 7210 is controlled through panel control element P7210 shown in Fig. 24b in the upper panel and provides a variable offset height signal as in the copending application.

It should also be noted that two calibrating signals are provided through potentiometers 7212 and 7214 for height measurements of 0–5,000 feet and 0–50,000 feet, respectively. These calibrating signals are passed to terminals 2 and 3 of switch section SPH-8 so that when switch SPH is in position 2 for 7° scan the 0–5,000 feet calibration is effective and when switch SPH is in position 3 for 31° scan, the 0–50,000 calibration is effected.

In this manner then counters 7310 and 7320 may be made to operate independently to correctly display corresponding height finding ranges. Two of the lower place digits in the 0–50,000 feet counter 7310 are made to be dummy places and the counter is then actuated in its third place position; whereas counter 7320 has only a single dummy digit and is actuated in its second place position. Thus effectively every movement of element P7210 and potentiometer 7210 creates 10 times the count change in counter 7310, over that which occurs in counter 7320.

In other respects height finder signal generator 7200 is the same as in reference 3, although it will be noted that switch 210 shown in reference 3 is provided through switch sections SPH–9 and SPH–10, where positions 2 and 3 correspond respectively to 7° and 31° scan positions, as shown in reference 3.

It will be noted in Fig. 18a that additional circuitry in the form of amplifier 7,000A and switching circuit 7800 is included to allow the selective presentation of either a low or high cursor and further a selection for either 7° or 31° scans. It will be recalled that amplifier 7,000A is utilized in strobe marking circuit 2,000 described above to allow a scale factor modification of the AZ Tilt signal for 7° scanning. Thus it will be noted that switch sections SPH–1 and SPH–2 are shown in Fig. 18a and are the same sections as those previously described with reference to strobe marking circuit 2,000.

A low cursor is obtained during the 7° scanning operation by utilizing the normal AZ–EL Angle Volts signal to modulate the amplitude of the signal produced by sawtooth generator No. 1, in the manner more fully described in copending application reference 4b. In this case signal AZ–EL Angle Volts passes through contact 2 (7°) of switch section SPH–11 in switching circuit 7800 and is then applied to the low input terminal of high-low switch 7125 shown in Fig. 18b.

A site may also be calibrated for a high glidepath line with switch 7125 in its upper or high position in which case the AZ–EL Angle Volts signal is attenuated through resistors R7801 and R7802. In this manner the glidepath angle signal is effectively increased in relative scale factor so that the amplitude of the signal produced by sawtooth generator No. 2 specifies a high glidepath angle and the cursor generator output pulses accordingly are produced during larger angle-time positions during the EL scan, so as to represent the corresponding glidepath line.

When switch SPH is in the 31° position 3, the AZ–EL Angle Volts signal is then passed through amplifier 7,000A and the low glidepath line comparison operation is made between the glidepath angle signal and the amplified AZ–EL Angle Volts signal corresponding to the extend elevation range. The high comparison then is made by utilizing the normal AZ–EL Angle Volts signal which passes through contact 3 of switch section SPH–12 to the high input terminal of switch 7125.

Thus provision is made to introduce the proper scale factor into the cursor generating operation for either 7 or 31° elevation scanning and also to allow calibration for either a high or low glidepath line.

The general operation of the cursor generator and of the height finding circuits therein will now be considered by tracing the various controls shown in panel P as indicated in Fig. 24b. The first thing to be noted is that in the upper panel control switch P7400 corresponds to the height finder switch circuit 7400 shown in Fig. 18b and allows the operator to either display a normal glidepath line when in its upper position or a horizontal flightpath line when switch P7400 is in its lower position. When the switch is in its glidepath position height finder counters 7310 and 7320 are not illuminated since they do not function and height finder control knob P7210 is not utilized.

The operator may define four different glidepaths and course lines in control sections 1, 2, 3 and 4 which are selected through site selector switch P7500. Thus in a typical situation where the transmit-receive group is positioned between two parallel runways two separate course angle adjustments may be made through elements 7221A–1 and 7221A–2 and the operator then selects for left or right of runway, as the case may be, through switches P7123A–1 and P7123A–2.

A runway designation may be made in panel light sections P7507 where each position of site selector switch P7500 illuminates one of the four display arrangements. Provision is made for allowing the insertion of a runway number which is given to the particular site. Thus the operator may reorient the antenna mount to any of four predesignated sites or runway positions and then turn switch P7500 to the corresponding site position; being then provided with the corresponding cursor line data.

In the height finding operation then switch P7400 is moved to the height finding position and switch SPH may be in either position 2 for normal 7° precision approach or may be moved to position 3 to allow an extended height finding range from 0–50,000 feet. If switch SPH is in position 2, then counter 7320 is illuminated by lights PL7410 and PL7411 and calibration may be made for horizontal flight signal and the zero calibration through panel elements P7220 and P7212.

When switch SPH is in position 3, on the other hand, counter 7310 is illuminated and then calibration is made through panel elements P7222 and P7214.

It should also be noted that switch SPH may be in position 3 and a glidepath line may be retained by putting switch P7400 in its upper position. In this situation then it may be desirable to use the high cursor line operation and one of switches 7125 is placed in its high position and the glidepath angle. A target such as Z may then be guided to a steep descent.

RANGE MARK GENERATOR 8,000 AND MIXER CIRCUIT 9,000

(As shown in Fig. 19)

The range marking circuits employed are the same as those described in the above-mentioned copending application by Lawrence Michels Serial No. 489,360 (reference 6 above). Thus it will be noted that a range-gated oscillator 8100 is actuated by the range gate signal derived through switch PS6160 in range gate generator 6,000. It will be recalled that when switch PS6160 is in its upper position during surveillance operation the range gate signal applied to generator 8,000 is of variable length and is the same gate as that applied to sweep generator 15,000. During precision operation, however, the range gate applied to circuit 8100 is of a fixed length corresponding to a 40 mile scan and is not changed for the various range selections. The reason for this is that the variable range gate which is applied to sweep generator 15,000 is initiated in response to the "C" trigger signals whereas the precision range gate applied to circuit 8100 is initiated after the variable delay provided in circuit 6,000 in accordance with the Korelich concept briefly mentioned in reference 11 above.

As in the copending application oscillator 8100 includes two tuned circuits 8120–1 and 8120–2 for providing one and five mile marking signals respectively. These circuits then are gated into oscillation upon application of the range gate signal through input circuit 8110 and clamping tubes T8121 and T8122.

An important modification which is made for the purpose of the present system is that switch 122 of the copending application, as shown in Fig. 2 thereof, is achieved by way of equivalent switch sections P15,000–2 and P15,000–3 which are part of the range selection switch P15,000 shown on panel P.

In accordance with the range selection convention discussed above, when switch P15,000 is in positions 1, 2 and 3, taxi, 5 and 10 mile search ranges are contemplated, respectively; positions 2 and 3 also being utilized as 10 and 20 mile precision ranges.

In positions 1, 2 and 3 tuned circuit 8120–1 is operable to provide 1 mile markers since switch section 15,000–3 provides a ground therefor and switch section 15,000–4 provides a feedback path through tube T8120 as is more fully described in the copending application.

In positions 4 and 5 of switch P15,000, on the other hand, tuned circuit 8120–2 is operative to provide 5 mile marking signals which are either utilized in 20 and 40 mile search displays or a 40 mile precision display.

As is pointed out in the copending application, the novel feature of the range marking circuit is the technique of signal modulation to allow display identification. In accordance with this technique the oscillator output signals are modulated in intensity through a pulse amplifier and amplitude modulating circuit 8200, the modulation amplitude being determined by the control signal produced by amplitude control circuit 8300, which may include count down circuits in accordance with the concept of the copending application.

In the particular circuit arrangement shown control circuit 8300 is made to specify the modulation of alternate 1 mile markers. In this manner then in all displays where the 1 mile marking signals are utilized the even mile markers are modulated; whereas in those displays where the 5 mile markers are employed the markers are not modulated. This means that the short ranges including modulated 1 mile markers (5 and 10 search) may readily be distinguished from the long ranges including unmodulated 5 mile markers (20 and 40 search).

The marking pulses produced by circuit 8200 are then combined with the cursor pulses produced by circuit 7,000 in mixing circuit 9,000 providing composite marking signals which are then applied to video amplifier circuit 10,000, where these signals are further mixed with the video signals separated through remote line amplifier 1,000.

Two panel controls are provided. The operator may select the desired intensity difference between modulated and unmodulated marks through circuits 31° in amplitude control circuit 8300. The corresponding panel element P8310 is shown in Fig. 24a—center section.

In addition, the over-all range mark gain may be adjusted through circuit 8210, in amplifier 8200 by manipulating element P8210 shown in Fig. 24a.

VIDEO AMPLIFIER 10,000, INTENSITY GATE 11,000, AND INTENSITY CONTROL CIRCUIT 12,000

*(As shown in Fig. 20)*

As indicated in Fig. 20 video signals are received by circuit 10,000, and are passed through an amplifier 10,100 to a mixing stage 10,200 which also receives the combined range marks and cursor pulses produced by mixer 9,000.

The output signals of stage 10,200 then are applied to a video stage 10,300 producing output signals which are applied to the cathode of tube CRT.

The intensity of the beam of tube CRT is also controlled by signals applied to the grid thereof through intensity control circuit 12,000 which receives the strobe gate signal produced by marking circuit 2,000 at one input terminal and a composite range gate and unblanking signal derived through intensity gate 11,000 at the other input terminal.

Intensity gate 11,000 essentially is a mixing circuit which combines the positive range gate produced by circuit 6,000 with the composite Unblanking signal derived in antenna data encoding means 800 in the transmit-receive group.

In intensity control circuit 12,000 a first tube T12,501 receives the output signal from marking circuit 2,000 and a second tube T12,502 receives the composite range gate and unblanking signal produced by circuit 11,000. The anodes of tubes T12,501 and T12,502 are coupled together through a load resistor R12,503 so that the output signal derived from the anode of tube T12,502 is a function of both the strobe gate signal and the composite range gate and unblanking signal.

In its general operation then circuit 12,000 provides an output signal having a normal level for controlling a low beam intensity in tube CRT for normal video display. However, when the output signal of circuit 11,000 falls into the blanking or low-level region, circuit 12,000 is driven to a more negative signal stage, tube CRT is cut off entirely, and nothing is displayed.

When the strobe and unblanking signals are present, the intensity of the beam of tube CRT is increased during a range-gated interval so that a line such as $A_zT$ or $E_ls$ shown in Fig. 2B appears as a bright range sweep. The operation of circuit 12,000 is more fully described in the above-mentioned copending application by Lawrence Michels Serial No. 502,047, reference 2 above.

In addition to showing the schematic arrangements which are suitable for circuits 10,000, 11,000 and 12,000, Fig. 20 also indicates the general arrangement of rotatable and static deflection elements R and S of tube CRT. It will be noted that static deflection element S receives vertical and horizontal deflection control signals from circuits 13,000 and 14,000, respectively. The windings on deflection element S then are arranged to provide the appropriate change so as to deflect the beam of tube CRT in the proper direction.

It will also be noted that yoke or rotatable deflection element R receives actuating range sweep signals from sweep generator 15,000 through a brush B1, a second brush B2 providing suitable actuating potential for yoke R through a switch section P15,000–5.

The potential applied to terminal 1 of switch section P15,000–4 is greater than that applied to the other four terminals (namely +425 whereas the others are +300). The reason for this is that the short duration of the range sweep in position 1 for the taxi operation results in the necessity for providing a varying high rate of current change with respect to time.

The specific manner in which static deflection element S may be wound as well as rotatable deflection element R is not considered here since it is amply described in the abovementioned copending application by R. W. Landee, Serial No. 498,327 (reference 1 above).

A few panel controls will be noted in Fig. 24a. The video gain is adjusted through panel element P10,110 associated with potentiometer 10,110 amplifier 10,100. The focus is controlled through knob P10,400 associated with potentiometer 10,400 near tube CRT in Fig. 20. And the beam intensity may be adjusted through potentiometer 10,500 controlled through element P10,500; the variable voltage provided being combined with the output signal of control circuit 12,000.

VERTICAL AND HORIZONTAL DEFLECTION AMPLIFIERS 13,000 AND 14,000 AND ASSOCIATED CONTROL CIRCUITS

*(As shown in Fig. 21)*

As indicated in Fig. 21, vertical and horizontal deflection amplifiers 13,000 and 14,000 are controlled through respective input circuits 13,100 and 14,100 respectively. Input circuit 13,100 includes a centering control circuit 13,110 for providing both elevation and azimuth centering as well as off-centering signals for vertical amplifier 13,000. The necessary switching between azimuth and elevation centering signals is controlled through an AZ–EL switching circuit 13,120.

In addition, vertical amplifier input circuit 13,100 includes an amplifier 13,130 for amplifying AZ–EL angle volts and for providing azimuth and elevation expansion control.

Since the same input circuit must provide control signals for both search and precision operation, it is necessary to switch selectively to the required signal for the particular operation, the switching being performed in response to the Precision-Search signal applied to switching circuits 13,500 and 14,500. The vertical precision and search centering and off-centering signals then are selectively applied through switch section 13,501 and an input resistor R13,601 to amplifier stage 13,700. During precision operation the amplified AZ–EL Angle Volts signal provided by stage 13,130 is passed through switch section 13,502 and an input resistor R13,602 to amplifier stage 13,700. Resistors R13,601 and R13,602 are selected to provide an adding function so that during precision operation the AZ–EL Angle Volts signal is combined with the required azimuth and elevation vertical centering signals provided by circuit 13,110 in the manner more fully described in the above-mentioned patent by Tasker et al.

Switching circuit 14,500 includes a section 14,501 operable for the selective passage of horizontal search and precision centering signals produced by circuit 14,100 to an amplifier stage 14,700 which may be assumed to be the same type shown in schematic detail in circuit 13,700.

In referring to the upper panel section shown in Fig. 24a it will be noted that the various controls are available therein related to the input circuit shown in Fig. 21. Thus in vertical control circuit 13,110 potentiometers 13,111, 13,112, 13,113 and 13,114 provide the following signals respectively: (1) Precision Azimuth Centering; (2) Precision Elevation Centering; (3) Vertical Centering For Search; and (4) Vertical Off-Centering For Search. These potentiometers are varied in center tap position through corresponding panel elements P13,111, P13,112, P13,113 and P13,114.

After having adjusted potentiometers 13,113 and 13,114 the operator then may select for vertical centering and off-centering by means of a switch 13,115 also shown on panel P. The output signal derived through switch 13,115 is then applied to the upper terminal of switch section 13,501 and constitutes the search vertical centering or off-centering control signal.

Signals derived through potentiometers 13,111 and 13,112 are applied respectively to upper and lower contacts of switch element 13,121 in AZ–EL switching gate 13,120, and the output signal thereof is switched in synchronism with the AZ–EL relay gate signal between the azimuth and elevation centering during the precision operation. This output signal then is applied to the lower contact of switch section 13,501 and therefore constitutes the vertical precision centering signal which is added to signal AZ–EL Angle Volts.

The azimuth and elevation expansion of the AZ–EL Angle Volts signal is accomplished through potentiometers P13,131 and P13,132 which are actuated through corresponding elements in panel P. The output signals of these potentiometers then are combined through switch section 13,122 forming part of switching circuit 13,120 although shown in circuit 13,130. The output signal derived through switch section 13,122 then is applied to the grid of an amplifier stage 13,135, the output signal of which is applied to the lower contact of switch section 13,502 and constitutes amplified AZ–EL Angle Volts, where provision has been made for separate expansion in azimuth and elevation.

A similar series of controls is found in horizontal centering circuit 14,100 in the form of: potentiometers 14,111, 14,112, and 14,113; and in horizontal off-centering switch 14,115. Corresponding control elements are found on panel P.

The output signals derived through off-centering switch 14,115 are applied to the upper terminal of switch section 14,501 and constitute the horizontal search centering or off-centering signals and the signal provided by potentiometer 14,111 is applied to the lower terminal of switch section 14,501 and constitutes the horizontal precision centering signal.

During search operation then switching circuits 13,500 and 14,500 are in their upper positions and vertical and horizontal amplifier sections 13,700 and 14,700 may then be utilized for centering or off-centering operation. Where centering is desired switches P13,115 and P14,115 are placed in their centering positions indicated as up in Fig. 24a, whereupon a centered search PPI display is available. If the off-centering display is desired, these switches are changed to the off-centering positions and a display such as in shown in display 2 of Fig. 2A may be obtained.

During precision operation then switches 13,500 and 14,500 are in their lower position and at this time the AZ–EL Angle Volts signal is passed through stage 13,130 and combined with the precision azimuth and elevation centering signal derived in circuit 13,110 in adding resistors 13,601 and R13,602. Thus in this manner vertical amplifier stage 13,700 provides the linear angular coordinate for a "B" display; although it should be understood a similar technique may be employed by modulating vertical range sweep signal in accordance with the method of Tasker et al. (reference 9) whereby a partial PPI sector display may be obtained.

During the angle modulation control of stage 13,700 amplifier stage 14,700 is utilized for precision horizontal centering, the corresponding signal being derived through potentiometer 14,111.

The output signals produced by stages 13,700 and 14,700 then are passed through the static yoke windings of deflection element S on tube CRT as shown in Fig. 20 above. In this manner then it will be appreciated the same deflection amplifiers are utilized for both search and precision operation and are utilized to control the same display deflection.

RANGE SWEEP GENERATOR 15,000

*(Reference being made to Fig. 22)*

As indicated in Fig. 22 the range gate signal provided in circuit 6,000 is applied to a pentode amplifier 15,100 which provides charging current for an integrating capacitor C15,200 receiving charging current through a sweep time constant circuit 15,200. In circuit 15,200 range switch sections 15,000–6 and 15,000–7 are employed in order to allow sweep length adjustment for the various ranges in display. The markings of the panel element P15,000 are repeated to provide a convenient reference.

It will be noted then that switch section 15,000–6 has contacts 1, 3, 4 and 5 connected respectively to potentiometers 15,201, 15,203, 15,204 and 15,205, respectively. These potentiometers are adjusted through corresponding elements on panel P to allow calibration for the sweep length in the ranges for taxi, 10, 20 and 40 miles, respectively.

In position 2 of switch P15,000 it will be recalled that the 10 mile precision display was logarithmic. Consequently, provision is made in a switching circuit PS15,210 to provide a linear load for pentode amplifier 15,100 when switch section PS15,210 is in its upper position, corresponding to search, and to reduce the applied potential through voltage dividing resistors R15,211 and R15,212 when switch section PS15,210 is in its lower position, corresponding to precision operation.

The signal derived through switch section PS15,210 then passes through switch section 15,000–7, when it is in position 2, to potentiometer 15,202 which allows an adjustment for the 5 mile search range corresponding to 10 mile logarithmic precision display, as pointed out above.

Integrating capacitor C15,200 is also coupled to a step adjust circuit 15,300 which includes another section of range switch 15,000, namely section 15,000–8. As in the case of variable time constant circuit 15,200 a variation in the step level is provided for positions 1, 3, 4 and 5 of switch section 15,000–8 through associated potentiometers 15,301, 15,303, 15,304 and 15,305 controlled through corresponding panel elements. These potentiometers then allow adjustment for the proper step signal to ensure that the sweep position accurately corresponds to range, where the step value compensates for the initial delay in actuating the sweep amplifier circuit 15,500, in Fig. 22.

Two step values are provided in position 2 where a larger step signal is required for the logarithmic sweep and is provided through potentiometer 15,302P, where the letter P indicates a precision operation. The search step then is provided through potentiometer 15,302S. Contact 2 of switch section P15,000-8 is connected to potentiometers 15,302S and 15,302P through switch section PS15,212 which is actuated along with section PS15,210 through the same solenoid.

The time constant of the output signal derived across integrating capacitor C15,200 accordingly is varied in accordance with the range selection made and also is selectively either a linear signal, or logarithmic signal when switch P15,000 is in position 2 and a precision sweep is desired.

This output signal then is applied to amplifier stage 15,500 which may be a conventional yoke deflection amplifier although a preferred schematic arrangement is shown therein.

Amplifier 15,500 receives its operating potential switch section P15,000-4 previously described, forming part of circuit 10,000 described above.

POSITION CONTROL DEVICE 16,000
(As shown in Fig. 23)

The synchro reference signals S1, S2 and S3 indicating the rotational movement of the azimuth antenna during surveillance are applied to respective upper input terminals of a switch PS16,100 controlled by the Precision-Search signal. During precision operation switch PS16,100 is actuated to its lower position where a fixed synchro reference signal is available.

The output signal derived through the three transfer elements of switch 16,100 are applied to respective windings of the stator of a control transformer 16,510; including three windings 16,511, 16,512 and 16,513 and a rotor winding 16,514, the output signal of which is applied to an amplifier 16,531.

The fixed synchro reference signals are provided by a source 16,420 which also provides synchro reference signals R1 and R2 which are remoted to the transmit-receive group.

Source 16,420 is connected to the lower terminals of switch PS16,100 so that one reference potential is connected to the uppermost contact of this group which is associated with winding 16,513 of control transformer 16,513 and the two lower contacts in this group are connected together to the other reference potential, these circuits being associated with windings 16,511 and 16,512.

As is more fully described in the above-mentioned copending application by R. Landee Serial No. 498,327 (reference 1 above), control transformer 16,510 may be adjusted in rotation. Provision is made in this manner for a fixed synchro signal which specifies a predetermined position of rotatable deflection element R in the desired coordinate direction. It will be assumed in further describing circuit 16,000 that the fixed coordinate direction provides horizontal range sweep signals for the "B" display utilized herein for precision approach.

It will be noted that the rotor of transformer 16,510 is mechanically coupled to motor 16,540 so that any motion of motor 16,540 causes a corresponding rotation of the rotor. A servo feedback arrangement then is provided where the output signal derived through rotor 16,514 is an error signal which drives motor 16,540 until the error signal becomes zero.

This means then that motor 16,540 is always positioned in accordance with the input signals applied to the control of transformer 16,510, since any error signal would otherwise cause a compensating rotation thereof. Consequently, rotatable deflection element R is always positioned, through its coupling to motor 16,540, in accordance with the controlling input signals.

Thus the signals applied to transformer 16,510 either represent the rotation of the azimuth antenna for search when S1, S2 and S3 are applied, or the fixed synchro vector when R1 and R2 are applied; whereupon the servo feedback control of element R provides the desired operation.

The servo control loop includes an amplifier 16,531 which receives the rotor error signal and provides an amplified signal which is applied to a demodulator stage 16,533. In this latter stage the error signal is translated into a corresponding voltage level.

The output signal of demodulator 16,533 then is integrated in a doubly clamped integrator 16,535 to provide a faster response to signal changes and this integrated output signal is then translated again into a corresponding modulated synchro reference signal in a modulator 16,537. This modulator reference signal then controls the push-pull amplifier and velocity difference circuit 16,539 producing output signals which drive a motor 16,540.

Push-pull amplifier 16,539 also receives a signal from a tachometer 16,550 representing the revolution rate of motor 16,540. This signal is an A.C. signal at the frequency of the synchro reference and is utilized to establish a velocity difference control. The output signal produced by amplifier 16,539 then drives motor 16,540 at a varying rate until the error signal received from the rotor 16,514 of control transformer 16,510 is zero.

A further description of the manner in which rotatable element R may be controlled for search operation, or selectively for precision operation is found in the above-mentioned copending application by R. W. Landee. A somewhat different switching technique is described in this copending application where the lines which are utilized to transmit synchro reference signals R1 and R2 to the transmit-receive group may also be utilized to transmit the AZ-EL Angle Data during precision operation. This technique allows a simplification in the remoting lines required but does not allow the utilization of the AZ-EL Angle Data signal during the search operation, as is contemplated in the present system where an elevation servo strobe is available in the search display.

SUMMARY OF THE SYSTEM OPERATION BY CONSIDERING THE OPERATOR'S CONTROL THROUGH PANEL P (Reference being made to Figs. 24a and 24b)

Having considered the various specific circuits which may be employed in the system, it is now helpful to review the system concept by considering the manner in which the various circuits are employed through the operator's selection available in panel P.

It will be assumed as in the previous example that the operations of surveillance, precision approach, taxi and height finding are to be performed in that sequence, although the system, of course, is not limited to utilization in this manner.

During surveillance or search operation switch SPH is in position 1, switch P5700 is set to the Scan On position, and the various power supply breakers are turned on. The power supply features of panel P have not been specifically described previously since they are conventional.

The desired range selection then is made through switch P15,000 shown in Fig. 24a; a centered or off-centered display selection is made through switches P13,115 and P14,115; elements P13,111 through P13,114 allow vertical adjustments, and elements P14,111 through P14,113 allow horizontal adjustments. Adjustments may be made in the sweep length through panel elements P15,201 through P15,205. As a general rule calibration and other control settings are made prior to the actual scanning operation.

During the search operation the operator is provided with a PPI display in the range which he has selected and normally views strobe line AzCl representing the azimuth center of scan line. He is thus informed as to the runway position which the azimuth and elevation antennas will cover in their precision scanning operation. If the operator then desires to determine whether or not the elevation antenna is properly oriented, he pushes switch P2130, shown in Fig. 24b, and the elevation strobe line E$ls$ is then shown on the PPI display in place of line A$z$C$l$.

If the operator determines that either the azimuth or elevation antenna is not properly positioned, the corresponding antenna control motor may be actuated through element P5100 shown in Fig. 24b. As previously pointed out this control allows the tilting of the azimuth antenna up or down, or the servoing of the elevation antenna to the left or right.

If desired the operator may also completely reorient the system for the precision landing which will follow by means of the control allowed through switch P5500, whereby he may rotate the antenna mount either clockwise or counterclockwise. The operator may effect this control without disturbing the PPI presentation in search due to the operation of differential synchro 250.

As the target is guided to the precision approach area, the operator may vary the position of sweep selection switch P15,000 in order to provide an expanded presentation of target information. Furthermore, he may utilize the off-centered display which may have been previously calibrated to allow an expanded view of the runways which are available.

After the operator has guided the target to the precision approach area and has determined that the azimuth and elevation antennas are properly oriented for available runway, he then changes switch SPH to position 2 for the precision approach operation; and a multitude of switching controls previously described are performed which effectively convert the system from a PPI radar system to a two-coordinate scanning system.

When switch SPH is in position 2, one of the site or runway position panels is lighted in the group P7507. If the site position indicated does not correspond to the available runway then the operator may reposition switch P7500, as is required. With switch P7500 in the proper position then the corresponding course angle, glidepath angle, distance-to-touchdown, and distance-to-runway signals are provided through switches P7121A, P7121E, P7122E and P7122A. The corresponding left and right of runway switches P7123, and the high low cursor switch P7125 must also be properly positioned.

If desired during the precision approach the operator may determine the height of the target by changing the position of switch P7400 from its glidepath position to the height finding position causing the required switching function in cursor generator 7,000. In this operation then the height-finder knob P7210 is then varied as the operator watches the horizontal flightpath line in the elevation display. When the line intersects the target echo the operator reads counter 7320 (corresponding to a 7° scan or 0–5,000′ height measurement) since this is the only counter illuminated.

After the target has been guided to its proper approach the operator returns switch SPH to position 1 in order to obtain a PPI display and then places range selection switch P15,000 in its taxi position. This provides the Taxi control signal through circuit 4,000. In addition, the operator may place switch P4300 in the F.T.C. "on" position, to eliminate excessive ground clutter.

When a height finding operation is to be performed, which is not associated with a precision 70° elevation landing approach, switch SPH is positioned in position 3 and counter 7310 is illuminated indicating that a height measurement in the range 0–50,000′ may be made. Switch P7400 must also be in the height finding position in order to provide the height finder cursor. The measurement again is made as before, by varying the height of the cursor line until it intersects the target position.

Position 3 of switch SPH provides a 31° elevation scanning angle which may also be used to provide a precision approach for targets which land along a very steep glidepath line, such as helocopters. In this case then height finder switch 7400 may be in either the glidepath position or the height finding position depending upon whether or not a glidepath line is desired on the display. It may be desired, for example, to glide a helocopter to landing by providing the pilot with continuous height information.

GENERAL SUMMARY OF INVENTIVE CONCEPT

From the foregoing description it should now be apparent that the present invention provides an improved and simplified GCA system which is adapted for surveillance, precision approach, taxi and height finding operations. In addition it has been pointed out that the extended elevation range (31°) for the height finding operation may also be employed to guide targets in steep glidepath landings which may be vertical in the case of helocopters.

It should now be fully appreciated how the present invention utilizes the same radar scanning apparatus at the transmit-receive group and the same electronic circuits at the indicator group to perform the various operations which are possible. Antenna drive mechanism 200, receiver 500, synchronizer 700, antenna data encoding means 800, and control circuit 900 in the transmit-receive group are all adapted for a variety of operations.

Yet the arrangements described require but a minimum of additional circuits over those which would be required for either a PPI or conventional precision landing system separately. Furthermore, the features of taxi control and height finding in their various aspects are entirely novel with the present invention as part of the GCA installation.

In a similar manner strobe marking circuit 2,000; decoder 3,000; control signal generating circuits 4,000 and 5,000; trigger delay circuits and range gate generator 6,000; cursor generator 7,000; range mark generator 8,000; intensity gate 11,000; intensity control circuit 12,000; vertical and horizontal deflection amplifiers 13,000 and 14,000; range sweep generator 15,000; and position control circuit 16,000; are all designed for at least a dual operation in accordance with the basic principles of the invention.

Thus marking circuit 2,000 provides strobe lines A$z$C$l$ and E$ls$ for the PPI display allowing the operator's guidance of a target to the precision approach area as described above and also provides the strobe line A$z$T and E$ls$ for the precision AZ–EL display.

In a similar manner decoder 3,000 provides AZ–EL Angle Volts which may be utilized during surveillance, precision approach and height finding.

Another very important feature of the invention is the utilization of the same set of range sweep and static deflection amplifiers for the various operations. Thus sweep generator 15,000 functions both in PPI-search and in AZ–EL-precision operations, and deflection circuits 13,000 and 14,000 provide a useful centering or off-centering operation for the search operation and AZ–EL angle modulation and horizontal centering for the precision operation.

In addition to the above general features a multitude of other features are provided by the invention such as the multiple runway coverage which is afforded through the clockwise and counterclockwise mount control. This multiple runway control is also effected through the utilization of a multiple cursor generator calibration which has been illustrated herein for a four runway or site situation. Thus in this manner a single operator may control landings through any of a multitude of different landing strips and may also guide the various targets in search to the multitude of landing areas.

Further features such as FTC and STC control from the operator's panel as well as AZ and EL IF gain and AZ and EL L.O. TUNE are provided. It also has been shown how the operator may select various range intervals without any resulting confusion therebetween due to the utilization of the range mark modulation technique described above.

From the above it should readily be appreciated that the invention provides a relatively simple and compact unit which is readily adapted for tactical movement or re-orientation at the same location. And yet along with the simplicity and relatively lightweight and small size which is provided, the invention performs the same functions as three or four other systems available in the prior art. The result is an arrangement which is well adapted for small airport facilities which may also be duplicated as necessary for heavier traffic for larger facilities.

While the invention has been illustrated by way of specific mechanisims and circuits, other modifications will be apparent to those skilled in the art, that are within the spirit thereof.

What is claimed is:

1. A guidance system for providing flying and taxi information for aircraft, said system comprising: a transmit-receive group for providing radar scanning signals constituting target-positional information, said transmit-receive group including first means selectively actuable to provide search radar signals in a relatively large scanning angle, and to provide associated search data indicating the position of said first means in search scanning, including second means selectively actuable to provide precision radar signals in separate precision scanning coordinates, and to provide associated precision data, including third means selectively actuable to provide radar signals relating to targets within a taxi area, and including fourth means selectively actuable to provide height-finding radar signals in an extended elevation angular range, and associated extended angle data signals; and an indicator group for translating the radar scanning signals into corresponding visual displays, each display representing the related target information, said indicator group including first means responsive to said search radar signals and said search data for providing a search display, including second means responsive to said precision radar scanning signals and said precision data signals for providing a corresponding precision display, including third means responsive to said taxi radar signals to provide a corresponding taxi display, and including fourth means responsive to said height-finding radar signals and said extended angle data signals for providing a height-finding display, means being further provided for ascertaining the height of targets represented in said height-finding display.

2. In a system for ground-controlled approach wherein means are provided for locating targets in surveillance and for guiding the targets to a precision approach area for landing, the system including an antenna scanning mechanism having azimuth and elevation antennas rotatable in respective planes about axes supported on an antenna mount, a device for controlling the antenna mount for rotation about its base, said device comprising: first means for producing an azimuth center of scan line indicating the center of the azimuth precision scanning angle referenced to said mount; second means for producing relative rotation-indicating signals representing the instantaneous angular position of the azimuth antenna referenced to the antenna mount; third means for translating the relative rotation-indication signals into absolute rotation-indication signals; and fourth means for rotating said mount about said base; whereby said antennas may be oriented for precision scanning to control landing on an available landing strip.

3. In a multiple runway guidance system for locating aircraft in search, directing such aircraft to a precision approach area, and for guiding the aircraft to landing; a control device for positioning the system antenna scanning device during the search operation so that the scanning device is properly positioned for the precision landing approach in alignment with one of the runways which is available, said control device comprising: search display means for providing a presentation of aircraft information throughout a relatively large angle constituting a search area; strobe marking means associated with said search display means for providing a reference line indicating the position of at least one antenna precision scan angle, referenced to said search display; means for rotating said antenna scanning device in absolute space so as to provide a re-referencing of said precision scan angle; and means for re-referencing said search display to ensure an absolute space presentation thereof; whereby said antenna scanning device may be properly oriented during search to ensure that precision scanning may follow without re-orientation.

4. A ground-controlled approach system operable in response to a first control signal to provide a surveillance operation where an azimuth antenna is utilized for polar wide-angle search scanning; and in response to a second control signal to provide a precision scanning operation where the azimuth antenna and an elevation antenna are utilized in fractional and intermittent scanning in respective planes for providing landing guidance information signals, said system comprising: first means coupled to said antennas for deriving target echo signals occurring at times referenced to system trigger signals indicating the range of various targets; second means coupled to said antennas for producing encoded signals representing the respective scanning angles thereof, the encoded signal representing the scanning angle of the azimuth antenna being utilized alone for the surveillance operation and a composite azimuth-elevation encoded signal being produced to represent the respective scanning angles of said antennas for the precision scanning operation; and indicator means responsive to said target echo signals and said encoded angle signals for providing display presentations in surveillance and precision approach through the same means; said indicator means including sweep deflection means selectively actuable to provide radial search sweeps at varying angles and precision range sweeps in a fixed coordinate direction for controlling the same indicator device; means for rotating the radial sweep positions in accordance with the azimuth antenna search movement, or selectively to position said range sweeps in the fixed coordinate direction; and means responsive to said encoded angle signals for producing cursor line signals which may be combined with said video signals to indicate the departure of target echo signals from predetermined ideal flight paths for precision landing approach.

5. In a system for ground-controlled approach wherein an azimuth antenna is utilized for wide-angle search scanning, and the azimuth antenna and an elevation antenna are utilized in fractional and intermittent precision scanning for providing landing guidance information, the azimuth and elevation antennas being rotatable about respective axes provided in supports on an antenna mount; an arrangement for selectively positioning the antenna mount with reference to its base so as to orient said antennas during the search operation for the precision scanning operation which is to follow, said arrangement comprising: first means for producing a pulse whenever the azimuth antenna passes through a point on said mount corresponding to the center of the azimuth precision scanning angle; second means for producing first rotation-indicating signals continuously representing the polar angular position of the azimuth antenna referenced to said antenna mount; third means for continuously translating said first rotation-indicating signals into second rotation-indicating signals referenced to absolute space; and fourth means for rotating said mount about said base whereby said pulse indicates the precision orientation of said azimuth antenna during the search operation.

6. The arrangement defined in claim 5 wherein there is further included means for producing an elevation strobe signal indicating the azimuth position of the elevation antenna, said means including a first device for producing a first signal having an amplitude corresponding to the azimuth position of the elevation antenna, a second device for producing a second signal representing the azimuth position of the azimuth antenna, and a third device for comparing said first and second signals to produce an elevation strobe signal whenever said first and second signals are of equal amplitude.

7. In a system for providing target position and guidance information for precision approach where azimuth and elevation antennas are actuated in respective scanning planes to provide precision echo information, a device for utilizing said elevation antenna in a dual function where it may either provide precision approach information or height-finding information, said device comprising: first means for providing an elevation data signal representing the angular position of the elevation antenna; selectively operable second means responsive to said elevation data signal for producing flight path representing signals; third means controllable in response to precision and height-finding selection signals for selectively actuating said second means to produce a glide path representing line for the precision approach operation, and for producing a horizontal reference line for said height finding operation; and fourth means coupled to said means for varying the altitude position of said horizontal reference line until it substantially intersects a target echo position, said fourth means including an indicating arrangement for determining the altitude of said line upon intersection.

8. The device defined in claim 7 wherein further means are provided in the system for selectively extending the scanning angle of said elevation antenna; and wherein means are further included in said second means for providing a corresponding extended elevation presentation whenever said elevation angle is actuated through said extended angle, whereby said device may be utilized to provide height finding information in two height finding ranges corresponding to the normal scanning angle of said elevation antenna and to the extended scanning angle of said elevation antenna, respectively.

9. A ground-controlled approach system operable in response to first and second control signals to provide precision approach and taxi operations, respectively, said system comprising: a transmit-receive group for producing radar scanning signals constituting target positional information, said group including selectively actuable means to provide precision radar signals, in separate scanning coordinates, in response to said first control signal, and to provide taxi signals existing in a relatively large scanning angle at a relatively short range in response to said second control signal; and an indicator group for translating the radar scanning signals into corresponding visual displays, each display representing the related target information, said indicator group including first means responsive to said precision radar scanning signals for providing a corresponding precision display, and second means responsive to said taxi radar signals to provide a corresponding taxi display, all radar signal information being available through the same display presentation.

10. In a ground-controlled approach (GCA) system wherein surveillance scanning is accomplished through an azimuth antenna which is rotated in a relatively large search scan angle, an arrangement for adapting the system to provide a taxi operation where ground targets may be detected for guidance in short range intervals, said arrangement comprising: a selectively operable transmit-receive device including means which may be controlled to provide reception in either a normal or a broad-band frequency range; selectively operable means for varying the frequency time constant of said transmit-receive device allowing the optional removal of ground clutter echoes; and selectively operable display means for providing relatively long range search display, and the relatively short range taxi display, through the same presentation device.

11. In a guidance system for providing position information, where means are provided for comparing the actual object position, as represented by corresponding echoes, with predetermined glide path and course lines generated by respective devices, said lines representing an ideal flight path, the comparison allowing a determination of the departure of the object position from said ideal flight path, a device for adapting said system for a height finding operation, said device comprising: first means associated with the elevation antenna for adjusting the angular scanning limits thereof to allow elevation signal detection in the desired height finding range; second means associated with the glide path line generating device for controlling the variation in function of said device to produce variable-altitude horizontal reference lines, said second means being actuable to vary the altitude position of said horizontal reference line; and control means associated with said second means for actuating said second means to vary the position of said line until it appears to intersect the echo of the object, the height of which is to be determined, said control means including a device for displaying the altitude of the corresponding horizontal reference line.

12. In an aircraft guidance system wherein a plurality of runway sites are available, and where targets may be guided during a surveillance operation to the precision approach area for an available runway and thence for a precision landing; a device for providing precision landing control for any one of the plurality of runway sites, said device comprising: a multiple unit cursor generator including at least one unit for each of said runway sites, said cursor generator providing predetermined ideal flight path lines for each of said runway sites respectively; means for selectively actuating one of said cursor generator units to provide a corresponding ideal flight path line; and means providing an identification as to the ideal flight path lines available referenced to the corresponding runway sites.

13. In a ground-controlled approach system wherein objects are to be guided in precision landing approach to any one of a plurality of runway sites, the system including means for selectively orienting an antenna mount about its base for alignment with any one of a plurality of runways; an arrangement for selectively providing guidance control signals for any one of the plurality of runway sites, said arrangement comprising: antenna angle encoding means associated with said antennas for producing signals representing the positions thereof, referenced to an antenna mount; means for referencing said antenna angle encoding means whenever said mount is rotated about the antenna base to accomplish aligment with a different runway; means for generating a plurality of sets of cursor signals each representing a respective ideal flight path for the associated site position; and means for selecting one of said sets of cursor signals in accordance with the runway site position available and the corresponding orientation of said antennas.

14. In a system for ground-controlled approach wherein means are provided for locating targets in surveillance and for guiding the targets to a precision approach area for landing, the system including an antenna scanning mechanism forming part of a transmit-receive group, said scanning mechanism having azimuth and elevation antennas rotatable in respective planes about separate axes on a mount; antenna data encoding means for providing azimuth search angle data and azimuth-elevation precision angle data referenced to said mount, said angle data being remoted to an indicator group; said encoding means comprising: first and second azimuth resolver devices for providing search and precision angle data, respectively, said resolver devices being actuated in rotation throughout a relatively small angle to provide substantially linear signal variations for small angles; elevation resolver means for providing an elevation data signal; and means for combining the azimuth and elevation precision data signals to produce a composite signal representing the position of the azimuth and elevation antennas during their respective periods of scanning for decoding said composite signal for selective utilization for surveillance and precision approach operations.

15. In a ground-controlled approach system wherein an operator may select between precision and surveillance operations through a control panel in an indicator group, there being provided a precision-search control signal having having first and second levels representing the surveillance and precision phases of operation, respectively; a combination selectively operable in response to the first level of said control signal for providing surveillance centering control for a search display, where the polar origin of the display may be varied in vertical and horizontal, position; and also selectively allowing precision angle deflection through the centering means and range deflection along a fixed axis, said combination comprising: a rotatable deflection element; means selectively actuable in response to the first level of said control signal for continuously positioning said rotatable deflection element in synchronism with the search scanning movement to provide radial range coordinates, and actuable in response to the second level of said control signal to maintain a fixed coordinate direction for precision operation; a stationary deflection element arranged for cooperative deflection control in association with said rotatable deflection element; means selectively operable in response to the first level of said control signal for applying surveillance sweep signals to said rotatable deflection element and for applying centering control signals to said stationary deflection element; and means selectively operable in response to the second level of said control signal for applying precision sweep signals to said rotatable deflection element while applying precision angle vertical deflection signals to said stationary deflection element as well as a horizontal centering signal.

16. The combination defined in claim 15 wherein there is further provided means available at the operator's selection in the indicator group to allow the replacement of centering control signals with offcentering control signals for the search operation, the offcentering signals being utilized to actuate said stationary deflection element in the vertical and horizontal directions as desired to position the range sweep origin so as to allow an extended presentation of search information.

17. In a radar system for detecting the position of an object through the utilization of first and second antennas scanning in separate coordinates, the system including a signal generator for generating reference lines indicating various possible flight paths for an object; a combination for selectively guiding an object along a predetermined flight line or for determining the height of an object by varying the measured position of a horizontal line until it appears to intersect the object position, said combination comprising: first means for actuating one of antennas in an elevation scanning direction; second means for varying the angle limits of the elevation scanning operation of said first means; and third means associated with said signal generator for varying the reference line presentation in accordance with the angle limits of the elevation scanning; whereby the position of an object in either low or high altitude ranges may be detected and compared to a corresponding low or high reference line.

18. In a ground controlled approach system adaptable for search and precision scanning where a first antenna is utilized to provide target information in a wide scanning angle being driven by a search scanning mechanism and the first antenna is coupled through suitable engaging means to a second antenna for precision scanning in two coordinates being driven by a precision scanning mechanism; an antenna control circuit for actuating said engaging means in response to precision and search actuating signals provided through an operator's selection, to ensure the proper transition from search to precision scanning or vice versa, said control circuit comprising: a first switching device coupled to said engaging means for signalling the completed engagement between said antennas; a second switching device for transferring actuating power from the search scanning mechanism to the precision scanning mechanism whenever said first switching means indicates the completion of said engagement and the precision actuating signal is received, and a third switching device for removing the precision actuating signal from said second switching device when the precision drive mechanism is in the proper transition state for the return to search scanning.

19. A radar system for providing target position and guidance information, the system being adaptable in accordance with an operator's selection for surveillance operation where search scanning is performed throughout a relatively large scanning angle, for precision operation where two coordinate scanning is performed and a target is guided for a landing approach along predetermined cursor lines, for taxi control where a target is guided on the ground, and for a height-finding operation where the altitude of a target may be determined, said system comprising: a first group of circuits and mechanisms for providing radar echoes and scanning position-indicating signals, said first group including radar scanning mechanism selectively actuable in response to a first operation control signal to perform surveillance or precision scanning, said scanning mechanism being selectively actuable in response to a second operation control signal to perform surveillance scanning for short range taxi control, and being actuable in response to a third operation control signal for scanning in elevation for height-finding operation, including data encoding means for providing said scanning position-indicating signals representing the instantaneous position and phase of operation of said scanning mechanism, and including transmitter and receiver means for deriving radar echoes from said radar scanning mechanism; and a second group of circuits and mechanisms selectively operable for the various operations to provide corresponding displays of target information and to provide said operation control signals, said second group including a control signal generator having first, second, and third circuits for generating said first, second, and third operation control signals, display means responsive to said radar echoes and said scanning position-indicating signals and providing a visual target display indicating the range and angular position of various targets and including means responsive to said first operation control signal for producing cursor lines indicating the relationship of the targets displayed to ideal flight paths and selectively to present a height finder line for said height-finder operation.

20. A selectively operable system for locating aircraft in search, for guiding aircraft to a precision approach area, for guiding aircraft during precision approach landing, for guiding aircraft in movement on the ground, and for determining the height of aircraft, said system comprising: first means for providing radar signals unique in range and angle and related to respective aircraft for the various operations, said first means including scanning means selectively actuable in response to a first control signal to perform search scanning in a relatively large angle, selectively actuable in response to a second control signal for performing a short range search scanning to detect aircraft on the ground, and selectively actuable in response to a third control signal to perform precision scanning in two coordinates through relatively small angles, said first means further including means providing scan position data representing the angular position of the scanning means upon detection of target echoes representing an aircraft detected during one of the operations of said scanning means; second means responsive to said target echoes and said scan position data signals for providing position and guidance information signals, said second means including video, sweep and range marking circuits responsive to said first, second, and third control signals for presenting search, taxi, and precision displays, respectively, the same display means being employed for each operation, said second means also including scan line marking means for indicating reference positions for the various operations, and further including flight path line representing means actuable for height finding as well as surveillance or precision operations; and third means for providing said first, second, and third control signals.

21. A system for locating an aircraft requiring guidance for landing approach, for guiding the plane to a landing approach area, and for guiding the plane for landing, all of the guidance information being obtained from the same display means, said system comprising: a radar scanning mechanism having first and second scanning devices, said first scanning device being selectively actuable in response to a control signal to scan throughout a relatively large angle in order to locate the plane, and said scanning mechanism being responsive to said control signal for actuating said first and second scanning devices to scan in first and second coordinates, respectively, in order to provide precise signals for landing control; transmitter and receiver means for supplying radar pulses to said radar scanning mechanism and for deriving video signals therefrom corresponding to radar echoes; means operable in response to said control signal for generating scanning data signals representing the scanning position of said first scanning device in said large angle and for producing second scanning data signals representing the positions of said first and second scanning devices in their respective coordinates for said landing control; and display means for receiving said video and scanning data signals, said display means being responsive to said control signal to provide aircraft location information in a wide angle display presentation and landing information in a two coordinate display presentation, both of the presentations being provided through the same display device.

22. A selectively operable surveillance and precision guidance system for aircraft, operable in response to a control signal having a first level specifying an operation for providing guidance information whereby an aircraft may be located and directed to a precision landing area, and having a second level specifying an operation whereby the aircraft may be guided for a landing, said system comprising: antenna scanning means including first and second antennas, said scanning means being selectively actuable to provide a wide-angle scan for one of said antennas in response to the first level of the control signal during the aircraft location operation, and being responsive to the second level of the control signal to provide relatively small angle scans of said first antenna and a second antenna in separate coordinate directions during precision scanning operations; means for deriving first information signals through said antennas representing the range of an aircraft from said antennas; means for deriving second information signals representing the angular position of said one antenna for surveillance in response to the first level of the control signal and for representing the angular positions of both of said antennas for the precision operation; and selectively operable indicator means responsive to the first level of the control signal for translating said first and second information signals into a surveillance display and responsive to the second level of the control signal for translating said first and second information signals into a precision display, both of said displays being available through a common presentation.

23. A system for aircraft guidance through precision approach to any one of a plurality of runway sites, said system comprising: first means for generating a plurality of flight path line representing signals, each signal being associated with one of the plurality of runway sites; second means for performing wide angle search scanning to locate any aircraft requiring precision approach control information; third means for producing a guidance display for indicating the departure of the aircraft from the ideal flight path line represented by said first means; fourth means for orienting said second means to permit the transition into precision scanning covering an area including a selected one of the plurality of runway sites; and fifth means for selecting the proper flight path line signal corresponding to said selected runway site.

24. In a system for ground-controlled approach wherein means are provided for locating targets in surveillance and for guiding the targets to a precision approach area for landing, the system including an antenna rotatable about an axis through a relatively wide angle for surveillance scanning and through a relatively small angle for precision scanning, an arrangement for controlling the selective operation of said antenna for surveillance and precision scanning in response to a control signal, said arrangement comprising: first and second actuating means for said antenna for driving said antenna through surveillance and precision scanning, respectively; a control circuit responsive to said control signal for selectively actuating said first and second actuating means, respectively; a selectively operable display device including means for providing a wide angle search display and means for providing a narrow angle precision display; and display control means responsive to said control signal for actuating said display device to provide surveillance and precision presentations.

25. A system for locating aircraft requiring guidance for landing approach and for guiding the plane for landing, said system comprising: a scanning antenna mechanism; first actuating means coupled to said antenna scaning mechanism responsive to the first level of a control signal for driving at least a portion of said scanning means through a relatively large angle in order to locate the plane; second actuating means coupled to said antenna scanning mechanism and responsive to the second level of said control signal for actuating at least a portion of said scanning means to scan through a relatively small angle to provide precise signals for landing control; means coupled to at least a portion of said scanning means for generating first and second data signals for surveillance and precision scanning, respectively; and selectively operable display means including a first circuit operable in response to the first level of said control signal for providing radial sweep signals continuously changing in angle in response to said first data signal and including a second circuit for generating sweep signals in a first coordinate representing range and in a second coordinate respresenting the angle of at least a portion of said scanning means in response to said second level of said control signal.

26. A ground-controlled approach system operable in response to the first level of a control signal to provide a surveillance operation wherein a first scanning device is utilized for wide-angle search scanning, and said first scanning device is operable in response to the second level of said control signal to provide a precision scanning operation where said first scanning device and a second scanning device are utilized for scanning in respective intersecting planes to provide landing guidance signals, said system comprising: first means coupled to said antennas for transmitting and receiving radar signals; second means coupled to said antennas for producing data signals representing the respective scanning angles thereof, said second means being selectively operable in response to the first level of the control signal to produce a data signal representing the search angle of said first scanning device for surveillance and in response to the second level of said control signal to produce a composite signal representing the scanning positions of said first and second scanning devices for precision operations; and display means responsive to the received radar signals and to said data signals for providing display presentations, said display means being responsive to the first level of said control signal and to said data signals for surveillance for providing a surveillance display and being responsive to the second level of said control signal and to data signals representing precision scanning for providing a two coordinate display representing said intersecting planes of scanning.

27. A multipurpose connected ground controlled approach system comprising: only one azimuth antenna; only one elevation antenna; only one radar transmitter coupled to said antennas; only one radar receiver coupled to said antennas; only one oscillographic indicator coupled to said receiver; a first driving arrangement actuable to rotate said azimuth antenna continuously in one direction in azimuth; a second driving arrangement actuable to oscillate the same said azimuth antenna from side to side in azimuth and contemporaneously to oscillate said elevation antenna up and down in elevation with the relative rotational positions of said antennas being such that said azimuth antenna is positioned approximately at the midpoint of its side to side movement at a time when said elevation antenna is approximately at one of its extreme limits of travel and vice-versa; control means to actuate said first and second driving arrangements selectively; a circuit to deflect the beam of said indicator in a direction corresponding to that of said azimuth antenna during actuation of said first driving arrangement and to deflect the beam of the same said indicator on a time-shared basis alternately in directions corresponding to that of said azimuth antenna and that of said elevation antenna during actuation of said second driving arrangement; said receiver being connected for modulation of the intensity of the beam of the same said indicator to produce representations of aircraft positions; and means actuable with said first driving arrangement to produce a display on the same said indicator of at least two different ranges.

28. A multipurpose connected ground controlled approach system comprising: only one azimuth antenna; only one elevation antenna; only one radar transmitter coupled to said antennas; only one radar receiver coupled to said antennas; only one oscillographic indicator coupled to said receiver; a first driving arrangement actuable to rotate said azimuth antenna continuously in one direction in azimuth; a second driving arrangement actuable to oscillate the same said azimuth antenna from side to side in azimuth and contemporaneously to oscillate said elevation antenna up and down in elevation with the relative rotational positions of said antennas being such that said azimuth antenna is positioned approximately at the midpoint of its side to side movement at a time when said elevation antenna is approximately at one of its extreme limits of travel and vice-versa; control means to actuate said first and second driving arrangements selectively; a circuit to deflect the beam of said indicator in a direction corresponding to that of said azimuth antenna during actuation of said first driving arrangement and to deflect the beam of the same said indicator on a time-shared basis alternately in directions corresponding to that of said azimuth antenna and that of said elevation antenna during actuation of said second driving arrangement; said receiver being connected for modulation of the intensity of the beam of the same said indicator to produce representations of aircraft positions; means actuable with said second driving arrangement for intensity modulating the beam of the same said indicator to produce a cursor line thereon representing a constant altitude; and adjustable means for varying the position of said cursor line whereby movement thereof to a position extending through an aircraft representation permits its altitude determination from calibration of said indicator or said adjustable means.

29. A multipurpose connected ground controlled approach system comprising: only one azimuth antenna; only one elevation antenna; only one radar transmitter coupled to said antennas; only one radar receiver coupled to said antennas; only one oscillographic indicator coupled to said receiver; a first driving arrangement actuable to rotate said azimuth antenna continuously in one direction in azimuth; a second driving arrangement actuable to oscillate the same said azimuth antenna from side to side in azimuth and contemporaneously to oscillate said elevation antenna up and down in elevation with the relative rotational positions of said antennas being such that said azimuth antenna is positioned approximately at the midpoint of its side to side movement at a time when said elevation antenna is approximately at one of its extreme limits of travel and vice-versa; control means to actuate said first and second driving arrangements selectively; a circuit to deflect the beam of said indicator in a direction corresponding to that of said azimuth antenna during actuation of said first driving arrangement and to deflect the beam of the same said indicator on a time-shared basis alternately in directions corresponding to that of said azimuth antenna and that of said elevation antenna during actuation of said second driving arrangement; said receiver being connected for modulation of the intensity of the beam of the same said indicator to produce representations of aircraft positions; means actuable with said second driving arrangement for intensity modulating the beam of the same said indicator to produce a cursor line thereon representing a constant altitude; adjustable means for varying the position of said cursor line whereby movement thereof to a position extending through an aircraft representation permits its altitude determination from calibration of said indicator or said adjustable means; and means actuable with said first driving arrangement to produce a display on the same said indicator of at least two different ranges.

30. A multipurpose connected ground controlled approach system comprising: only one azimuth antenna; only one elevation antenna; only one radar transmitter coupled to said antennas; only one radar receiver coupled to said antennas; only one oscillographic indicator coupled to said receiver; a first driving arrangement actuable to rotate said azimuth antenna continuously in one direction in azimuth; a second driving arrangement actuable to oscillate the same said azimuth antenna from side to side in azimuth and contemporaneously to oscillate said elevation antenna up and down in elevation with the relative rotational positions of said antennas being such that said azimuth antenna is positioned approximately at the midpoint of its side to side movement at a time when said elevation antenna is approximately at one of its extreme limits of travel and vice-versa; control means to actuate said first and second driving arrangements selectively; a circuit to deflect the beam of said indicator in a direction corresponding to that of said azimuth antenna during actuation of said first driving arrangement and to deflect the beam of the same said indicator on a time-shared basis alternately in directions corresponding to that of said azimuth antenna and that of said elevation antenna during actuation of said second driving arrangement; said receiver being connected for modulation of the intensity of the beam of the same said indicator to produce representations of aircraft positions; means actuable with said second driving arrangement for intensity modulating the beam of the same said indicator to produce a cursor line thereon representing a constant altitude; and adjustable means calibrated in altitude for varying the position of said cursor line, whereby movement of said cursor line to a position extending through an aircraft representation permits its altitude determination from calibration of said adjustable means.

31. A multipurpose connected ground controlled approach system comprising: only one azimuth antenna; only one elevation antenna; only one radar transmitter coupled to said antennas; only one radar receiver coupled to said antennas; only one oscillograph indicator coupled to said receiver; a first driving arrangement actuable to rotate said azimuth antenna continuously in one direction in azimuth; a second driving arrangement actuable to oscillate the same said azimuth antenna from side to side in azimuth and contemporaneously to oscillate said elevation antenna up and down in elevation with the relative rotational positions of said antennas being such that said azimuth antenna is positioned approximately at the midpoint of its side to side movement at a time when said elevation antenna is approximately at one of its extreme limits of travel and vice-versa; control means to actuate said first and second driving arrangements selectively; a circuit to deflect the beam of said indicator in a direction corresponding to that of said azimuth antenna during actuation of said first driving arrangement and to deflect the beam of the same said indicator on a time-shared basis alternately in directions corresponding to that of said azimuth antenna and that of said elevation antenna during actuation of said second driving arrangement; said receiver being connected for modulation of the intensity of the beam of the same said indicator to produce representations of aircraft positions; means actuable with said second driving arrangement for intensity modulating the beam of the same said indicator to produce a cursor line thereon representing a constant altitude; adjustable means calibrated in altitude for varying the position of said cursor line, whereby movement of said cursor line to a position extending through an aircraft representation permits its altitude determination from calibration of said adjustable means; and means actuable with said first driving arrangement to produce a display on the same said indicator of at least two different ranges.

32. A ground controlled approach system comprising: a base; an azimuth antenna; an elevation antenna; a member supporting said antennas on said base, said supporting member being rotatable about an approximately vertical axis, said azimuth antenna and said elevation antenna being rotatable relative to said supporting member about approximately vertical and horizontal axes, respectively; means selectively operable to rotate said azimuth antenna continuously in one direction more than 360 degrees about its axis in search and to oscillate both of said antennas about their respective axes in precision approach; a plan position indicator; means to produce a first angle signal corresponding to the angular position of said azimuth antenna relative to said supporting members; and means responsive to rotation of said supporting member and to said first angle signal for impressing a second angle signal upon said indicator corresponding to the difference between the angular rotations of said azimuth antenna and said supporting member, whereby the display of said indicator will remain stationary upon rotation of said supporting member.

33. A ground controlled approach system comprising: a base; an azimuth antenna; an elevation antenna; a member supporting said antennas on said base, said supporting member being rotatable about an approximately vertical axis, said azimuth antenna and said elevation antenna being rotatable relative to said supporting member about approximately vertical and horizontal axes, respectively; means selectively operable to rotate said azimuth antenna continuously in one direction more than 360 degrees about its axis in search and to oscillate both of said antennas about their respective axes in precision approach; a plan position indicator; a search synchro having a rotor connected to said azimuth antenna for producing stator output signals corresponding to the angular position of said azimuth antenna relative to said supporting member; and a differential synchro having a rotor rotatable with said supporting member and having a stator electrically connected to said search synchro stator for producing a rotor output signal corresponding to the difference between the angular rotations of said azimuth antenna and said supporting member, whereby the display of said indicator will remain stationary upon rotation of said supporting member.

References Cited in the file of this patent

UNITED STATES PATENTS

| | | |
|---|---|---|
| 2,555,101 | Alvarez | May 29, 1951 |
| 2,572,975 | Berger | Oct. 30, 1951 |
| 2,585,855 | Sherwin | Feb. 12, 1952 |
| 2,617,982 | Holschuh | Nov. 11, 1952 |

FOREIGN PATENTS

| | | |
|---|---|---|
| 157,376 | Australia | July 2, 1954 |

UNITED STATES PATENT OFFICE
CERTIFICATE OF CORRECTION

Patent No. 2,975,413            March 14, 1961

Robert W. Landee et al.

It is hereby certified that error appears in the above numbered patent requiring correction and that the said Letters Patent should read as corrected below.

Column 6, line 19, for "drive" read -- driver --; column 14, line 26, for "C2" read -- S2 --; column 18, line 19, after "high" insert -- and --; column 21, line 72, for "Whenever" read -- Wherever --; column 25, line 33, for "megacycles", second occurrence, read -- megacycle --; column 28, line 23, for "compensation" read -- compensating --; line 46, for "of" read -- by --; same column 28, line 61, for "by" read -- why --; column 51, line 66, for "70°" read -- 7° --.

Signed and sealed this 2nd day of January 1962.

(SEAL)

Attest:

ERNEST W. SWIDER            DAVID L. LADD
Attesting Officer            Commissioner of Patents

USCOMM-DC